US012675796B2

(12) United States Patent
Zhu

(10) Patent No.: US 12,675,796 B2
(45) Date of Patent: Jul. 7, 2026

(54) TRANSACTION UPLOADING METHOD, ASSOCIATED APPARATUS, AND MEDIUM

(71) Applicant: TENCENT TECHNOLOGY (SHENZHEN) COMPANY LIMITED, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 96 days.

(21) Appl. No.: 18/528,084

(22) Filed: Dec. 4, 2023

(65) Prior Publication Data

US 2024/0330939 A1      Oct. 3, 2024

Related U.S. Application Data

(63) Continuation of application No. PCT/CN2023/112169, filed on Aug. 10, 2023.

(30) Foreign Application Priority Data

Mar. 31, 2023      (CN) .......................... 202310361655.0

(51) Int. Cl.
    *G06Q 20/38*      (2012.01)
    *G06Q 20/40*      (2012.01)
    *G06Q 20/42*      (2012.01)
(52) U.S. Cl.
    CPC ......... *G06Q 20/425* (2013.01); *G06Q 20/401* (2013.01)
(58) Field of Classification Search
    CPC .. G06Q 20/425; G06Q 20/401; G06Q 20/389; G06Q 20/38; G06Q 9/06;
    (Continued)

(56) References Cited

U.S. PATENT DOCUMENTS

| | | | |
|---|---|---|---|
| 11,232,442 B2 * | 1/2022 | Liu ..................... | H04L 63/0435 |
| 2018/0225660 A1 * | 8/2018 | Chapman .............. | G06Q 20/10 |

(Continued)

FOREIGN PATENT DOCUMENTS

| | | |
|---|---|---|
| CN | 107807984 A | 3/2018 |
| CN | 109462587 A | 3/2019 |

(Continued)

OTHER PUBLICATIONS

The World Intellectual Property Organization (WIPO) International Search Report for PCT/CN2023/112169 Dec. 27, 2023 6 Pages (including translation).

(Continued)

*Primary Examiner* — Jude Jean Gilles
(74) *Attorney, Agent, or Firm* — Anova Law Group, PLLC

(57) ABSTRACT

This application provides a transaction uploading method. The transaction uploading method includes: determining a parent type of the local transaction in response to a first consensus node receiving a local transaction; transmitting the local transaction to a second consensus node if the parent type is a first type, the local transaction instructing the second consensus node to execute the local transaction, recording the local transaction to a second blockchain, generating first uploading verification information of the local transaction, and transmitting the first uploading verification information to a third consensus node, the first uploading verification information instructing the third consensus node to verify uploading of the local transaction according to the first uploading verification information to obtain an uploading verification result, and the second blockchain being not accessible by nodes other than the second consensus node; and obtaining the uploading verification result from the third consensus node.

20 Claims, 26 Drawing Sheets

(58) Field of Classification Search
CPC ............ G06Q 9/32; G06Q 9/30; G06Q 20/40;
G06Q 20/42; H04L 9/00
USPC ........................................................ 709/238
See application file for complete search history.

(56) References Cited

U.S. PATENT DOCUMENTS

| | | | |
|---|---|---|---|
| 2021/0042740 A1* | 2/2021 | Chen ................... | G06Q 20/386 |
| 2021/0203509 A1 | 7/2021 | Li et al. | |
| 2023/0102617 A1* | 3/2023 | Liu ...................... | G06Q 20/223 |
| | | | 705/75 |

FOREIGN PATENT DOCUMENTS

| | | |
|---|---|---|
| CN | 112580112 A | 3/2021 |
| CN | 113923044 A | 1/2022 |

OTHER PUBLICATIONS

Intellectual Property Office of Singapore Search Report and Written Opinion for Application No. 11202308223S Mar. 31, 2026 12 pages.
Suyash Gupta et al., "Blockchain transaction processing." arXiv preprint arXiv:2107.11592 (2021).
Nikolaos Papadis et al., "Blockchain-based payment channel networks: Challenges and recent advances." IEEE Access 8 (2020): 227596-227609.

\* cited by examiner

Witness
network

Consensus
network

First uploading
verification information

First uploading
verification information

Digest value of local transaction

Digest value recorded in first bypass node

Digest value of associated data obtained after execution
of to-be-uploaded local transaction Digest value recorded in second bypass node

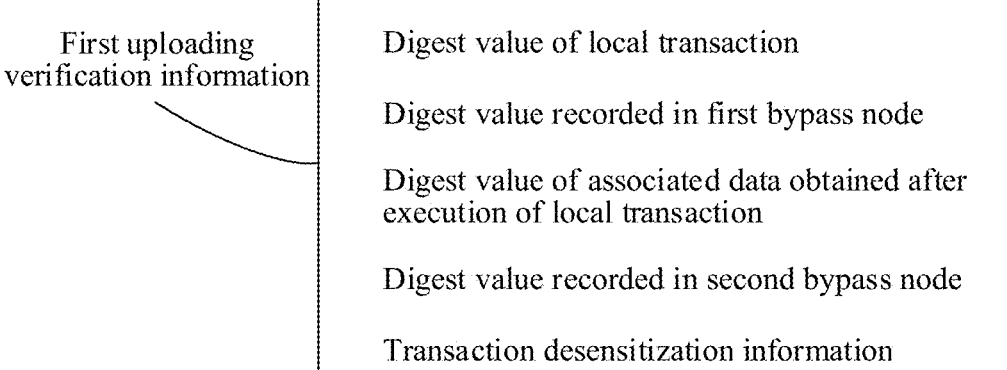

First uploading
verification information

Digest value of local transaction

Digest value recorded in first bypass node

Digest value of associated data obtained after
execution of local transaction

Digest value recorded in second bypass node

Transaction desensitization information

FIG. 16

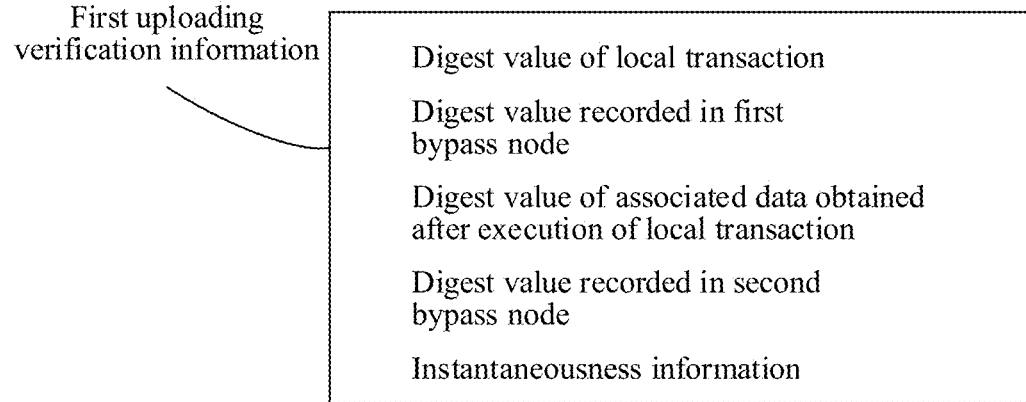

First uploading
verification information

Digest value of local transaction

Digest value recorded in first
bypass node

Digest value of associated data obtained
after execution of local transaction

Digest value recorded in second
bypass node

Instantaneousness information

FIG. 17

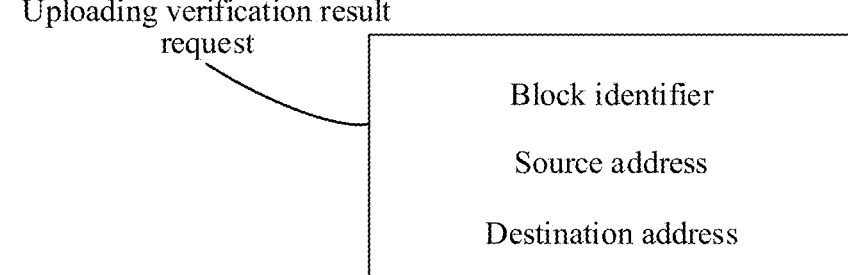

Uploading verification result
request

Block identifier

Source address

Destination address

FIG. 18

TRANSACTION UPLOADING METHOD, ASSOCIATED APPARATUS, AND MEDIUM

RELATED APPLICATIONS

This application is a continuation of PCT Application No. PCT/CN2023/112169, filed on Aug. 10, 2023, which claims priority to Chinese Patent Application No. 2023103616550, filed to the China National Intellectual Property Administration on Mar. 31, 2023 and entitled "TRANSACTION UPLOADING METHOD, ASSOCIATED APPARATUS, AND MEDIUM." The two applications are incorporated herein by reference in their entirety.

FIELD OF THE TECHNOLOGY

This application relates to the field of blockchains, and more particularly, to a transaction uploading method, an associated apparatus, and a medium.

BACKGROUND OF THE DISCLOSURE

A conventional blockchain hierarchical consensus system includes a local consensus network and a global consensus network. Consensus nodes in the local consensus network perform a blockchain uploading operation for locally generated transactions, while the global consensus network performs a blockchain uploading operation for global transactions generalized from local transactions. The local consensus network and the global consensus network upload different blockchains, thus realizing hierarchical governance, and the global consensus network may focus on global governance.

In the hierarchical consensus system, although data are isolated between different local consensus networks, transactions are stored in plain text on the blockchain. Therefore, for target transactions not expected to be accessed by third parties on the blockchain, the conventional technology cannot meet uploading requirements of the target transactions, and the uploading security of the target transactions is poor.

SUMMARY

This embodiment provides a transaction uploading method, an associated apparatus, and a medium.

According to an aspect of this application, a transaction uploading method is provided. The method is performed by a first relay node and includes: determining a parent type of the local transaction in response to a first consensus node receiving a local transaction; transmitting the local transaction to a second consensus node in response to that the parent type is a first type, the local transaction instructing the second consensus node to execute the local transaction, recording the local transaction to a second blockchain, generating first uploading verification information of the local transaction, and transmitting the first uploading verification information to a third consensus node, the first uploading verification information instructing the third consensus node to verify uploading of the local transaction according to the first uploading verification information to obtain an uploading verification result of the local transaction, and the second blockchain being not accessible by nodes other than the second consensus node; and obtaining the uploading verification result of the local transaction from the third consensus node.

According to an aspect of this application, a transaction uploading method is provided. The method is performed by a second consensus node and includes receiving a local transaction forwarded by a first relay node, a parent type of the local transaction being a first type; executing the local transaction, and recording the local transaction to a second blockchain, the second blockchain being not accessible by nodes other than the second consensus node; obtaining first uploading verification information of the local transaction; and transmitting the first uploading verification information to a third consensus node, the first uploading verification information instructing the third consensus node to verify uploading of the local transaction according to the first uploading verification information to obtain an uploading verification result.

According to an aspect of this application, one or more non-transitory readable storage media are provided. The storage medium stores computer-readable instructions. The computer-readable instructions, when executed by one or more processors, implement the transaction uploading method as described above.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application.

FIG. 16 shows a schematic diagram of a data structure of first uploading verification information with transaction desensitization information.

FIG. 17 shows a schematic diagram of a data structure of first uploading verification information with instantaneousness information.

FIG. 18 shows a schematic diagram of a data structure of an uploading verification result request.

DESCRIPTION OF EMBODIMENTS

To make the objects, technical solutions, and advantages of this application clearer, the following further describes this application in detail with reference to the accompanying drawings and the embodiments. It is to be understood that specific embodiments described herein are merely illustrative of this application and are not intended to be limiting thereof.

Before the embodiments of this application are further described in detail, nouns and terms in the embodiments of this application are described, and the nouns and terms in the embodiments of this application are applicable to the following explanations.

Figure 1A:
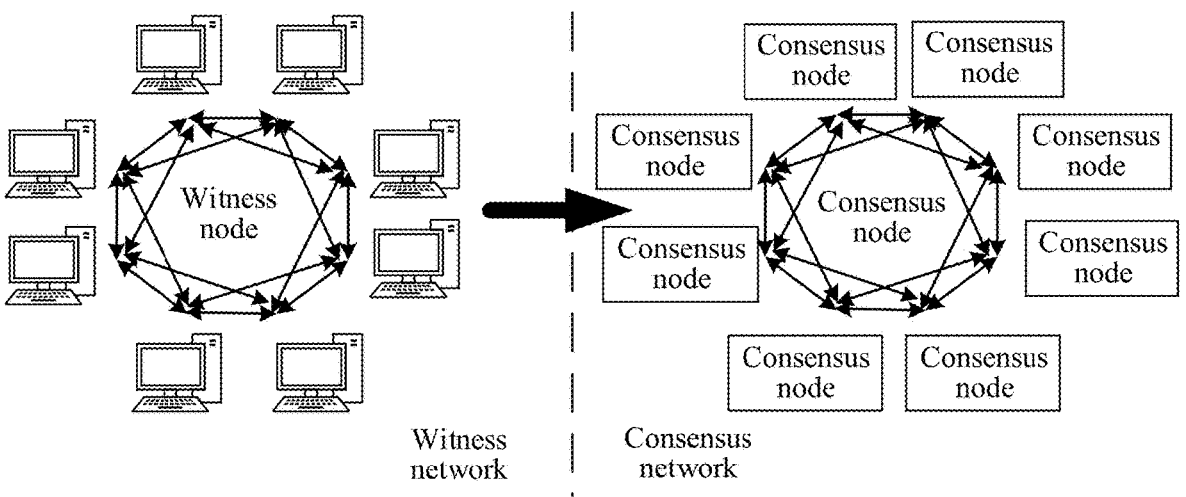
FIG. 1A is an architectural schematic diagram of a hierarchical blockchain network in one embodiment.

Hierarchical blockchain: A consensus network and a witness network are separated based on point-to-point transmission in a blockchain network (as shown in FIG. 1A). A consensus node of the consensus network mainly performs a consensus algorithm. The witness network is also referred to as a service network. A witness node of the witness network performs data clearing synchronization, and complete relevant specific services based on the witness node.

Sorting synchronization: After the consensus node receives a data synchronization request of the witness node, data permitted to be read by the witness node is synchronized to the witness node.

Hierarchical consensus system of hierarchical blockchain: The hierarchical blockchain divides the consensus network into a local consensus network and a global consensus network based on separating the witness network from the consensus network. The consensus node in the local consensus network performs a blockchain uploading operation for locally generated transactions (for example, transactions generated by subsidiaries of a certain group), while the global consensus network performs a blockchain uploading operation for global transactions (for example, group transactions summarized from subsidiary transactions) generalized from local transactions. The local consensus network and the global consensus network upload different blockchains, thus realizing hierarchical governance. Accordingly, the global consensus network is not required to process a large number of local transactions, and may focus on global governance.

In the hierarchical consensus system, although data isolation is realized between different local consensus networks, transactions are stored in plain text on the blockchain. Some transactions are not expected to be exposed to third parties, and therefore, the conventional technology cannot meet uploading requirements of target transactions not expected to be exposed to third parties. The uploading security of the target transactions is poor. Moreover, the hierarchical consensus system is large, and each local consensus network produces many target transactions. Each local consensus network handles the uploading security of target transactions separately, which has the problems of high overhead and high difficulty level. Therefore, it is important to improve the uploading security of target transactions.

Descriptions of System Architecture and Scenario of this Embodiment

The blockchain network shown in FIG. 1A includes a witness network and a consensus network. The consensus network refers to a network that uploads a to-be-uploaded transaction on a blockchain after reaching consensus, and includes multiple consensus nodes. Multiple means at least two. The witness network refers to a network that generates a to-be-uploaded transaction, does not upload the transaction on a blockchain, but witnesses uploading of the to-be-uploaded transaction, and includes multiple witness nodes. The consensus nodes are blockchain nodes.

The witness nodes do not need to participate in uploading consensus, and are mainly configured to generate the to-be-uploaded transaction and witness the uploading of the to-be-uploaded transaction. The consensus nodes are generally full nodes. The full nodes are nodes for maintaining all data of each block on the blockchain. Since the consensus nodes are to upload the to-be-uploaded transaction after generating blocks, the data of all blocks on the whole blockchain are definitely required to be maintained. The witness nodes are generally lightweight nodes. The lightweight nodes refer to nodes for maintaining part of the data of each block on the blockchain. For example, after the full nodes complete the uploading, only block headers of uploaded blocks are transmitted to the lightweight nodes, and when the lightweight nodes need to verify whether the uploading is correct, digest values in the block headers are used for verifying Merkle trees.

The consensus node or the blockchain node may be a server in the blockchain network or a user terminal in the blockchain network. The specific form of the consensus node or the blockchain node is not limited herein. The witness network and the consensus network shown in FIG. 1A may be in different network environments. For example, in many implementations, the witness nodes are deployed in a public witness network, while the consensus nodes running a blockchain consensus protocol are deployed in a private consensus network. The witness nodes and the consensus nodes may interact through routing nodes, and the witness nodes and the consensus nodes may also directly transmit data without the routing nodes. Since the consensus network is in a relatively secure private cloud, a consensus mechanism is provided for mutual access to ensure security, and there is no need to add identity management and network control. The witness nodes are in the public network and may be accessed by other uncertain network terminals. Therefore, the behavior of the witness nodes and other possible nodes accessing the consensus network needs to be strictly controlled.

FIG. 1A shows an architecture diagram including a witness network and a consensus network. Next, using FIG. 1B as an example, the architecture of hierarchical consensus using the consensus network based on FIG. 1A is further described.

Figure 1B:
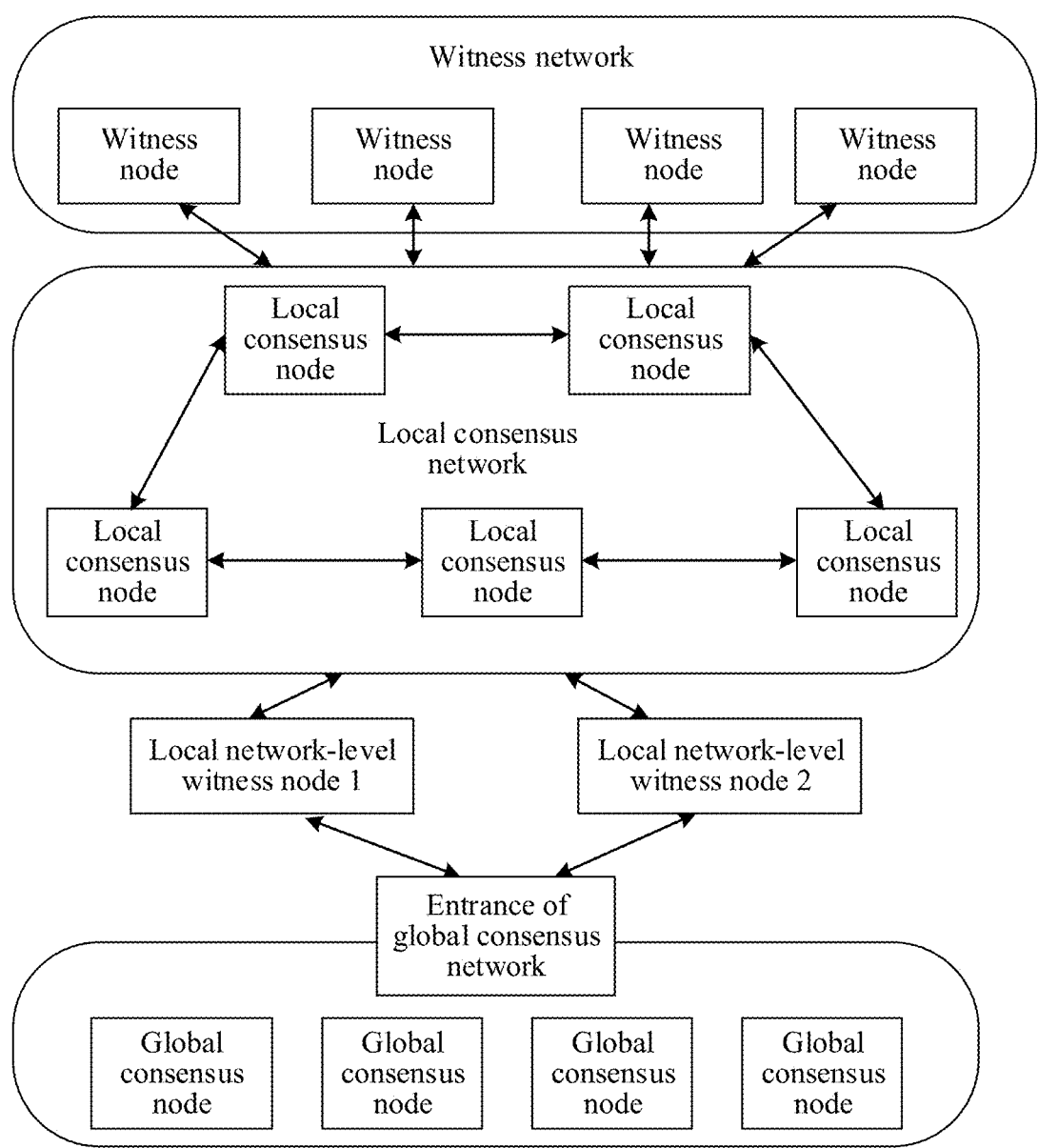
FIG. 1B is an architectural schematic diagram of a hierarchical blockchain network in another embodiment.

Reference is made to a blockchain hierarchical consensus network shown in FIG. 1B. The blockchain hierarchical consensus network refers to a blockchain network for hierarchical consensus on transactions. The blockchain hierarchical consensus network includes a witness network, a local consensus network, a local network-level witness node, and a global consensus network. The witness network is the witness network in FIG. 1A. The local consensus network refers to a network for consensus and uploading of local transactions. The local consensus network includes multiple local consensus nodes. The local transactions are transactions that has impact within the local scope. For example, electronic invoice reimbursement transactions of a subsidiary of a certain group are local transactions. The global consensus network is a network for consensus and uploading of global transactions derived from the local transactions. The global consensus network includes multiple global consensus nodes. The global transactions are transactions that impact transaction of a global scope. For example, electronic invoice reimbursement summarizing transactions of a subsidiary of a group are global transactions. The local network-level witness node is an interface node between the local consensus node and the global consensus node, and is configured to summarize the local transactions generated by the local consensus network into the global transactions, transmit the global transactions to the global consensus network for uploading through a global consensus network entry point, and witness the uploading of the global consensus network. There are two local network-level witness nodes in FIG. 1B, which play a double backup role. The two local network-level witness nodes work at the same time and perform the same actions. If one of the local network-level witness nodes fails, the loss of information and the interruption of workflow will not be caused.

The witness nodes in the witness network do not verify the uploading is correct in the global consensus network, but only verify whether the uploading is correct in the local consensus network. When it is required to verify whether the local transactions generated thereby are correctly uploaded by the local consensus node, data needed for verification is obtained from the local consensus node by the clearing synchronization as described above, and the local consensus node will not transmit all the uploading data thereto. However, the local network-level witness node only verifies the uploading correctness in the global consensus network. When it is required to verify whether the global transactions deduced from the local transactions are correctly uploaded by the global consensus node, data needed for verification is obtained from the global consensus node by the clearing synchronization as described above, and the global consensus node will not transmit all the uploading data thereto.

Figure 1C:
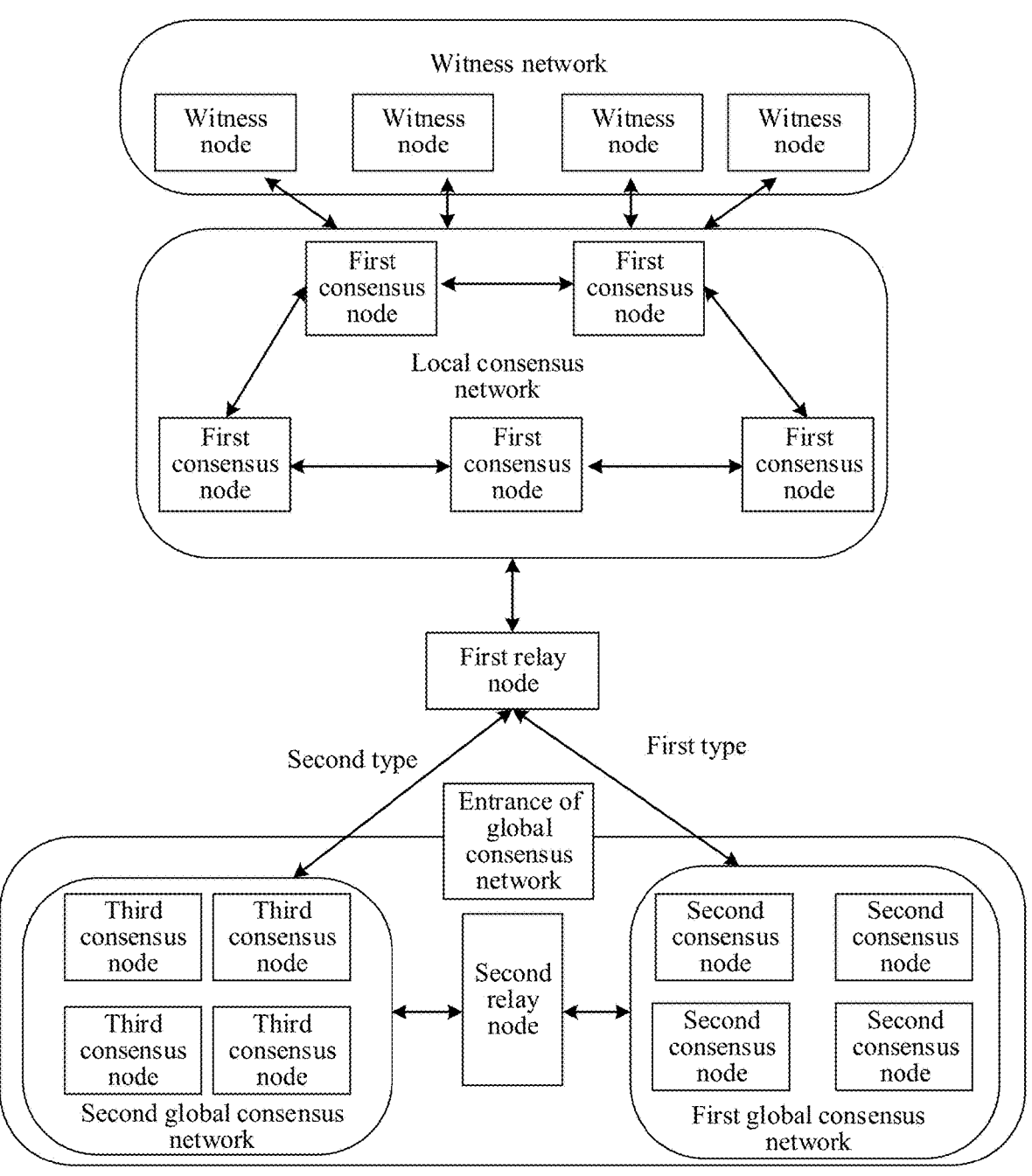
FIG. 1C is an architectural schematic diagram of a hierarchical blockchain network in another embodiment.

The architecture of FIG. 1C differs from that of FIG. 1B in that the two local network-level witness nodes of FIG. 1B are replaced with a first relay node, the global consensus network is further divided into a second global consensus network and a first global consensus network, and a second relay node is adopted between the second global consensus network and the first global consensus network. The first global consensus network refers to a blockchain network for uploading a target transaction, and records the target transaction to a second blockchain. The target transaction is a transaction not expected to be accessed and known by a third party. The second blockchain is used for specifically recording blocks of transactions that are not expected to be accessed and known by the third party, and the second blockchain is not expected to be accessed by the outside world. Both the third party and the outside world refer to blockchain nodes other than the second consensus node. For example, the third party and the outside world include witness nodes, first consensus nodes, third consensus nodes, first relay nodes, and second relay nodes. If it is expected to obtain verification information recorded to a block on the blockchain, the verification information can only be obtained by requesting a blockchain node in the first global consensus network recording the blockchain.

Since the target transaction is a transaction not expected to be accessed and known by a third party, the consent of an object that generates the target transaction shall be sought before the target transaction is uploaded. Specifically, when the object generates the target transaction and transmits the target transaction to the local consensus network for uploading, an inquiry box may be displayed to the object to inquire whether the object agrees to upload the target transaction. If the object does not agree, this implementation cannot be implemented, or only the part of the transaction agreed to be uploaded is uploaded.

The first consensus node of FIG. 1C differs from the local consensus node of FIG. 1B in that the first consensus node only uploads a local transaction of a second type. The first relay node delegates the second consensus node in the first global consensus network to upload a local transaction of a first type. The first type is a transaction type not expected to be accessed and known by a third party. The second type is a transaction type allowed to be accessed and known by a third party. The local transaction of the second type is uploaded to a blockchain that may be viewed by any external node, while the local transaction of the first type is uploaded to a blockchain that is only visible inside the first global consensus network, thereby improving the uploading security of the target transaction.

The second global consensus network of the global consensus network of FIG. 1C is similar to the global consensus network of FIG. 1B, and is mainly configured to upload the global transactions deduced from the local transactions. The second global consensus network includes multiple third consensus nodes. The first global consensus network in the global consensus network of FIG. 1C is an added network relative to FIG. 1B. The first global consensus network is used for completing uploading of the local transaction of the first type. The first global consensus network includes multiple second consensus nodes. When the first global consensus network uploads the local transaction of the first type, the blockchain for uploading cannot be viewed by the outside world. In order to enable external objects to verify whether the uploading is correct, the first global consensus network may generate uploading verification information to be transmitted to the second global consensus network. The second global consensus network verifies the uploading verification information. An uploading verification result is returned to the local consensus network through the first relay node. The first relay node is a node for transferring the local transaction of the first type to the first global consensus network for uploading. The second relay node is a node for transmitting uploading verification information generated by the first global consensus network to the second global consensus network for verification.

Figure 2:
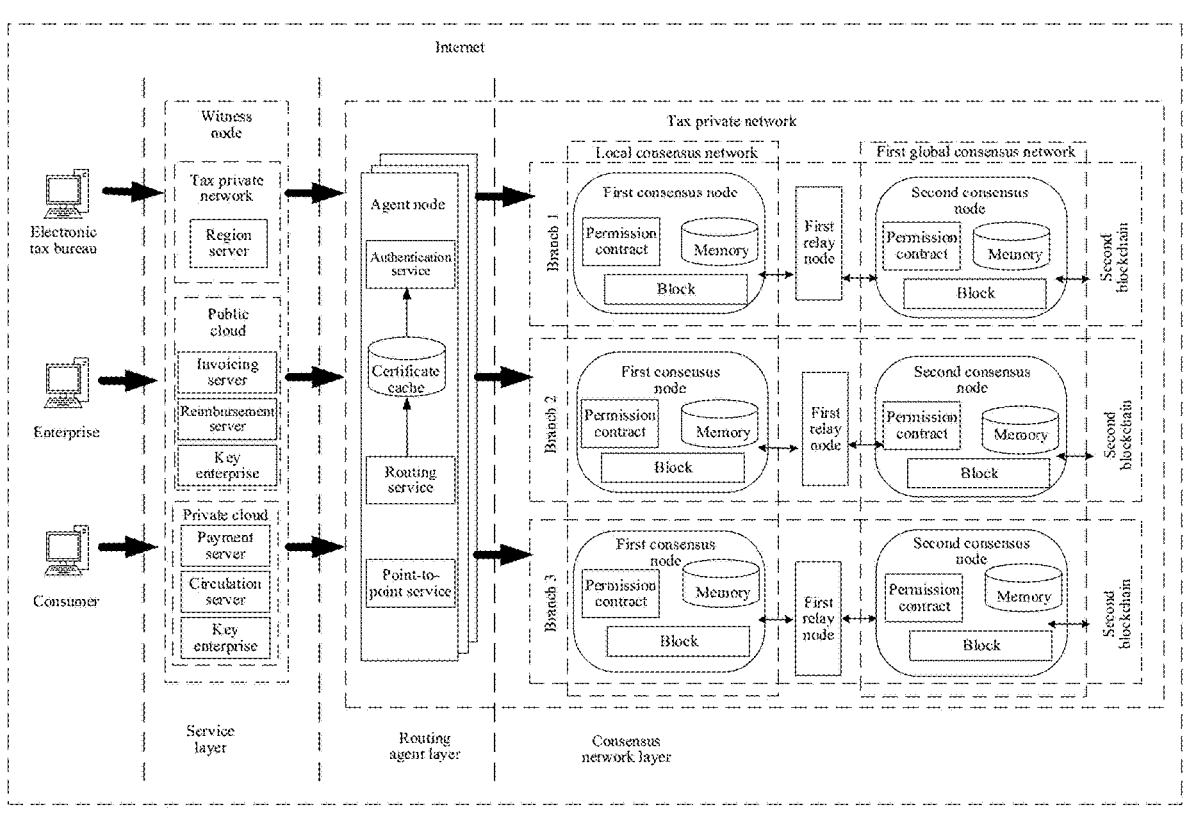
FIG. 2 is a schematic diagram of a transaction uploading method applied in an electronic invoice scenario in one embodiment.

This embodiment may be applied to various scenarios, including but not limited to electronic invoices, equity registration, securities trading, and other scenarios, such as the scenario of electronic tax invoice blockchain system shown in FIG. 2.

Referring to FIG. 2, the electronic tax invoice blockchain system includes a service layer, a routing agent layer, and a consensus network layer.

The service layer is a witness network, including at least one witness node. The service layer may receive local transaction requests from the electronic tax bureau, enterprises, or consumers, such as an electronic invoice issuing transaction uploading request of the electronic tax bureau, electronic invoice receiving transaction uploading requests of the enterprises, and electronic Invoice uploading requests of the consumers. The service layer includes a server of a local tax bureau in a private tax network, an invoicing server in a public cloud (server for invoicing electronic invoices of non-critical enterprises), a reimbursement server (server for reimbursement of electronic invoices of non-critical enterprises), a key enterprise server (server for various transactions of electronic invoices of critical enterprises), a payment server in a private cloud (server for invoicing related transactions of consumers in the payment process of non-critical enterprises), a circulation server (server for invoicing related transactions of items in the circulation process of non-critical enterprises), and a critical enterprise server (server for invoicing related transactions of consumers in critical enterprises). The critical enterprises are enterprises which have a certain size and therefore need to be provided with invoice-related transactions by a dedicated server. The electronic tax bureau is configured to provide online tax services. The electronic tax invoices refer to electronic invoices issued by the electronic tax bureau. Electronic invoices refer to invoices generated, stored, transmitted, and managed electronically. The private tax network refers to a network serving taxpayers, and the local tax bureau is a government agency in charge of local taxation.

The server of the local tax bureau in the private tax network generates an electronic invoice issuing transaction according to an electronic invoice issuing demand of the electronic tax bureau, and requests the consensus network layer to upload the transaction. The invoicing server in the public cloud generates an electronic invoice collection transaction according to the demands of non-critical enterprises to apply for electronic invoices, and requests the consensus network layer to upload the transaction. The reimbursement server in the public cloud generates an electronic invoice reimbursement transaction according to the demand of non-critical enterprises for reimbursement of electronic invoices, and requests the consensus network layer to upload the transaction. The critical enterprise server in the public cloud generates an electronic invoice collection or reimbursement transaction according to the demand of critical enterprises to collect or reimburse electronic invoices, and requests the consensus network layer to upload the transaction. The payment server in the private cloud generates a transaction requiring electronic invoice according to the payment actions of consumers in non-critical enterprises, and requests the consensus network layer to upload the transaction. The circulation server in the private cloud generates an electronic invoice circulation transaction according to the demand of exchanging items between consumers of non-critical enterprises, and requests the consensus network layer to upload the transaction. The critical enterprise server in the private cloud generates a transaction requiring invoicing or circulation according to the payment or item circulation requirements of consumers of critical enterprises, and requests the consensus network layer to upload the transaction.

The various servers need the consent of the object when generating transactions and requesting the consensus network layer for uploading according to the various requirements of the object. Specifically, when a transaction is generated and transmitted to the consensus network layer for uploading, an inquiry box may be displayed to the object to inquire whether the object agrees to upload the generated transaction. If the object does not agree, this implementation cannot be implemented, or only the part of the transaction agreed to be uploaded is uploaded.

The routing agent layer refers to a layer that plays the role of routing between nodes. The routing agent layer is configured to route data related to the service layer and the consensus network layer. The routing agent layer includes an authentication service, a certificate cache, a routing service, and a point-to-point service. The routing service is configured to route a to-be-uploaded transaction generated by the service layer to the consensus network layer. The authentication service is configured to authenticate the to-be-uploaded transaction before routing the to-be-uploaded transaction to the consensus network layer. For example, a signature of the to-be-uploaded transaction is verified according to a key certificate. The certificate cache is dedicated to caching public and private key certificates required in the authentication service. The point-to-point service provides peer-to-peer communication between nodes. After the to-be-uploaded transaction is uploaded through the consensus network layer, the uploading verification information returned by the consensus network layer is received through the point-to-point service.

The consensus network layer includes a local consensus network as in FIG. 1C, a first global consensus network, and a first relay node located between. The local consensus network includes multiple first consensus nodes. Each first consensus node includes a permission contract for determining whether the first consensus node has an uploading permission, a memory used in the uploading processing of the local transaction on the blockchain, and a block for locally maintaining the uploading thereof. The first global consensus network includes multiple second consensus nodes. Each second consensus node includes a permission contract for determining whether the first consensus node has an uploading permission, a memory used in the uploading processing of the target transaction, and a block for locally maintaining the uploading thereof.

In FIG. 2, the consensus network layer has three branches. If an electronic invoice issuing transaction uploading request forwarded by an agent node and generated by the local tax bureau server is received, the request is forwarded to the first consensus node of Branch 1. The first consensus node queries an own permission contract and finds that the first consensus node is not permitted to upload in the local transaction blockchain (because the issuance of electronic invoices is a transaction not expected to be known by a third party and the transaction must be transferred to the first global consensus network for uploading to the second blockchain). Therefore, the request is forwarded to the second consensus node in Branch 1 through the first relay node. If the electronic invoice and reimbursement transaction uploading request forwarded by the agent node and generated by various servers of the public cloud is received, the request is forwarded to the first consensus node of Branch 2. The first consensus node queries an own permission contract and finds that the first consensus node is not permitted to keep accounts in the local transaction blockchain (because the issuance and reimbursement of electronic invoices is a transaction not expected to be known by a third party and the transaction must be transferred to the first global consensus network for uploading to the second blockchain). Therefore, the request is forwarded to the second consensus node in Branch 2 through the first relay node. If an electronic invoice issuing and circulation transaction uploading request forwarded by an agent node and generated by various servers of the private cloud is received, the request is forwarded to the first consensus node of Branch 3. The first consensus node queries an own permission contract and finds that the first consensus node is not permitted to keep accounts in the local transaction blockchain (because the issuance of electronic invoices and the circulation of electronic invoices are transactions not expected to be known by a third party and the transaction must be transferred to the first global consensus network for uploading to the second blockchain). Therefore, the request is forwarded to the second consensus node in Branch 3 through the first relay node. After the second consensus node of Branches 1-3 records the target transaction to the second blockchain, the second blockchain is unavailable to the outside world, thus improving the uploading security of the target transaction.

General Description of this Embodiment

In one embodiment, a transaction uploading method is provided.

The transaction uploading method is generally applied to service scenarios where transaction data is not expected to be known to the outside world, such as a scenario of electronic tax invoice blockchain system shown in FIG. 2. Transactions not expected to be known to the outside world are referred to as target transactions. This embodiment provides a solution for uniformly executing and recording a local transaction of a first type, which can improve the uploading security of a target transaction. Also, to ensure the true uploading of the target transaction, a verification mechanism is further provided. The transaction uploading method is performed by a first relay node in a blockchain hierarchical consensus network.

Figure 3:
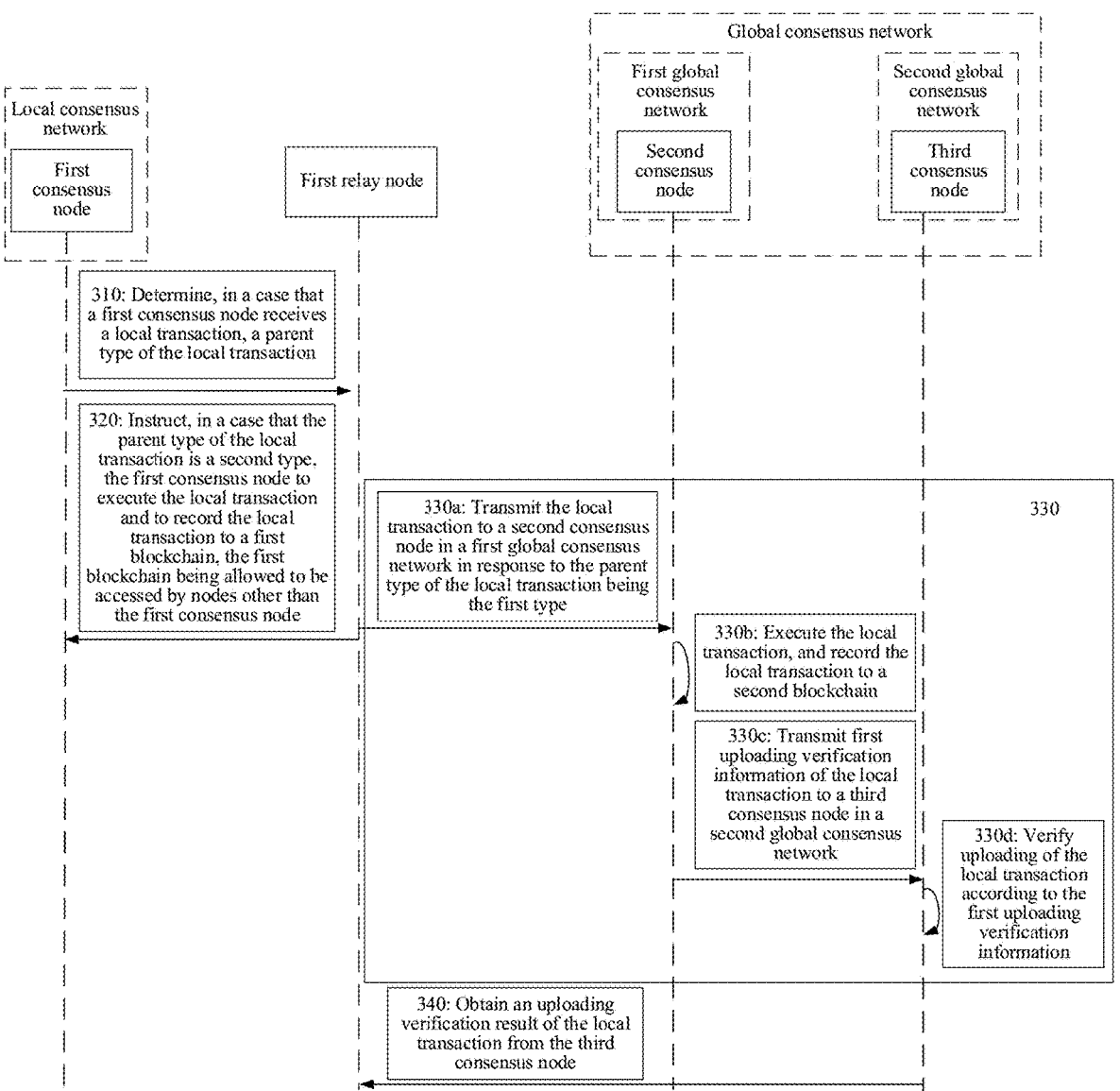
FIG. 3 is a flowchart of a transaction uploading method in one embodiment.

As shown in FIG. 3, the transaction uploading method according to one embodiment of this application may include:

Step 310: Determine, in response to that a first consensus node receives a local transaction, a parent type of the local transaction.

Step 320: Instruct, in response to that the parent type of the local transaction is a second type, the first consensus node to execute the local transaction and to record the local transaction to a first blockchain, the first blockchain being allowed to be accessed by nodes other than the first consensus node.

The nodes other than the first consensus node refer to nodes in a blockchain system other than nodes in a local consensus network, including witness nodes, first relay nodes, second relay nodes, nodes in the first global consensus network, and nodes in the second global consensus network.

In step 320, since the first blockchain is allowed to be accessed by nodes other than the first consensus node, the first consensus node is instructed to execute the local transaction and record the local transaction to the first blockchain in response to that the parent type of the local transaction is a second type, whereby the local transaction may be viewed by any external node.

Step 330: Transmit the local transaction to a second consensus node in response to that the parent type of the local transaction is a first type, the local transaction being used for instructing the second consensus node to execute the local transaction for recording the local transaction to a second blockchain, generating first uploading verification information of the local transaction, and transmitting the first uploading verification information of the local transaction to a third consensus node, the first uploading verification information being used for instructing the third consensus node to verify uploading of the local transaction according to the first uploading verification information to obtain an uploading verification result of the local transaction, and the second blockchain being not accessible by nodes other than the second consensus node.

Step 340: Obtain the uploading verification result of the local transaction from the third consensus node.

Steps 310 to 340 are described in detail below.

In step 310, the first relay node determines a parent type of a local transaction received by the first consensus node in the local consensus network. The parent type is the first type or the second type. The first type refers to a type of transaction not allowed to be known to the outside world. The second type refers to a type of transaction allowed to be known to the outside world.

The first relay node is a module for determining the parent type of the local transaction and forwarding the local transaction of the first type. The first relay node may be a separate device such as a separate computer or server, or a part of the separate device such as a virtual machine partitioned on the server. The local transaction of which the parent type is the first type is referred to in this application as a target transaction.

The first consensus node is located in the local consensus network and is a module for receiving the local transaction, executing the local transaction of the second type, and recording the local transaction to the first blockchain. The first blockchain records the local transaction and can be accessed by nodes other than the first consensus node. The first consensus node may be a separate device such as a separate computer or server, or a part of the separate device such as a virtual machine partitioned on the server.

Step 310 may be divided into an interactive process in which the first consensus node receives the local transaction, the first relay node discovers the local transaction, and the first relay node determines the parent type of the local transaction. The local transaction refers to a local transaction required to be executed by the consensus node and recorded in the blockchain, such as an invoice reimbursement transaction of an enterprise. The parent type of the local transaction is used for indicating whether the local transaction is allowed to be known by a third party. The parent type of the local transaction may be one of the first type (for example, the type of the invoice reimbursement transaction is the first type) or the second type (for example, a weather information transaction). The local transaction of the first type is required to be executed by a consensus node (for example, a second consensus node below) and recorded to a blockchain inaccessible to the outside world. The local transaction of the second type is required to be executed by a consensus node (for example, the first consensus node) and recorded to a blockchain accessible by the outside world.

In some embodiments, the setting of a determination period of the parent type of the local transaction includes the following cases:

(1) After it is found that the first consensus node receives a local transaction, a parent type of the local transaction is immediately determined.

(2) According to a determination period preset by the first relay node, after it is found that a local transaction exists in the first consensus node and when the determination period has passed, a parent type of the local transaction is immediately determined. For example, the determination period preset by the first relay node is 1 hour. If it is found that the time when the first consensus node receives the local transaction is 7:00 am on a day, the parent type of the local transaction is determined at 8:00 am on the same day.

In some embodiments, the manner in which the parent type of the local transaction is determined includes, but is not limited to, the following manners:

(1) After it is found that the first consensus node receives a local transaction, a first key field is extracted from the content of the local transaction, and a field-to-parent type comparison table is searched according to the first key field to determine a parent type of the local transaction. The following is an example of the field-to-parent type comparison table:

TABLE 1

| First key field | Parent type |
|---|---|
| Invoice | First type |
| Resource | First type |
| Weather | Second type |

As shown in Table 1, when the first key field is invoice, the local transaction is not allowed to be exposed to the outside world. Therefore, it is determined that the parent type of the local transaction is the first type. When the first key field is resource, the local transaction is also not allowed to be exposed to the outside world. Therefore, it is determined that the parent type of the local transaction is the first type. When the first key field is weather, the local transaction is allowed to be exposed to the outside world. Therefore, it is determined that the parent type of the local transaction is the second type.

For example, the content of a local transaction includes "Reimbursement of electronic invoice 0001: amount 500 for accommodation", which includes the first key field of "Invoice". Therefore, it is determined that the parent type of the local transaction is the first type. For example, the local transaction is "100 first resources are converted into 10 second resources", which includes the first key field of "Resource". Therefore, it is determined that the parent type of the local transaction is the first type. For another example, the local transaction is "Weather 10001: sunny on a certain day", which includes the first key field of "Weather". Therefore, it is determined that the parent type of the local transaction is the second type.

(2) After it is found that the first consensus node receives a local transaction, a type identifier is obtained from the content of the local transaction, and a parent type of the local transaction is determined according to the type identifier.

The type identifier is divided into two cases. In one case, the type identifier represents the first type by characters. For example, "1", as the type identifier, represents the first type, and "0", as the type identifier, represents the second type. In the other case, the first type or the second type is directly used as the type identifier.

For example, the content of a local transaction includes "Reimbursement of electronic invoice 0001: amount 500 for accommodation, [first type]". It is determined, according to "[first type]" included in the content, that the parent type of the local transaction is the first type. For another example, the content of a local transaction includes "Reimbursement of electronic invoice 0001: amount 500 for accommodation, [1]". It is determined, according to "[1]" included in the content, that the parent type of the local transaction is the first type.

After step 310 determines the parent type of the local transaction, there are two cases. In the first case, if it is determined that the parent type of the local transaction is the second type, step 320 is performed. In the second case, if it is determined that the parent type of the local transaction is the first type, step 330 is performed.

The first case generated after step 310 is described first.

In step 320, in response to determining that the parent type of the local transaction is the second type, the local transaction is executed by the first consensus node and recorded to the first blockchain.

A common service smart contract (such as an order smart contract below) runs on the first consensus node, and the service logic is publicly reflected in contract code. A local transaction interacting with the common service smart contract is executed on the first consensus node, and execution results are also recorded on the first blockchain maintained by the first consensus node. Furthermore, these execution results may also be transmitted back to the second global consensus network in the global consensus network through the first relay node.

For example, it is assumed that the local transaction of the second type is "Order 10001: purchase 50 office supplies". Then the first consensus node invokes the order smart contract to execute the local transaction, and the execution result is "Completed: order 10001: purchase 50 office supplies". The execution result is recorded on the first blockchain by the first consensus node, and all nodes other than the first consensus node may access the first blockchain.

The specific process of recording the local transaction to the first blockchain mentioned above is as follows:

Generally, the witness node generates a local transaction based on an operation behavior of an object, and transmits the local transaction and a digital signature of the witness node to the neighboring first consensus node on the local consensus network, which is convenient for the first consensus node to verify the authenticity of the local transaction. During verification, the first consensus node verifies the digital signature by using a public key of the witness node to obtain a first digest value of the local transaction, performs digest calculation on the local transaction according to a digest algorithm to obtain a second digest value of the local transaction, and compares the first digest value with the second digest value. If the first digest value and the second digest value are the same, the verification is successful, and the local transaction is a real transaction generated by the witness node.

After the verification is successful, the local transaction and other local transactions transmitted by the witness node are accumulated. When the accumulation reaches a certain degree (for example, the number of accumulated transactions reaches a certain threshold, or the accumulation time reaches a certain threshold), these local transactions are packaged into a block and transmitted to other first consensus nodes in the local consensus network for consensus. After the consensus is successful, each first consensus node records the block to the first blockchain maintained by the first consensus node.

The second case generated after step 310 is described next.

With continued reference to FIG. 3, step 330 may be divided into the following steps:

Step 330*a* (performed by the first relay node): Transmit the local transaction to the second consensus node in the first global consensus network in response to the parent type of the local transaction being the first type.

Step 330*b* (performed by the second consensus node): Execute the local transaction, and record the local transaction to the second blockchain.

Step 330*c* (performed by the second consensus node): Transmit first uploading verification information of the local transaction to the third consensus node in the second global consensus network.

Step 330*d* (performed by the third consensus node): Verify uploading of the local transaction according to the first uploading verification information.

Steps 330*a* to 330*d* are described in detail below.

In step 330*a*, after the first relay node determines that the parent type of the local transaction is the first type, since the target transaction is a transaction not expected to be accessed and known by a third party, the consent of an object that generates the target transaction shall be sought before the target transaction is uploaded. Specifically, an inquiry box may be displayed to the object to inquire whether the object agrees to upload the target transaction. If the object does not agree, this implementation cannot be implemented, or only the part of the transaction agreed to be uploaded is uploaded.

Then, the local transaction is transmitted to the second consensus node in the first global consensus network.

After the first relay node determines that the parent type of the local transaction is the first type, the local transaction is required to be executed and recorded to the second blockchain inaccessible to the outside world. Therefore, the local transaction is required to be executed by the second consensus node.

The second consensus node is located in the first global consensus network and is a module for receiving and executing the local transaction of the first type, and recording the local transaction to the second blockchain. The second blockchain is not accessible by nodes other than the second consensus node, thus ensuring the uploading security of the target transaction. The second consensus node may be a separate device such as a separate computer or server, or a part of the separate device such as a virtual machine partitioned on the server.

In step 330*b*, the specific process of executing the local transaction by the second consensus node and recording the local transaction to the second blockchain may be referred to the specific process of executing the local transaction by the first consensus node and recording the local transaction to the first blockchain.

After the second consensus node records the local transaction to the second blockchain, in order to verify that the second consensus node actually uploads the local transaction, the second consensus node also generates first uploading verification information.

In step 330*c*, the first uploading verification information is transmitted to the third consensus node in the second global consensus network by the second consensus node.

In step 330*d*, the third consensus node is located in the second global consensus network and is a module for receiving and verifying according to the first uploading verification information. The third blockchain maintained by the third consensus node is accessible by nodes other than the third consensus node. When the third consensus node verifies the first uploading verification information, the third consensus node runs and deploys a target state verification smart contract. In the contract, a verification code for the first uploading verification information transmitted by the first global consensus network is maintained. The third consensus node may be a separate device such as a separate computer or server, or a part of the separate device such as a virtual machine partitioned on the server.

Next, after step 330, in step 340, the first relay node obtains an uploading verification result of the local transaction from the third consensus node.

In an embodiment, step 340 includes an interactive process in which the first relay node obtains the uploading verification result from the third consensus node and the first relay node transmits the uploading verification result to the local consensus network. Through the uploading verification result, it is known that the local transaction of the first type has been uploaded successfully.

Through steps 310 to 340, according to This embodiment, the global consensus network is divided into a second global consensus network and a first global consensus network, the local consensus network can synchronize information of the second global consensus network, and the local transaction in the local consensus network can be transmitted back through the first relay node, thus realizing the secure uploading of the target transaction. That is, the local transaction is executed and recorded in the first global consensus network, and the uploading verification result is confirmed in the second global consensus network. The specific calculation process, calculation logic, and intermediate results are all completed in the first global consensus network. In the meantime, the consensus of the first global consensus network and the verification in a main blockchain may effectively use the characteristics of blockchain non-tampering to ensure the correctness and credibility of transactions.

The above is the general description of steps 310 to 340. Since steps 320 and 330*b* have been detailed in the above general description, specific implementations of steps 330*a*, 330*c* to 330*d*, and 340 will be described in detail below.

Detailed Description of Step 330*a*

In step 330*a*, the first relay node transmits the local transaction to the second consensus node in the first global consensus network after determining that the parent type of the local transaction is the first type.

In some embodiments, the setting of a transmitting period of the local transaction includes the following cases:

(1) The local transaction is transmitted immediately after it is determined that the parent type of the local transaction is the first type.

(2) According to a first transmitting period preset by the first relay node, after it is determined that the parent type of the local transaction is the first type and when the first transmitting period has passed, the local transaction is transmitted. For example, the first transmitting period preset by the first relay node is 2 hours. If it is determined that the time when the parent type of the local transaction is the first type is 7:00 pm on a day, the time when the local transaction is transmitted is 9:00 pm on the same day.

For the decomposition of step 330*a*, this embodiment provides three decomposition modes. Each decomposition mode expands the detailed description of step 330*a* from different perspectives. The first decomposition mode is described first.

Referring to the above description of the transmitting period of the local transaction, the manner of whether the local transaction is immediately transmitted or transmitted after the first transmitting period has passed is equivalent to establishing a connection with the first global consensus network every time a local transaction of a first type is encountered. Therefore, the overhead is too large. In order to reduce the overhead and reduce the network resource loss, in one embodiment, queuing may be performed first, and packaging and transmitting may be performed once when predetermined conditions are satisfied.

In this embodiment, for the local transaction of the first type, the local transaction is transmitted to the second consensus node to instruct the second consensus node to record the local transaction to the second blockchain. Since the second blockchain is not allowed to be accessed by nodes other than the second consensus node, the security of the local transaction of the first type is guaranteed. In the meantime, after completing the uploading of the local transaction, the second consensus node transmits the first uploading verification information after the uploading to the third consensus node. The third consensus node performs uploading verification to obtain an uploading verification result, and the uploading verification result is obtained from the third consensus node, thus ensuring that the uploading of the local transaction is authentic although the local transaction cannot be viewed by the outside world, thereby improving the uploading security of the local transaction.

In some embodiments, the first consensus node belongs to a local consensus network. The second consensus node belongs to the first global consensus network in global consensus networks. The third consensus node belongs to a second global consensus network in the global consensus networks. The first relay node is configured to transmit the local transaction of the first type to the second consensus node in the first global consensus network.

According to this embodiment, the global consensus network is divided into a second global consensus network and a first global consensus network, the local consensus network can synchronize information of the second global consensus network, and the local transaction in the local consensus network can be transmitted back through the first relay node, thus realizing the secure uploading of the local transaction of the first type. That is, the local transaction is executed and recorded in the first global consensus network, and the uploading verification result is confirmed in the second global consensus network. The specific calculation process, calculation logic, and intermediate results are all completed in the first global consensus network. In the meantime, the consensus of the first global consensus network and the verification in a main blockchain may effectively use the characteristics of blockchain non-tampering to ensure the correctness and credibility of transactions. This embodiment improves the uploading security of the target transaction in the blockchain hierarchical consensus system. This embodiment may be applied to various scenarios such as blockchain, structured information processing, and security technology.

Figure 4:
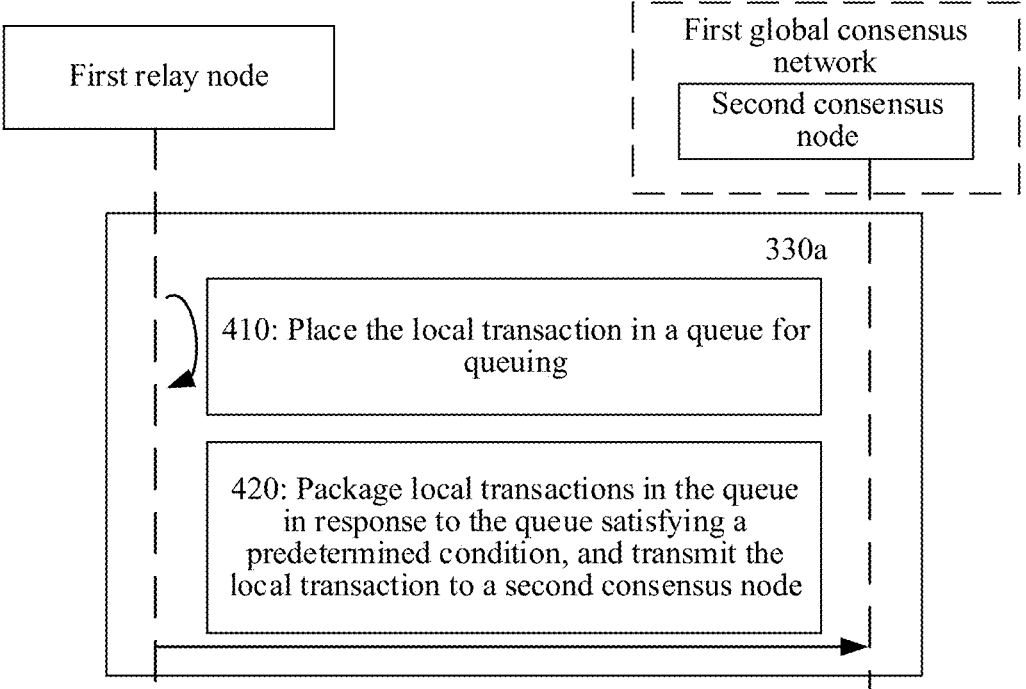
FIG. 4 shows a flowchart of packaging and transmitting using a queue in step 330a of FIG. 3.

When this embodiment is specifically implemented, referring to FIG. 4, step 330*a* (performed by the first relay node) specifically includes the following steps:

Step 410: Place the local transaction in a queue for queuing.

Step 420: Package local transactions in the queue in response to the queue satisfying a predetermined condition, and transmit the local transaction to the second consensus node.

Steps 410 to 420 are described in detail below.

In step 410, a queue is provided in the first relay node. The queue is a transaction storage container for storing local transactions. Each time the first relay node determines that the parent type of a local transaction is the first type, the local transaction is placed in a queue for queuing.

There are generally two modes of placement in the queue.
(1) The local transaction is directly placed at the tail of the queue.
(2) A position of the local transaction to be inserted in the queue is determined first. The position of the local transaction to be inserted in the queue is referred to as a target position. The local transaction at the target position and the local transaction behind the target position are moved backward, and then the local transaction is placed at the target position of the queue.

In step 420, the first relay node packages local transactions in the queue in response to the queue satisfying a predetermined condition, and transmits the local transaction to the second consensus node.

The predetermined condition includes at least one of the following: the number of local transactions reaches a first threshold, and a time difference between a current time and a previous packaging time reaches a second threshold. For example, the first relay node packages local transactions in the queue in response to the number of local transactions in the queue reaching the first threshold, and transmits the local transaction to the second consensus node. For example, the first relay node packages local transactions in the queue in response to the time difference between the current time and the previous packaging time reaching the second threshold, and transmits the local transaction to the second consensus node. For another example, the first relay node packages local transactions in the queue in response to the number of local transactions in the queue reaching the first threshold and the time difference between the current time and the previous packaging time reaching the second threshold, and transmits the local transaction to the second consensus node.

In this embodiment, all the local transactions of the first type are placed in the same queue for packaging and transmitting, thereby improving the packaging efficiency.

Under the predetermined condition, if only the number reaches the first threshold, the timeliness of packaging and transmitting will be affected, resulting in some local transactions not being uploaded for a long time. If only the time difference reaches the second threshold, although the timeliness is guaranteed, the number of packages per packaging time may be too small, thus wasting network resources. Similarly, if the number reaches the first threshold and the time difference reaches the second threshold at the same time, there is a possibility that the time difference has met the second threshold, but the number cannot reach the first threshold all the time, which still affects the timeliness of packaging and transmitting. Therefore, in some embodiments, step 420 specifically includes:

packaging local transactions in the queue in response to the number of local transactions in the queue reaching a first threshold.

In this embodiment, the number of local transactions is determined as the condition for packaging, thereby avoiding too few packages each packaging time and wasting network resources.

In some embodiments, step 420 further specifically includes: determining a time difference between a current time and a previous packaging time in response to the number of local transactions in the queue not reaching a first threshold; and packaging local transactions in the queue in response to the time difference reaching a second threshold.

In this embodiment, the number and the time difference are combined, so that the number of packages per packaging time is not too small and the network resources are wasted. Timeliness is considered, thus avoiding the situation that some local transactions cannot be uploaded for a long time.

Figure 5:
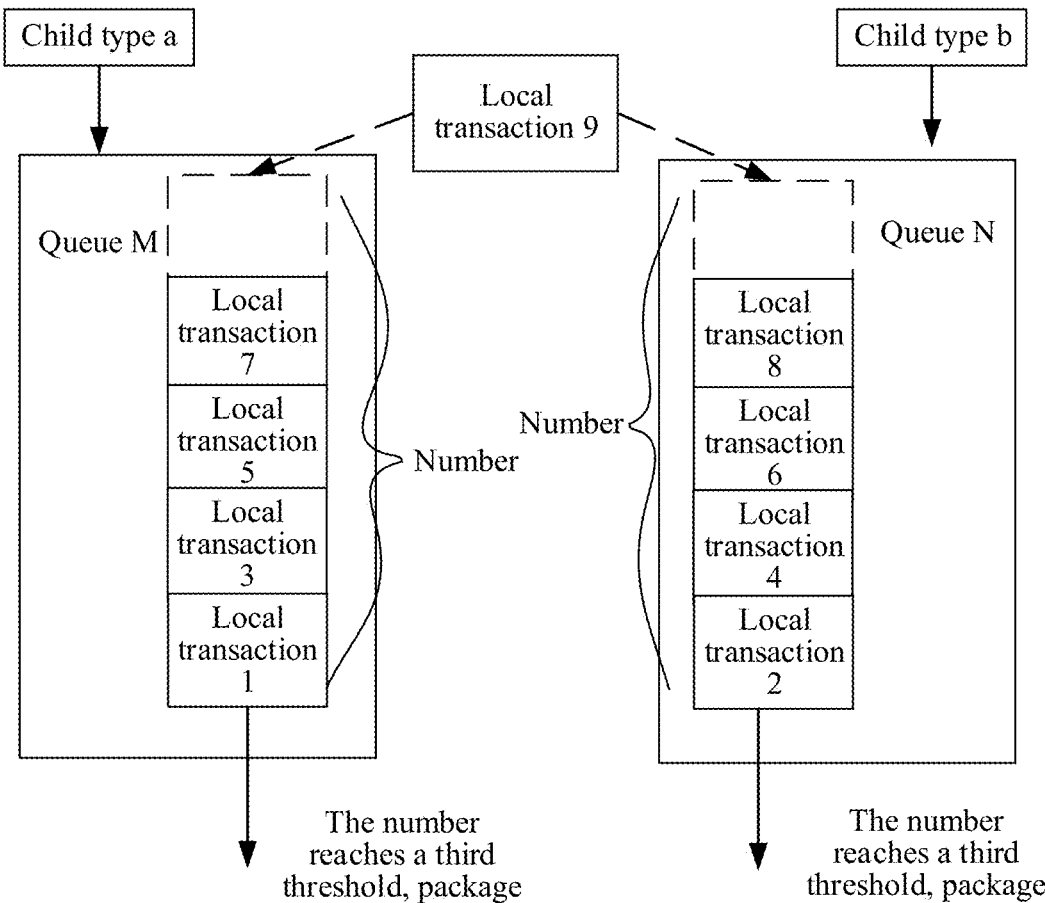
FIG. 5 shows a schematic diagram of packaging and transmitting using queues to which different child types belong according to an embodiment of this application.

Since the child types of the local transaction of the first type are not the same, the local transactions of the same child type are packaged into a packet and uploaded together, which is helpful to the uploading efficiency of the first global consensus network. Therefore, in other embodiments, each child type corresponds to a respective queue so that local transactions of the same child type are placed in the same queue. For example, two queues: M and N are shown in FIG. 5. Queue M is configured to store local transactions of child type a. Queue N is configured to store local transactions of child type b.

In a specific implementation of this embodiment, step 410 includes: determining a child type of the local transaction of the first type; determining a queue corresponding to the child type of the local transaction; and placing the local transaction in the queue corresponding to the child type for queuing.

With continued reference to FIG. 5, local transactions 1 to 8 have been placed in corresponding queues according to child types. That is, local transactions 1, 3, 5, and 7 of child type a are placed in queue M, and local transactions 2, 4, 6, and 8 of child type b are placed in queue N. When local transaction 9 is required to be placed in the queue, the child type of local transaction 9 is determined first. If the child type of local transaction 9 is a, the local transaction is placed at the tail of queue M (at the dashed box of queue M shown in FIG. 5). If the child type of local transaction 9 is b, the local transaction is placed at the tail of queue N (at the dashed box of queue N shown in FIG. 5).

In this embodiment, local transactions of the same child type are packaged and transmitted. The second consensus node may use a target smart contract of the same child type (the target smart contract or target contract refers to a smart contract for uploading a target transaction of a certain child type, which contains code for uploading the target transaction of the child type) to uniformly execute the local transactions, thus reducing the re-invocation of the target smart contracts of different child types for execution, and improving the execution efficiency. For example, the second consensus node receives a packaged local transaction. All the local transactions are executed by using a target smart contract T. Then the second consensus node may process all the local transactions by using the target smart contract T, thus alleviating the problem that the processing efficiency of the second consensus node is reduced because the target smart contract needs to be replaced many times.

Step 420 includes: packaging, in response to the number of local transactions in a queue reaching a third threshold, local transactions in the queue. Taking local transaction 9 placed in queue M as an example, after local transaction 9 is placed, the number of local transactions in queue M reaches a third threshold (for example, the third threshold is 5), and the local transactions in queue M are packaged and transmitted to the second consensus node.

In this embodiment, the number of local transactions is determined as the condition for packaging, thereby avoiding too few packages each packaging time and wasting network resources.

The above is the detailed description of the first decomposition mode of step 330*a*, and the second decomposition mode will be described next.

When step 330*a* is decomposed into steps 410 to 420, local transactions are directly placed in a queue for queuing. However, for some local transactions to be urgently uploaded, if the local transactions are directly placed in the queue, the urgent uploading requirements of different local transactions cannot be met. Therefore, in an embodiment, in step 330*a*, the local transaction with high priority is first transmitted to the first global consensus network for uploading in combination with the priority of the local transaction, so as to meet the urgent uploading requirement.

Figure 6:
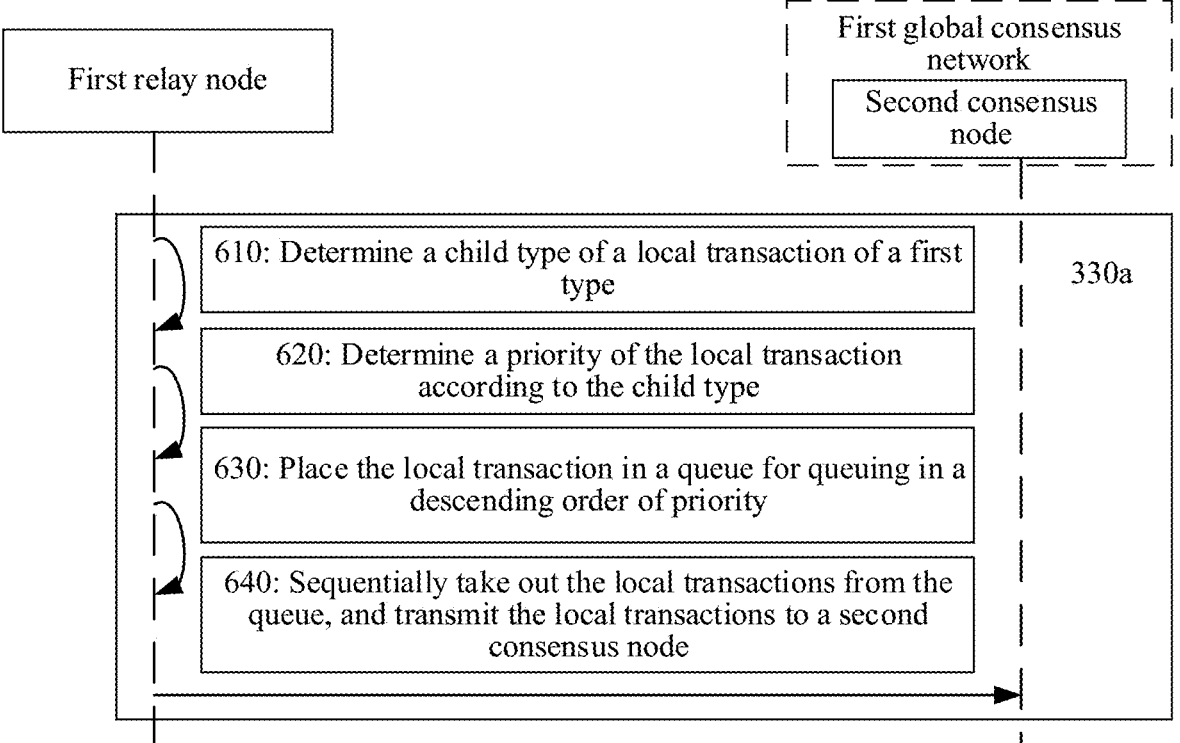
FIG. 6 shows a flowchart of packaging and transmitting using a priority and a queue in step 330a of FIG. 3.

When this embodiment is specifically implemented, referring to FIG. 6, step 330*a* (performed by the first relay node) includes the following steps:

Step 610: Determine a child type of the local transaction of the first type.

Step 620: Determine a priority of the local transaction according to the child type.

Step 630: Place the local transaction in a queue for queuing in a descending order of priority.

Step 640: Sequentially take out the local transactions from the queue, and transmit the local transactions to the second consensus node.

Steps 610 to 640 are described in detail below.

In step 610, the first relay node determines a child type of the local transaction of the first type.

Before explaining the child types, it is emphasized again that the parent type of the local transaction is used for indicating whether the local transaction is required to be executed and recorded on the blockchain inaccessible by the outside world. Therefore, the local transaction of the first type indicates that the local transaction is required to be executed and recorded on the blockchain inaccessible to the outside world (that is, executed by the second consensus node and recorded on the second blockchain). Unlike the first type, the child type refers to a transaction type of the local transaction. For example, if the local transaction is an invoice reimbursement transaction, the transaction type of the invoice reimbursement transaction is an invoicing type, and therefore, the child type is an invoicing type. For example, if the local transaction is an enterprise purchase transaction, the transaction type of the enterprise purchase transaction is an order type, and therefore, the child type is an order type. If the child type is the invoicing type, the first relay node determines a priority corresponding to the invoicing type, so as to reflect an urgent uploading demand of an enterprise invoicing transaction with the child type as the invoicing type according to the priority.

In some embodiments, the manner in which the child type of the local transaction of the first type is determined includes, but is not limited to, the following manners:

(1) A second key field is extracted from the content of the local transaction of the first type, and a second key field-to-child type comparison table is searched according to the second key field to determine a child type of the local transaction. The following is an example of the second key field-to-child type comparison table:

TABLE 2

| Second key field | Child type |
| --- | --- |
| Reimbursement | Invoice reimbursement type |
| Invoice query | Invoice query type |
| Invoicing | Invoicing type |
| Resource exchange | Resource exchange type |
| Resource transfer | Resource transfer type |
| Resource statistics | Resource statistics type |

As shown in Table 2, for the second key fields included in the local transaction, which are reimbursement, invoice query, and invoicing, it is determined that the child types of the local transaction are an invoice reimbursement type, an invoice query type, and an invoicing type. Similarly, when the second key fields included in the local transaction are resource exchange, resource transfer, and resource statistics, it is determined that the child types of the local transaction are a resource exchange type, a resource transfer type, and a resource statistics type.

In Table 1, the first key field is used for determining whether the parent type of the local transaction is the first type or the second type, while in Table 2, the child type is determined according to the second key field based on determining that the local transaction is the first type.

For example, the content of a local transaction includes "Electronic invoice reimbursement 0001: amount 500 for accommodation", which includes the first key field of "Invoice". Therefore, it is determined that the parent type of the local transaction is the first type, and it is determined that the child type is the invoice reimbursement type according to the included second key field "Reimbursement". For example, the local transaction is "Resource exchange, 100 first resources are converted into 10 second resources", which includes the first key field of "Resource". Therefore, it is determined that the parent type of the local transaction is the first type, and it is determined that the child type is the resource exchange type according to the included second key field "Resource exchange".

(2) After it is found that the first consensus node receives a local transaction, a child type identifier is obtained from the content of the local transaction, and a child type of the local transaction is determined according to the child type identifier.

For example, the content of a local transaction includes "Electronic invoice reimbursement 0001, amount 500 for accommodation, [invoice reimbursement type]". It is determined, according to the type identifier "[invoice reimbursement type]", that the child type is the invoice reimbursement type.

After determining the child type, in step 620, the manner of determining the priority according to the child type includes: determining the priority by looking up a child type-to-priority comparison table.

The child type-to-priority comparison table lists a corresponding relationship between child types and priorities. The following is an example of the child type-to-priority comparison table:

TABLE 3

| Child type | Priority |
| --- | --- |
| Invoice reimbursement type | 10 |
| Invoice query type | 9 |
| Invoicing type | 8 |
| Resource exchange type | 7 |
| Resource transfer type | 6 |
| Resource statistics type | 5 |

As shown in Table 3, for transactions with the child type being the invoice reimbursement type, the demand for urgent uploading of invoice reimbursement transactions is high. Therefore, the priority is set to 10. Similarly, according to different degrees of demand of each child type for emergency uploading, the priority of the invoice query type is 9, the priority of the Invoicing type is 8, the priority of the resource exchange type is 7, the priority of the resource transfer type is 6, and the priority of the resource statistics type is 5.

For example, the content of a local transaction includes "Electronic invoice reimbursement 0001, amount 500 for accommodation". If it is determined that the child type is the invoice reimbursement type, the priority is 10. For example, the local transaction is "100 first resources are exchanged with 10 second resources". If it is determined that the child type is the resource exchange type, the priority is 7.

After the priority is determined, in step 630, the first relay node places the local transaction in a queue for queuing in a descending order of priority.

Figure 7:
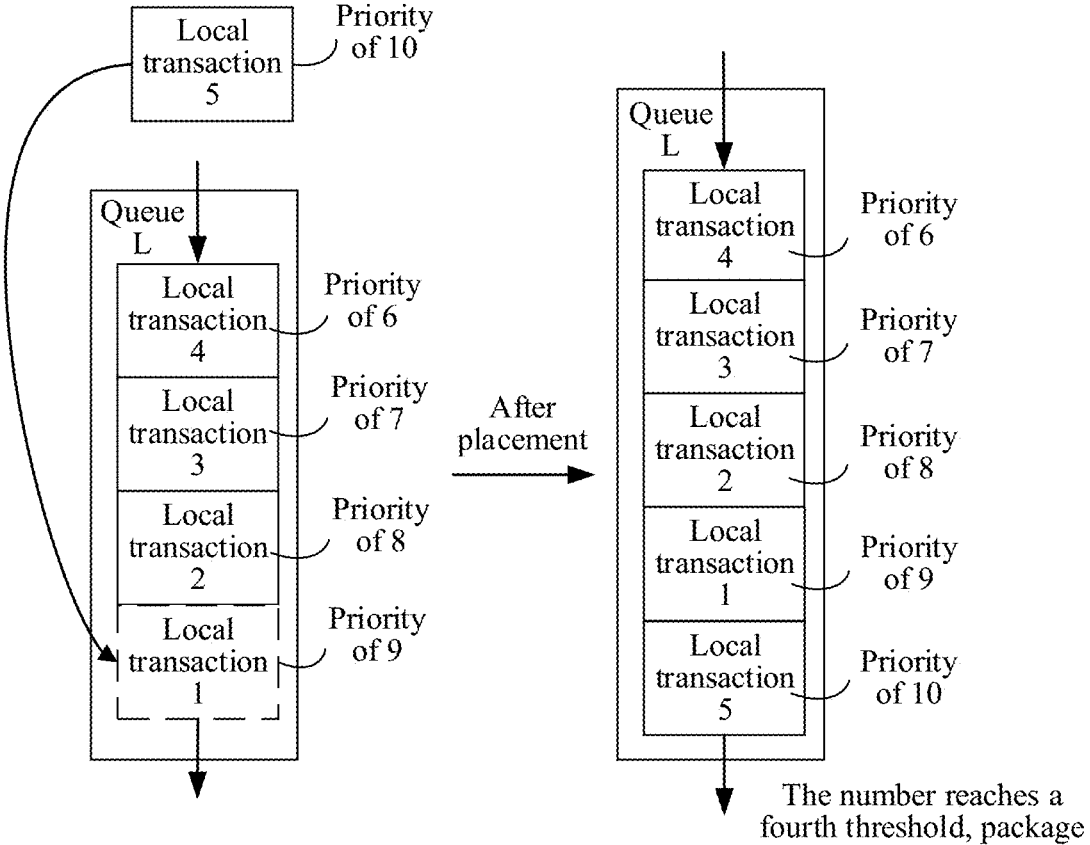
FIG. 7 shows a schematic diagram of packaging and transmitting using a priority and a queue in FIG. 6.

Reference is made to FIG. 7. Queue L before local transaction 5 is placed and queue L after local transaction 5 is placed are shown in FIG. 7. Before local transaction 5 is placed in queue L, local transactions 1 to 4 are already stored in queue L, and the priorities of local transactions 1 to 4 are 9, 8, 7, and 6 in sequence. When a local transaction is required to be placed in queue L, the priority of the local transaction is first determined as 10, and a target position at which local transaction 5 is placed in queue L is determined in a descending order of priority. That is, the target position is the dotted box of queue L shown on the left side of FIG. 7. Local transaction 1 at the target position and local transactions 2 to 4 behind the target position are moved backward, and then local transaction 5 is placed at the target position of the queue. The placement result is queue L shown on the right side of FIG. 7.

In step 640, the local transactions are sequentially taken out from the queue, and transmitted to the second consensus node.

The manner of taking out the local transactions from the queue in step 640 includes:

(1) Referring to FIG. 7, if it is determined that the number of local transactions in the queue reaches a fourth threshold, the local transactions are sequentially taken out from the queue, packaged, and transmitted to the second consensus node in the first global consensus network.

(2) If it is determined that the time difference between the current time and the previous packaging time reaches a fifth threshold, the local transactions are sequentially taken out from the queue, packaged, and transmitted to the second consensus node in the first global consensus network.

By steps 610 to 640, urgent uploading demands of the target transaction are met according to the priority, and the uploading flexibility is improved.

The above is the detailed description of the second decomposition mode of step 330a, and the third decomposition mode will be described next.

When step 330a is expanded into steps 410 to 420 by the first decomposition mode, or step 330a is expanded into steps 610 to 640 by the second decomposition mode, the first relay node only transmits the local transaction to the second consensus node. That is, the second consensus node cannot determine whether the received local transaction is a real transaction generated by the first relay node, and the security is low. Therefore, in some embodiments, in step 330a, the second consensus node in step 330b can ensure that the local transaction is a real transaction transmitted by the first relay node in combination with signature verification of the first relay node, thus improving the security.

Figure 8:
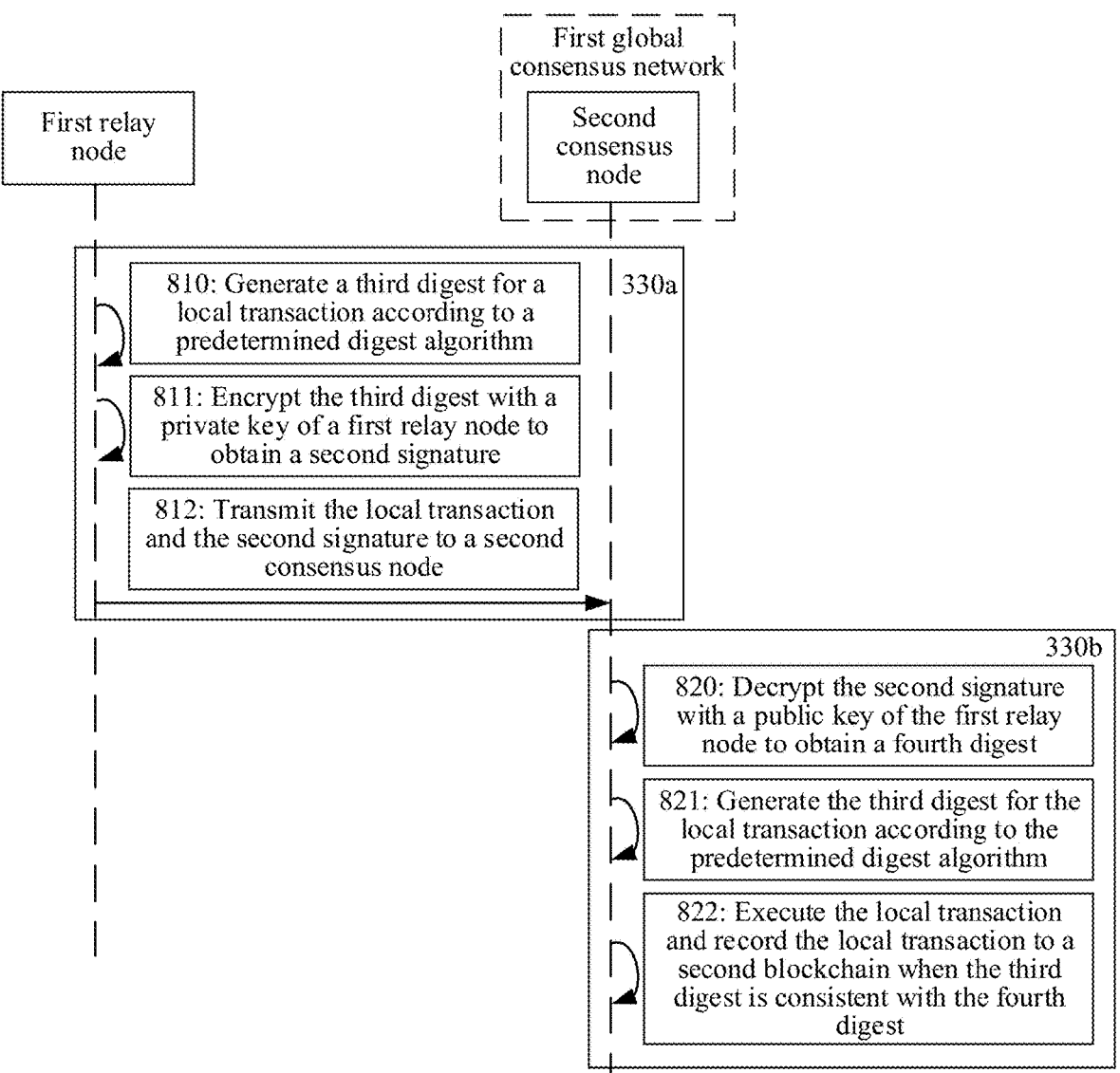
FIG. 8 shows a schematic diagram of signature verification using a digest algorithm in steps 330a and 330b of FIG. 3.

When this embodiment is specifically implemented, referring to FIG. 8, step 330a (performed by the first relay node) includes the following steps:

Step 810: Generate a third digest for the local transaction according to a predetermined digest algorithm.

Step 811: Encrypt the third digest with a private key of the first relay node to obtain a second signature.

Step 812: Transmit the local transaction and the second signature to the second consensus node.

Correspondingly, step 330b (performed by the second consensus node) includes the following steps:

Step 820: Decrypt the second signature with a public key of the first relay node to obtain a fourth digest.

Step 821: Generate a third digest for the local transaction according to a predetermined digest algorithm.

Step 822: Execute the local transaction and record the local transaction to the second blockchain when the third digest is consistent with the fourth digest.

Steps 810 to 812 and steps 820 to 822 are described in detail below.

In steps 810 to 812, the signing process includes: digesting a to-be-signed subject with a digest algorithm (for example, a hash algorithm) and then encrypting the digest with a private key (or public key) of a signer. Different signature algorithms may be reflected in different digest algorithms. Therefore, when the first relay node generates the second signature, the third digest of the local transaction is obtained using the predetermined digest algorithm, and the third digest is encrypted with the private key of the first relay node.

In steps 820 to 822, the process of verifying the signature includes that a signature verifier decrypts the signature with the public key (or private key) of the signer, and then generates a digest for the to-be-signed subject with the same digest algorithm as the signature process. If the decrypted digest is the same as the generated digest, the signature verification is successful. Therefore, when the second consensus node performs signature verification, the public key of the first relay node is used for decrypting the second signature to obtain the third digest, the same predetermined digest algorithm is used for generating the fourth digest for the local transaction, and the third digest is compared with the fourth digest. If the third digest is consistent with the fourth digest, the verification of the second signature is successful.

Figure 10:
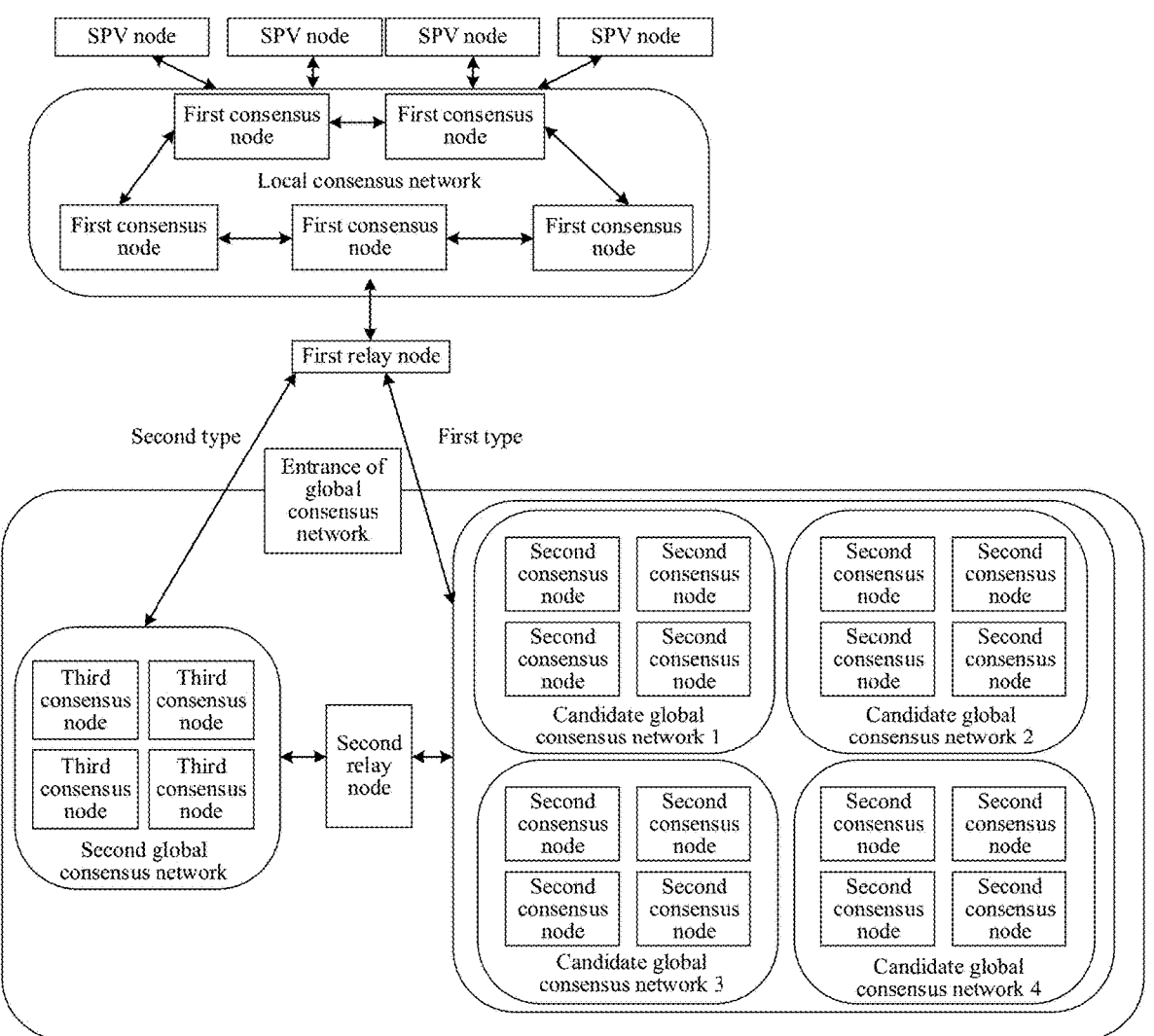
FIG. 10 shows an architectural diagram of a case where multiple first global consensus networks exist in a blockchain network according to an embodiment of this application.

The above is a general description of three decomposition modes of step 330a. In the above decomposition modes, the first relay node transmits the local transactions of the first type to the same first global consensus network based on the global consensus network including a second blockchain (as shown in FIG. 1C). However, in another embodiment, the first global consensus network is selected from multiple candidate global consensus networks (multiple candidate global consensus networks as shown in FIG. 10), and the candidate global consensus networks correspond to child types of different local transactions. For example, there is a first global consensus network for processing transactions with child types being the invoicing type and a first global consensus network for processing transactions with child types being the order type, which is helpful to improve the uploading efficiency of transactions.

Figure 9:
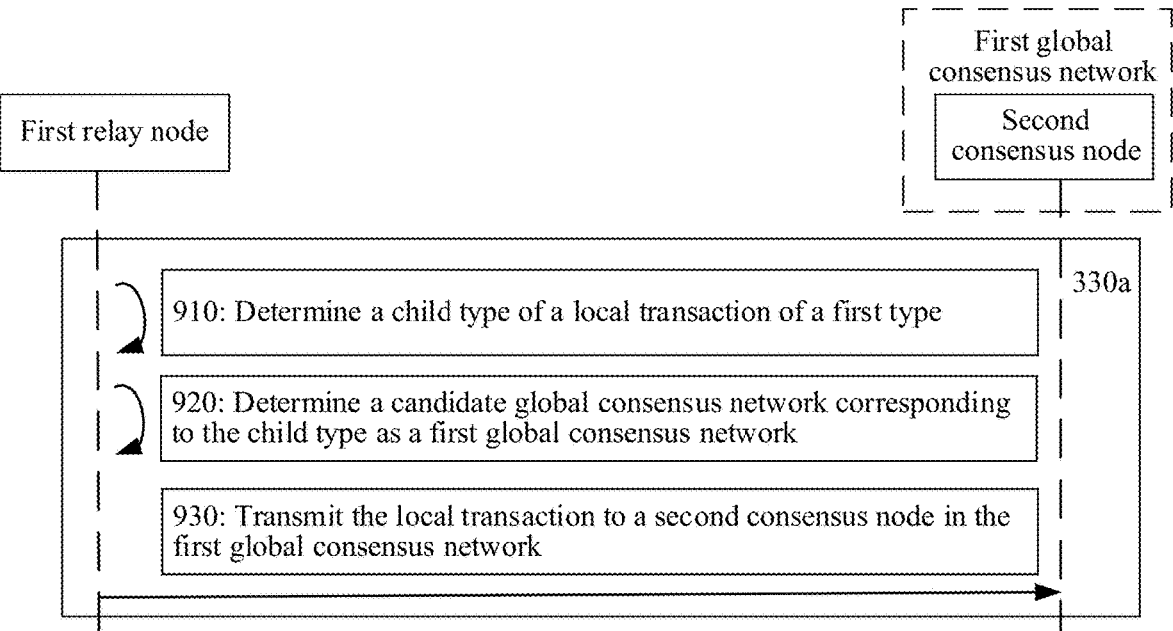
FIG. 9 shows a schematic diagram of selecting a first global consensus network using a child type in step 330a of FIG. 3.

When this embodiment is specifically implemented, referring to FIG. 9, step 330a (performed by the first relay node) specifically includes the following steps:

Step 910: Determine a child type of the local transaction of the first type.

Step 920: Determine a candidate global consensus network corresponding to the child type as the first global consensus network.

Step 930: Transmit the local transaction to the second consensus node in the first global consensus network.

Steps 910 to 930 are described in detail below.

In step 910, the definition of the child type and the manner in which the child type is determined have been described in step 610.

In step 920, as shown in FIG. 10, multiple candidate global consensus networks are included in the global consensus network (FIG. 10 shows only four candidate global consensus networks, but there may be less than or greater than four candidate global consensus networks). Each candidate global consensus network corresponds to a child type.

According to the target smart contract demands of the child type, a child type-to-first global consensus network comparison table is made in advance, as shown in the following table:

TABLE 4

| Child type | First global consensus network |
|---|---|
| Invoice reimbursement type | Candidate global consensus network 1 |
| Invoicing type | Candidate global consensus network 2 |
| Resource exchange type | Candidate global consensus network 3 |
| Resource statistics type | Candidate global consensus network 4 |

As shown in Table 4, the child types of the local transaction may be an invoice reimbursement type, an Invoicing type, a resource exchange type, and a resource statistics type. For the invoice reimbursement type, a target smart contract for reimbursement is needed. Therefore, candidate global consensus network 1 is selected as the first global consensus network, and candidate global consensus network 1 uniformly invokes the target smart contract for reimbursement to execute the local transaction of the invoice reimbursement type. For transactions of the Invoicing type, a target smart contract for invoicing is needed. Therefore, candidate global consensus network 2 is selected as the first global consensus network, and candidate global consensus network 2 uniformly invokes the target smart contract for invoicing to execute the local transaction of the Invoicing type. Similarly, for the resource exchange type, candidate global consensus network 3 uniformly invokes a target smart contract for exchange to execute the local transaction with the child type being the resource exchange type. Similarly, for the resource statistics type, candidate global consensus network 4 uniformly invokes a target smart contract for statistics to execute the local transaction with the child type being the resource statistics type.

After the comparison table is made, the comparison table may be looked up according to the child type to determine the first global consensus network.

After determining the first global consensus network, the first relay node transmits the local transaction to the second consensus node in the first global consensus network in step 930.

If the child type is the invoice reimbursement type, the first global consensus network is candidate global consensus network 1. The first relay node transmits the local transaction to the second consensus node in candidate global consensus network 1. The second consensus node invokes the target smart contract of reimbursement to execute the local transaction, and records the local transaction to the second blockchain in candidate second blockchain 1.

The specific process of executing the local transaction by the second consensus node and recording the local transaction to the second blockchain may be referred to the description of executing the local transaction of the second type by the first consensus node and recording the local transaction to the first blockchain in the above embodiment. However, the difference is that the first blockchain can be accessed by nodes other than the first consensus node, while the second blockchain is not accessible by nodes other than the second consensus node.

According to the embodiments of steps 910 to 930, the local transactions of the same child type are effectively transmitted to the same candidate global consensus network through the comparison relationship between the child type and the first global consensus network, whereby the candidate second blockchain can uniformly invoke the target smart contract of the same type to execute the local transaction, and the processing efficiency of the first global consensus network in processing the local transaction is improved.

The above is the detailed description of step 330*a*.
Detailed Descriptions of Steps 330*c* to 330*d*

In step 330*c*, the second consensus node transmits the first uploading verification information of the local transaction to the third consensus node in the second global consensus network. In step 330*d*, the third consensus node verifies uploading of the local transaction according to the first uploading of verification information.

The execution link of the second consensus node is divided into two cases. In one case, the second consensus node has a trusted execution environment (TEE). In the other case, the second consensus node does not have a TEE.

Before describing that the second consensus node has the TEE, the relevant contents of the TEE are explained first.

The TEE is a hardware-based secure computing solution. Through software and hardware, a secure region is constructed in a central processing unit (CPU) to ensure the confidentiality and integrity of programs and data loaded therein. The TEE divides hardware resources and software resources of the system into two execution environments: trusted part and untrusted part (ordinary part). The two environments are isolated, and the untrusted part cannot access the storage and memory of the trusted part.

The TEE solution includes: an Intel SGX solution, an arm trustzone solution, and an amd sev solution. The Intel SGX solution refers to a TEE solution proposed by Intel, which may support the TEE on a specific model of CPU produced by Intel. The TEE mentioned herein, unless otherwise specified, refers to the TEE based on the Intel SGX solution.

TEE hardware key: a hardware key that is baked in the CPU when producing the CPU by Intel. A private key thereof cannot be derived under any circumstances, and a public key thereof may be derived under certain usage scenarios, but Intel does not recommend this practice.

Based on the content of the TEE, in this embodiment, in response to that the second consensus node has a TEE, the second blockchain is encrypted with a key of the TEE. The first uploading verification information is transmitted by the second consensus node to the second relay node in response to a first uploading verification information request transmitted by the second relay node. The first uploading verification information request is transmitted by the second relay node in response to adding an encrypted block on the second blockchain. The encrypted block is encrypted with the key of the TEE. The first uploading verification information is used for instructing the second relay node to forward the first uploading verification information to the third consensus node.

In this embodiment, the block is encrypted with the key of the TEE, and the first uploading verification information is forwarded by the second relay node, thereby further improving the uploading security of the target transaction of the first global consensus network.

The above is the description of the second consensus node having a TEE, followed by the detailed description of the second consensus node not having a TEE.

Figure 12A:
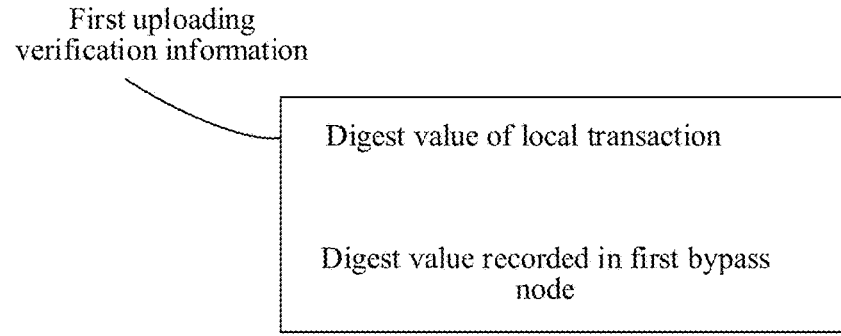
FIG. 12A shows a schematic diagram of a data structure of first uploading verification information in step 330*c* of FIG. 11.

In some embodiments, as shown in FIG. 12A, the first uploading verification information includes a digest value of the local transaction and a digest value that is determined according to a first path in a first tree and recorded in a first bypass node. A leaf node in the first tree records a digest value of a transaction recorded on the second blockchain. The first path is a path from a leaf node in the first tree to a root node in the first tree, and the leaf node in the first tree records the digest value of the local transaction. The first bypass node is a sibling node in the first tree of nodes other than the root node in the first path. The first uploading verification information is further used for instructing the third consensus node to determine a first comparative digest value according to the digest value of the local transaction and the digest value recorded in the first bypass node. The verification is successful in response to that the digest value recorded in the root node in the first tree and the first comparative digest value are consistent.

Figure 11:
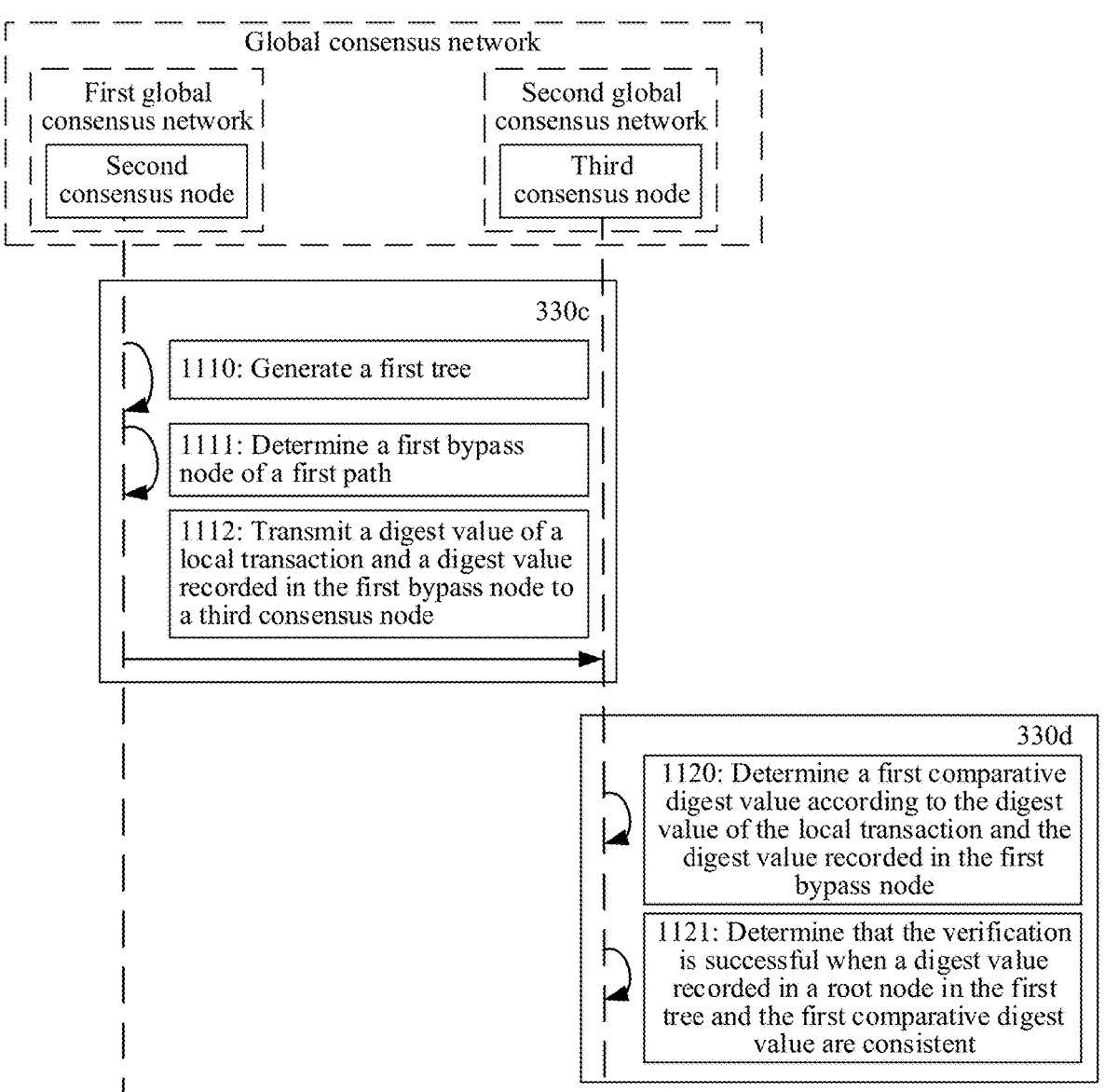
FIG. 11 shows a schematic diagram of generating a first tree and verifying using the first tree in steps 330c and 330d of FIG. 3.

The first tree is generated by the second consensus node. Referring to FIG. 11, step 330*c* (performed by the second consensus node) includes the following steps:

Step 1110: Generate the first tree.

Step 1111: Determine the first bypass node of a first path.

Step 1112: Transmit a digest value of the local transaction and a digest value recorded in the first bypass node to the third consensus node.

Correspondingly, step 330*d* (performed by the third consensus node) includes the following steps:

Step 1120: Determine a first comparative digest value according to the digest value of the local transaction and the digest value recorded in the first bypass node.

Step 1121: Determine that the verification is successful when a digest value recorded in a root node in the first tree and the first comparative digest value are consistent.

Steps 1110 to 1112 and steps 1120 to 1121 are described in detail below.

In step 1110, the leaf node in the first tree is a digest value of a transaction recorded on the second blockchain. The recorded transaction includes the local transaction. The order of leaf nodes in the first tree may be the order in which the local transactions are received by the second consensus node. For example, when the second consensus node first receives local transaction 1 "Employee A reimburses 1,000 resources in Enterprise B" and then receives local transaction 2 "Employee C reimburses 500 resources in Enterprise D", local transaction 1 is taken as the first leaf node, and local transaction 2 is taken as the second leaf node. The digest algorithm used for obtaining the digest value may be one of the following:

(1) The second consensus node pre-specifies the same digest algorithm for an entity to which each local transaction belongs. For example, the same digest algorithm is used for an electronic invoice reimbursement transaction of Enterprise B and an electronic invoice reimbursement transaction of Enterprise D.

(2) The second consensus node pre-specifies different digest algorithms for the entity to which each local transaction belongs. For example, different digest algorithms are pre-specified for Enterprise B and Enterprise D. When it is determined that the local transaction belongs to Enterprise B, the digest algorithm pre-specified for Enterprise B is adopted. When it is determined that the local transaction belongs to Enterprise D, the digest algorithm pre-specified for Enterprise D is adopted. Since this embodiment adopts different digest algorithms for different entities, the difficulty of cracking local transactions from digest values is increased, and the uploading security of the local transactions is improved.

When the third consensus node verifies according to the digest value of the local transaction and the digest value recorded in the first bypass node, the digest algorithm adopted by the third consensus node is consistent with the above digest algorithm.

In this embodiment, there is at least one intermediate layer between a layer where the leaf node is located and a layer where the root node is located in the first tree. The intermediate layer includes at least one intermediate node. In two adjacent layers in the first tree, a node of the previous layer is generated by at least two nodes of the next layer, and the same node in the next layer is only configured to generate one node in the previous layer. The nodes include root nodes, intermediate nodes, and leaf nodes.

The first tree in This embodiment is usually a binary tree or a multi-way tree. The first tree has all the characteristics of a tree structure. The tree structure often contains multiple nodes (nodes shown in FIG. 12B). The multiple nodes include at least one leaf node and one root node, and usually include multiple intermediate nodes between the leaf node and the root node.

Figure 12B:
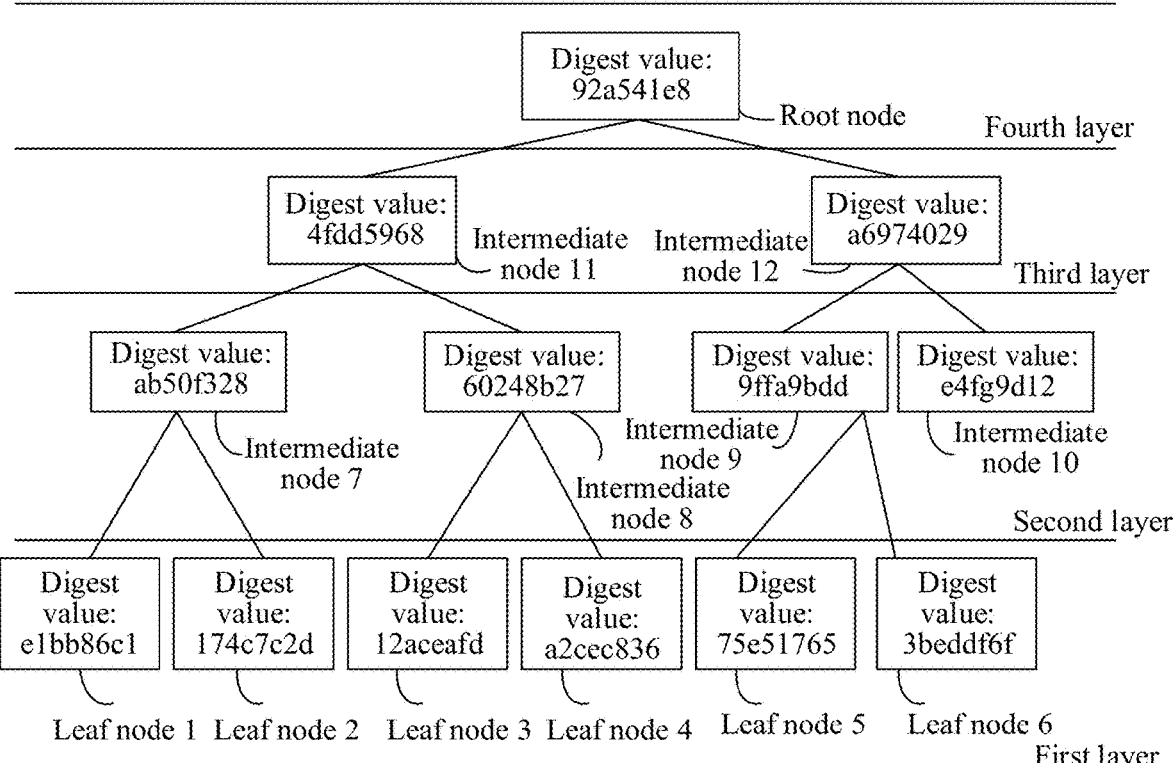
FIG. 12B shows a schematic diagram of generating a first tree according to an embodiment of this application.

Referring to the first tree shown in FIG. 12B, the leaf node of the first tree records digest values of transactions. In two adjacent layers in the first tree, a node of the previous layer is generated by at least two nodes of the next layer, and the same node in the next layer is only configured to generate one node in the previous layer. As shown in FIG. 12B, a digest value in an intermediate node 7 of the second layer is generated by the digest algorithm after a leaf node 1 and a leaf node 2 of the first layer are connected in series. A digest value in an intermediate node 8 of the second layer is generated by the digest algorithm after the leaf node 3 and the leaf node 4 are connected in series. A digest value in an intermediate node 9 is generated by the digest algorithm after a leaf node 5 and a leaf node 6 are connected in series. A digest value in an intermediate node 11 of the third layer is generated by the digest algorithm after the intermediate node 7 and the intermediate node 8 are connected in series. A digest value in an intermediate node 12 of the third layer is generated by the digest algorithm after the intermediate node 9 and the intermediate node 10 are connected in series. A digest value in the root node in the first tree is generated by the digest algorithm after the intermediate node 11 and the intermediate node 12 are connected in series.

In step 1111, the first path is a path between the leaf node corresponding to the digest value of the local transaction in the first tree and the root node in the first tree. The first bypass node is a sibling node in the first tree of nodes other than the root node in the first path.

Figure 12C:
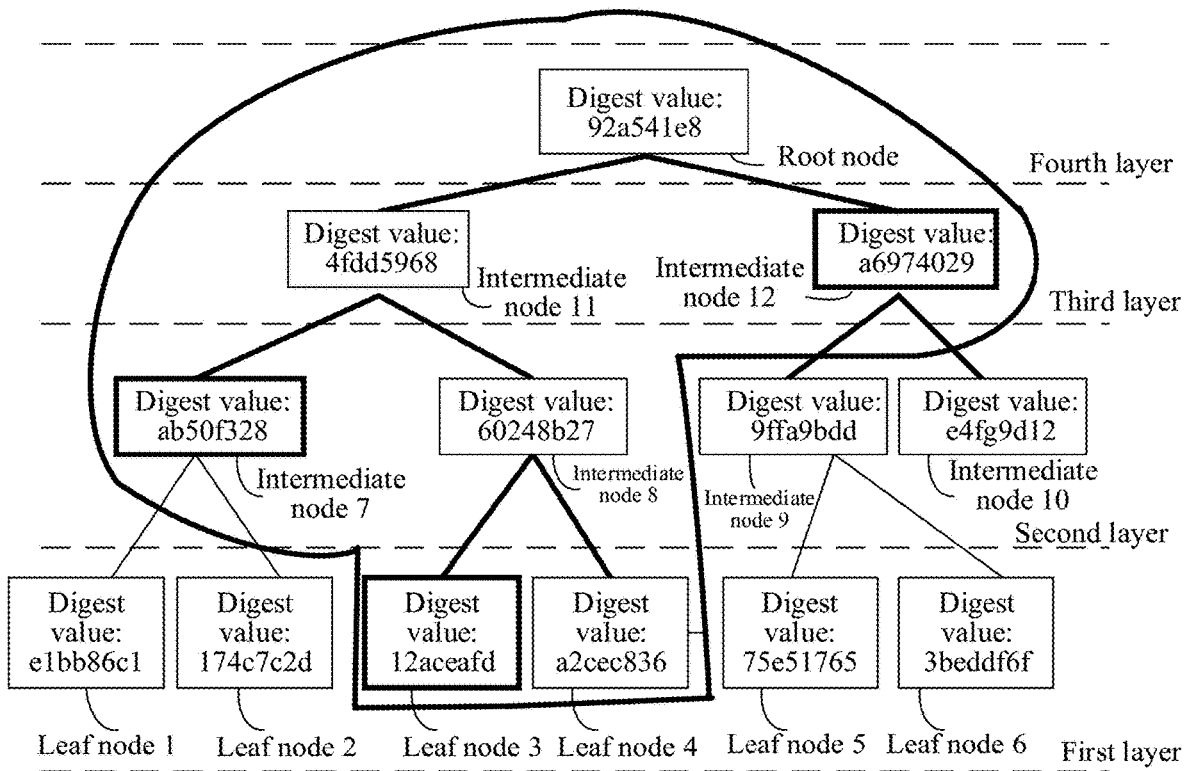
FIG. 12C shows a schematic diagram of a first bypass node in the first path of a first tree according to an embodiment of this application.

As shown in FIG. 12C, assuming that the digest value of the local transaction is recorded in the leaf node 4, the first path is a path between the leaf node 4 in the first tree and the root node in the first tree. The first path includes the leaf node 4, the intermediate node 8, the intermediate node 11, and the root node in the first tree. Since the intermediate node 8 needs to be generated based on the leaf node 3 and the leaf node 4, the leaf node 3 needs to be obtained when the leaf node 4 is known. Therefore, the leaf node 3 is determined as the first bypass node. Similarly, since the intermediate node 11 needs to be generated based on the intermediate node 7 and the intermediate node 8, the intermediate node 7 also needs to be obtained after the intermediate node 8 is generated according to the leaf node 3 and the leaf node 4. Therefore, the intermediate node 7 is determined as the first bypass node. Similarly, since the intermediate node 13 needs to be generated based on the intermediate node 11 and the intermediate node 12, the intermediate node 12 also needs to be obtained after the intermediate node 11 is generated according to the intermediate node 8 and the intermediate node 7. Therefore, the intermediate node 12 is determined as the first bypass node. Therefore, the first bypass node includes the leaf node 3, the intermediate node 7, and the intermediate node 12, and the first bypass node is represented in a thick black solid line box in FIG. 12C. Nodes in the first tree other than the first bypass node and the leaf node corresponding to the local transaction are not provided to the third consensus node. The advantage is that when the third consensus node verifies, related information of the root node generated layer by layer from the leaf node corresponding to the digest value of the local transaction has been provided to the third consensus node, so as to ensure that the third consensus node can verify correctly. In the meantime, information unrelated to verification shall be avoided from being provided to the third consensus node as far as possible, so as to reduce the information leakage of other transactions. In the meantime, even the first bypass node is generally only provided in the form of digest value, which reduces the real information leakage of related transactions.

After determining the first bypass node in step 1111, the second consensus node transmits a digest value of the local transaction and a digest value recorded in the first bypass node to the third consensus node in step 1112.

Next, after the third consensus node receives the digest value of the local transaction and the digest value recorded in the first bypass node, the third consensus node determines a first comparative digest value using the digest value recorded in the first bypass node and the digest value of the local transaction in step 1120.

The process of determining the first comparative digest value includes: determining the digest value of the local transaction, inferring the digest values recorded in the nodes in the first path layer by layer according to the digest value recorded in the first bypass node and the digest value of the local transaction (such as the part circled by the curve in FIG. 12C), and inferring the digest value of the root node in the first path as the first comparative digest value.

As shown in FIG. 12C, when determining the first comparative digest value using the digest value recorded in the first bypass node and the digest value of the local transaction, it is assumed that the digest value of the local transaction is recorded in the leaf node 4, and the first bypass node includes the leaf node 3, the intermediate node 7, and the intermediate node 12. In this case, the digest value recorded in the intermediate node 8 is inferred from the digest value recorded in the leaf node 4 and the digest value recorded in the leaf node 3. The digest value in the intermediate node 11 is inferred from the inferred digest value in the intermediate node 8 and the digest value in the intermediate node 7. The digest value in the root node is inferred from the inferred digest value in the intermediate node 11 and the digest value in the intermediate node 12.

After obtaining the first comparative digest value in step 1120, the third consensus node compares the digest value recorded in the root node of the first tree with the first comparative digest value. In step 1121, the verification is successful if the digest value recorded in the root node in the first tree and the first comparative digest value are consistent.

Through steps 1110 to 1112 and steps 1120 to 1121, This embodiment ensures that the third consensus node can accurately verify the local transaction and verify whether the transaction has been truly uploaded. In addition, since only the digest value of the local transaction and the digest value recorded in the first bypass node are shared to the third consensus node, the leakage of the real information of the related transaction is reduced, and the security is improved.

Figure 14A:
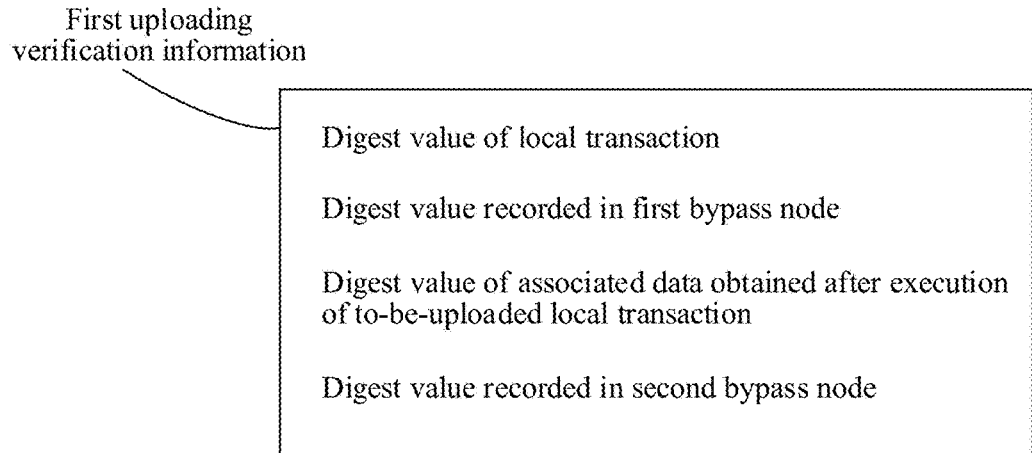
FIG. 14A shows a schematic diagram of a data structure of first uploading verification information in step 330*c* of FIG. 13.
Figure 14B:
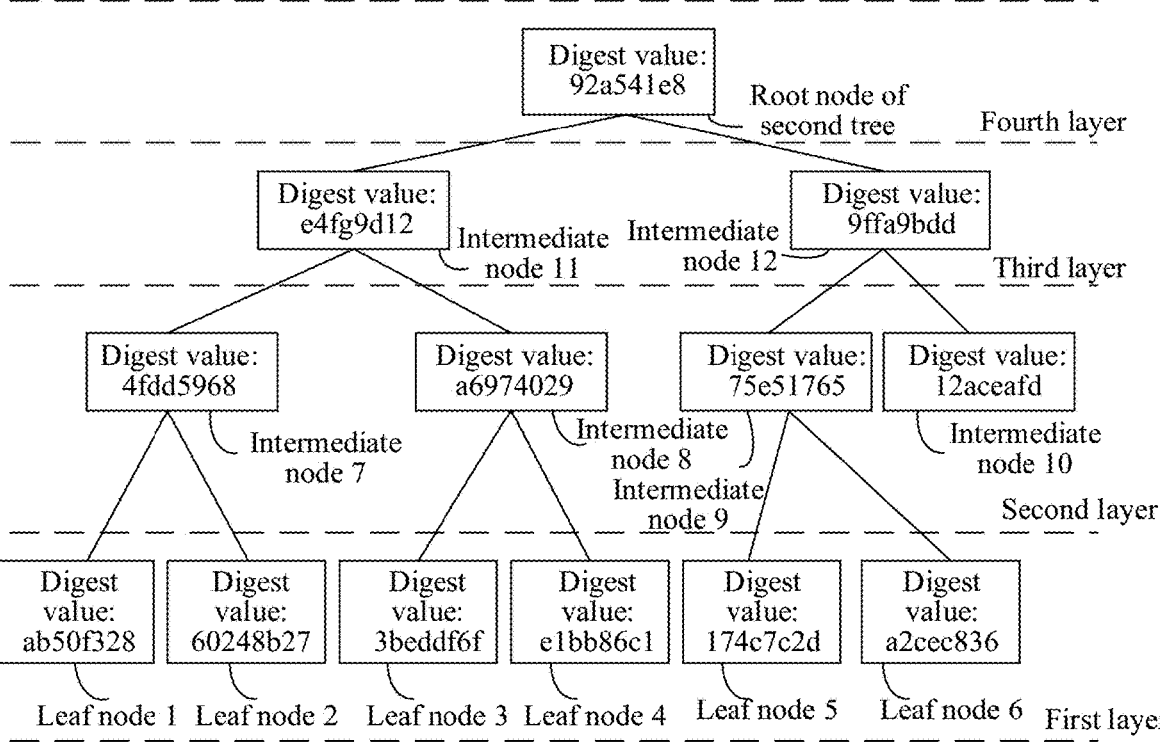
FIG. 14B shows a schematic diagram of generating a second tree according to an embodiment of this application.

In other embodiments, in addition to verifying whether the transaction is actually recorded, associated data generated after the local transaction is executed may also be verified. The associated data refers to parameters that may be affected after the transaction is executed, such as the total amount of resources or the number of items. For example, the local transaction is "Electronic invoice reimbursement 0001, amount 500 for accommodation". After the transaction is executed and uploaded, the total amount of enterprise resources will be affected. Assuming that the original total amount of enterprise resources is 500,000, after reimbursement of the electronic invoice, the total amount of resources is changed into 499,500. The total amount of resources is the associated data generated by invoice reimbursement. For another example, the local transaction is "Give 600 movie tickets to Enterprise A". The remaining movie tickets in a cinema will be affected after the transaction is executed. Assuming that there are 5,000 original movie tickets in the cinema, the number of movie tickets in the cinema will be changed to 4,400 after the transaction is executed and uploaded. The number of movie tickets is the associated data generated by the ticket giving transaction. In order to verify the associated data obtained after execution of the local transaction, in another embodiment, the first uploading verification information includes, in addition to the digest value of the local transaction and the digest value recorded in the first bypass node (as shown in FIG. 12A). The first uploading verification information further includes the digest value of the associated data obtained after execution of the local transaction and the digest value recorded in the second bypass node (as shown in FIG. 14A).

In some embodiments, the first uploading verification information further includes a digest value of associated data obtained after execution of the local transaction and a digest value recorded in a second bypass node in a second tree. A leaf node in the second tree records a digest value of associated data obtained after execution of a transaction recorded on the second blockchain. A second path is a path from a leaf node in the second tree to a root node in the second tree, and the leaf node in the second tree records the digest value of the associated data obtained after execution of the local transaction. The second bypass node is a sibling node in the second tree of nodes other than the root node on the second path. The first uploading verification information is further used for instructing the third consensus node to determine, in response to that the digest value recorded in the root node in the first tree and the first comparative digest value are consistent, a second comparative digest value according to the digest value of the associated data obtained after execution of the local transaction and the digest value recorded in the second bypass node. The verification is successful in response to that the digest value recorded in the root node in the second tree and the second comparative digest value are consistent.

Figure 13:
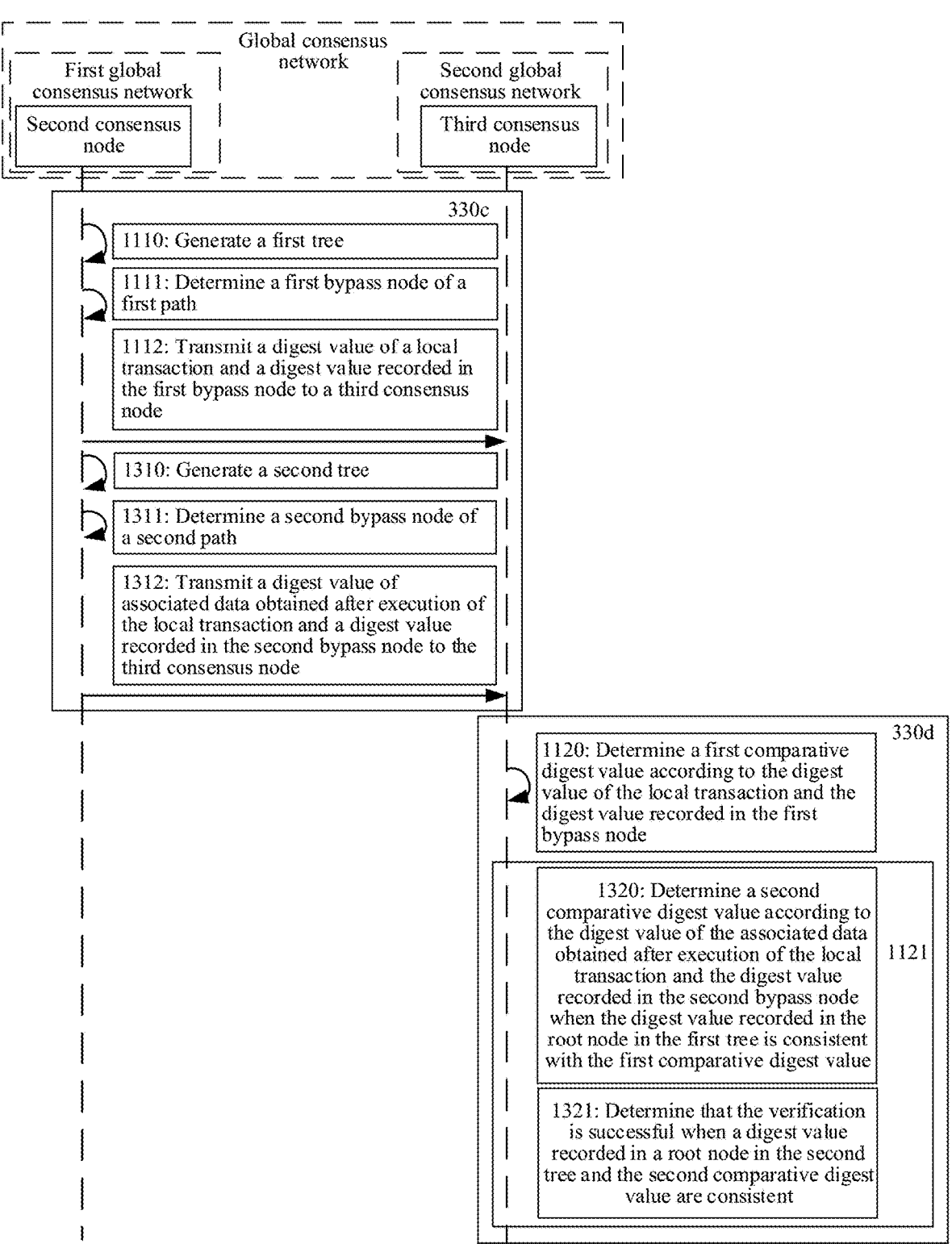
FIG. 13 shows a flowchart of generating a second tree and verifying using the second tree in steps 330*c* and 330*d* based on FIG. 11.

The second tree is generated by the second consensus node. Under this embodiment, referring to FIG. 13, step 330c (performed by the second consensus node) further includes the following steps:

Step 1310: Generate a second tree.

Step 1311: Determine a second bypass node of a second path.

Step 1312: Transmit a digest value of associated data obtained after execution of the local transaction and a digest value recorded in the second bypass node to the third consensus node.

Correspondingly, step 1121 in step 330d (performed by the third consensus node) further includes the following steps:

Step 1320: Determine a second comparative digest value according to the digest value of the associated data obtained after execution of the local transaction and the digest value recorded in the second bypass node when the digest value recorded in the root node in the first tree is consistent with the first comparative digest value.

Step 1321: Determine that the verification is successful when a digest value recorded in a root node in the second tree and the second comparative digest value are consistent.

Steps 1310 to 1312 and steps 1320 to 1321 are described in detail below.

In step 1310, the leaf node in the second tree records a digest value of associated data obtained after execution of a transaction recorded on the second blockchain. The recorded transaction includes the local transaction. The order of leaf nodes in the second tree may be a pre-specified order of associated data. For example, the order of enterprises A, B, C, D . . . is taken as the order of the leaf nodes in the second tree. When the second consensus node receives the local transaction 1 "Employee X reimburses 1,000 resources in Enterprise B", the transaction causes a change in the total number of resources of Enterprise B, whereby the total resources of Enterprise B are changed into 49,000. Therefore, the digest value in the leaf node 2 in the second tree is changed into a digest value of 49,000. When the second consensus node receives the local transaction 2 "Employee Y reimburses 500 resources in Enterprise D", the transaction causes a change in the total number of resources of Enterprise D, whereby the total resources of Enterprise D are changed into 24,500. Therefore, the digest value in the leaf node 4 in the second tree is changed into a digest value of 24,500. Entities to which local transactions belong may correspond to respective digest algorithms, and digest values of the local transactions may be generated by the digest algorithms corresponding to the entities to which the local transactions belong. The digest algorithms corresponding to different entities may be the same or different. The digest algorithms may be pre-specified by the second consensus node.

In step 1311, the second path is a path between the leaf node corresponding to the digest value of the associated data obtained after execution of the local transaction in the second tree and the root node in the second tree. The second bypass node is a sibling node of nodes in the second tree other than the root node in the second path.

Figure 14C:
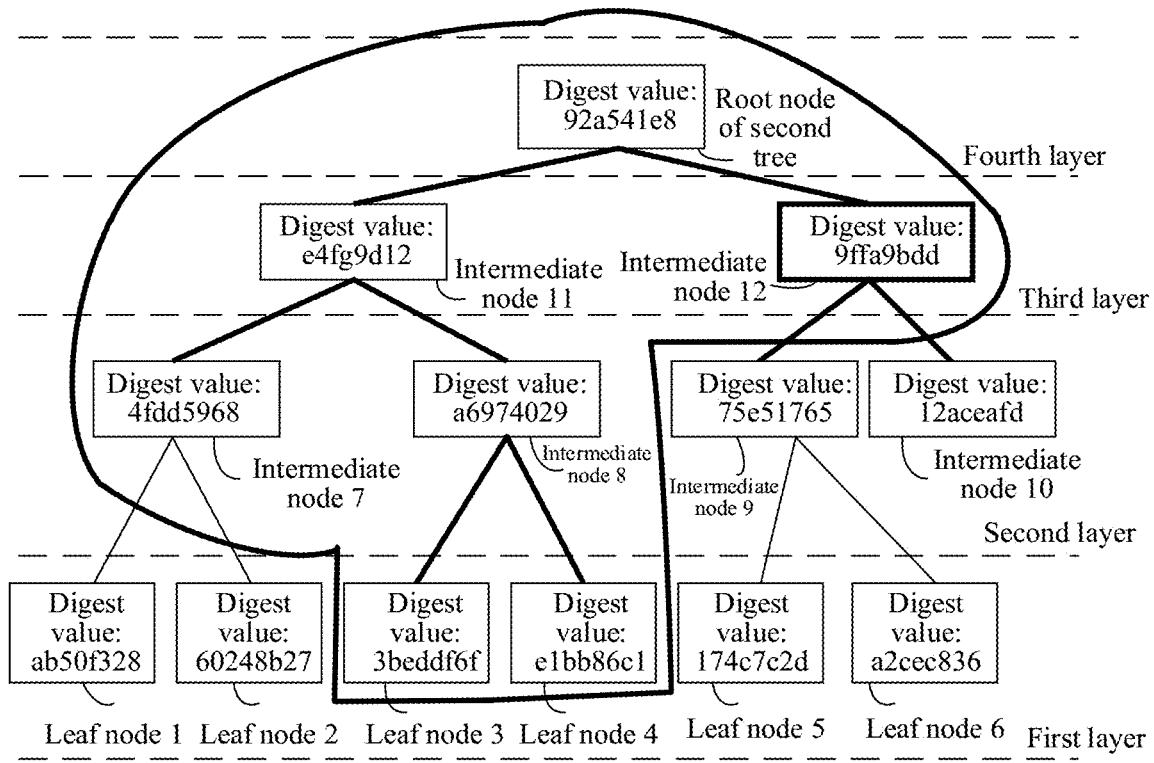
FIG. 14C shows a schematic diagram of a second bypass node in a second path of a second tree according to an embodiment of this application.

As shown in FIG. 14C, assuming that the digest value of the associated data obtained after execution of the local transaction is recorded in the leaf node 4, the second path is a path between the leaf node 4 in the second tree and the root node in the second tree. The second path further includes the leaf node 4, the intermediate node 8, the intermediate node 11, and the root node in the second tree. The second bypass node in the second path includes the leaf node 3, the intermediate node 7, and the intermediate node 12, and the second bypass node is represented in a thick black solid line box in FIG. 14C. The digest values in the second tree other than the digest value recorded in the second bypass node and the digest value of the associated data obtained after execution of the local transaction are not provided to the third consensus node.

After determining the second bypass node in step 1311, the second consensus node transmits the digest value of the associated data obtained after execution of the local transaction and the digest value recorded in the second bypass node to the third consensus node in step 1312.

Then, after receiving the digest value of the associated data obtained after execution of the local transaction and the digest value recorded in the second bypass node, the third consensus node determines a second comparative digest value according to the digest value of the associated data obtained after execution of the local transaction and the digest value recorded in the second bypass node when the digest value recorded in the root node in the first tree is consistent with the first comparative digest value in step 1320.

The process of determining the second comparative digest value includes: inferring the digest values recorded in the nodes in the second path according to the digest value recorded in the second bypass node and the digest value of the associated data obtained after execution of the local transaction (such as the part circled by the curve in FIG. 14C), and inferring the digest value of the root node in the second path as the second comparative digest value.

After obtaining the second comparative digest value in step 1320, the third consensus node compares the digest value recorded in the root node of the second tree with the second comparative digest value. In step 1321, the verification is successful when the digest value recorded in the root node in the second tree and the second comparative digest value are consistent.

Through steps 1310 to 1312 and steps 1320 to 1321, This embodiment can not only verify whether the local transaction has been truly uploaded through the local transaction, but also verify whether the local transaction has been truly uploaded through the generated associated data. The double verification further improves the verification accuracy.

In some embodiments, the first uploading verification information further includes a first signature of the second bypass node. The first signature is obtained by encrypting a first digest by the second consensus node with a first private key of the second consensus node. The first digest is generated by the second consensus node according to the digest value of the local transaction, the digest value recorded in the first bypass node, the digest value of the associated data obtained after execution of the local transaction, and the digest value recorded in the second bypass node. The first signature is used for instructing the third consensus node to decrypt, in response to that the root node in the second tree is consistent with a second to-be-compared root node, the first signature with a first public key of the second consensus node to obtain a second digest, and to generate a third digest according to the digest value of the local transaction, the digest value recorded in the first bypass node, the digest value of the associated data obtained after execution of the local transaction, and the digest value recorded in the second bypass node. The verification is successful in the case that the third digest and the second digest are consistent.

Figure 15:
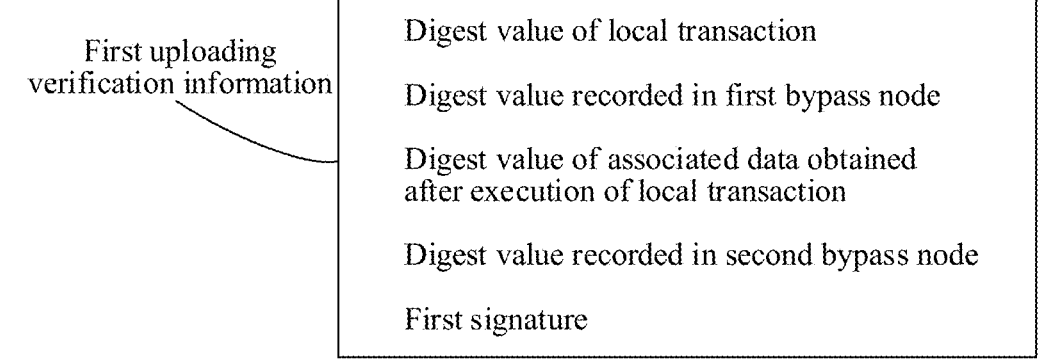
FIG. 15 shows a schematic diagram of a data structure of first uploading verification information with a first signature.

Referring to FIG. 15, the first uploading verification information shown in FIG. 15 includes the digest value of the local transaction, the digest value recorded in the first bypass node, the digest value of the associated data obtained after execution of the local transaction, the digest value recorded in the second bypass node, and the first signature.

The first signature is obtained by signing the digest value of the local transaction, the digest value recorded in the first bypass node, the digest value of the associated data obtained after execution of the local transaction, and the digest value recorded in the second bypass node by the second consensus node. The manner of generating the first signature by the second consensus node is as follows.

The digest value of the local transaction, the digest value recorded in the first bypass node, the digest value of the associated data obtained after execution of the local transaction, and the digest value recorded in the second bypass node are connected in series to obtain series data.

A first digest is generated by processing the series data according to a predetermined digest algorithm.

The first digest is encrypted with a first private key of the second consensus node to obtain the first signature.

Then in response to that the first uploading verification information further includes the first signature, step 1321 includes:

decrypting the first signature with a first public key of the second consensus node to obtain a second digest when the digest value recorded in the root node in the second tree and the second comparative digest value are consistent;

generating a third digest by processing the series data according to the predetermined digest algorithm; and determining that the verification is successful if the third digest is consistent with the second digest.

The order of connecting the digest value of the local transaction, the digest value recorded in the first bypass node, the digest value of the associated data obtained after execution of the local transaction, and the digest value recorded in the second bypass node in series may be one of the following:

(1) a pre-specified order, such as a pre-specified order of the digest value of the local transaction, the digest value recorded in the first bypass node, the digest value of the associated data obtained after execution of the local transaction, and the digest value recorded in the second bypass node; and (2) an initial character lexicographic order of the digest value of the local transaction, the digest value recorded in the first bypass node, the digest value of the associated data obtained after execution of the local transaction, and the digest value recorded in the second bypass node. For example, if the initial character of the digest value of the local transaction is t, the initial character of the digest value recorded in the first bypass node is m, the initial character of the digest value of the associated data obtained after execution of the local transaction is a, and the initial character of the digest value recorded in the second bypass node is c, then the digest values are connected in series according to the attribute of the digest value of the associated data obtained after execution of the local transaction, the digest value recorded in the second bypass node, the digest value recorded in the first bypass node, and the digest value of the local transaction. This embodiment is helpful to improve the verification complexity and the uploading security of the local transaction of the first type.

In steps 1310 to 1312 and steps 1320-1321, through the first signature of the second consensus node and the verification of the first signature by the third consensus node, it is ensured that the digest value of the to-be-uploaded local transaction, the digest value recorded in the first bypass node, the digest value of the associated data obtained after execution of the to-be-uploaded local transaction, and the digest value recorded in the second bypass node are truly transmitted by the second consensus node, thus further improving the uploading security of the local transaction of the first type.

The above is the detailed description of steps 330c to 330d.

Detailed Description of Step 340

In step 340, the first relay node obtains an uploading verification result of the local transaction from the third consensus node.

Before the first relay node obtains the uploading verification result, the uploading verification result is a result obtained after the third consensus node verifies the uploading of the local transaction according to the first uploading verification information. Referring to FIG. 16, the first uploading verification information includes the digest value of the local transaction, the digest value recorded in the first bypass node, the digest value of the associated data obtained after execution of the local transaction, the digest value recorded in the second bypass node, and transaction desensitization information. The transaction desensitization information is obtained by desensitizing the local transaction by the second consensus node. The desensitization is performed according to a desensitization field in a target contract. The target contract corresponds to a child type of the local transaction.

In response to that the first uploading verification information includes the transaction desensitization information, step 340 includes: obtaining the transaction desensitization information from the third consensus node as the uploading verification result. The transaction desensitization information refers to information that can be disclosed to a third party in the target transaction, such as "Transaction of XX type has been completed and uploaded".

The transaction desensitization information is generated by the second consensus node, and the method for generating the transaction desensitization information by the second consensus node is as follows:

obtaining a child type of the local transaction of the first type;

obtaining a target contract corresponding to the child type; and desensitizing the local transaction according to a desensitization field in the target contract to obtain the transaction desensitization information.

In this embodiment, the child type is obtained in a manner similar to the manner in which the child type is determined in the above embodiment.

The target contract is a contract for uploading a first type transaction of a certain child type. For example, the first type transaction of an invoice child type corresponds to the target contract of the invoice child type for uploading the first type transaction of the invoice child type. The first type transaction of an order child type corresponds to the target contract of the order child type for uploading the first type transaction of the order child type. In general, the target contract needs to be executed by all the second consensus nodes.

The target contract may be determined by looking up a child type-to-candidate target contract comparison table according to the child type.

The child type may be the foregoing invoicing type, order type, resource exchange type, and resource statistics type. According to the contract requirements of each child type, a child type-to-target contract comparison table is made, for example:

TABLE 5

| Child type | Target contract |
|---|---|
| Invoice reimbursement type | Reimbursement target contract |
| Invoicing type | Invoicing target contract |
| Resource exchange type | Exchange target contract |
| Resource statistics type | Statistic target contract |

As shown in Table 5, a unified reimbursement target contract may be set for the invoice reimbursement type as the child type. A unified invoicing target contract may be set for the Invoicing type as the child type. Similarly, a unified exchange target contract is set for the resource exchange type, and a unified statistic target contract is set for the resource statistics type.

After the comparison table is made, the comparison table may be looked up according to the child type to determine the target contract corresponding to the child type.

After the target contract is determined, the local transaction is desensitized according to a desensitization field in the target contract to obtain the transaction desensitization information. The desensitization field is a field carrying information that may be disclosed to a third party. For example, in the transaction of electronic invoice reimbursement, the transaction child type and number do not contain contents that cannot be disclosed to the third party, but may be disclosed to the third party.

For example, the local transaction of the first type is "Reimbursement of electronic invoice 0001, amount 500 for accommodation". Then the child type of the local transaction is first obtained as the invoice reimbursement type (for example, if the invoice reimbursement is included according to the second key field, the child type is determined as the invoicing type). Secondly, the above comparison table is looked up in response to the child type being the invoice reimbursement type, and the target contract is a reimbursement target contract (a desensitization field of the reimbursement target contract includes amount and purpose). Then, according to the desensitization field in the reimbursement target contract, that is, the transaction child type and number, the amount and purpose in "Electronic invoice reimbursement 0001, amount 500 for accommodation" are removed, only the transaction child type and number are kept, and the obtained transaction desensitization information is "Electronic invoice reimbursement 0001 is successful".

The advantage of this embodiment is that the desensitization accuracy is improved by processing the desensitization field in the target contract, thereby improving the uploading security of the target transaction.

The first uploading verification information in the above embodiment includes transaction desensitization information. However, in another embodiment, the first uploading verification information does not include transaction desensitization information, but includes instantaneous-ness information.

In some embodiments, the first uploading verification information further includes instantaneous-ness information of the local transaction. The instantaneous-ness information is determined by the second consensus node according to a child type of the local transaction. The process of obtaining the uploading verification result of the local transaction from the third consensus node includes: receiving the uploading verification result returned by the third consensus node after the verification of the third consensus node is successful in response to that the instantaneous-ness information indicates that the local transaction is an instantaneous transaction.

Referring to FIG. 17, the first uploading verification information shown in FIG. 17 includes the digest value of the local transaction, the digest value recorded in the first bypass node, the digest value of the associated data obtained after execution of the local transaction, the digest value recorded in the second bypass node, and instantaneous-ness information. Then in response to that the first uploading verification information includes the instantaneous-ness information, step 340 includes:

receiving the uploading verification result returned by the third consensus node after the verification of the third consensus node is successful in response to that the instantaneous-ness information indicates that the local transaction is an instantaneous transaction.

When this embodiment is specifically implemented, the instantaneous-ness information is generated in the following manner:

obtaining a child type of the local transaction of the first type; and determining instantaneous-ness information according to the child type.

In this embodiment, the child type is obtained in a manner similar to the manner in which the child type is determined in the above embodiment.

The child type may be the foregoing invoice reimbursement type, Invoicing type, resource exchange type, and resource statistics type. According to the instantaneous-ness requirements of each child type, a child type-to-instantaneous-ness information comparison table is made, for example:

TABLE 6

| Child type | Instantaneous-ness information |
|---|---|
| Invoice reimbursement type | Instant |
| Invoicing type | Instant |
| Resource exchange type | Non-instant |
| Resource statistics type | Non-instant |

As shown in Table 6, if the child type is the invoice reimbursement type or Invoice, the instantaneous-ness requirement is high, and the instantaneous-ness information may be set to instant (so that the uploading verification result of the local transaction with the child type being the invoicing type can be instantly returned to the first relay node). For the resource exchange type or the resource statistics type, the instantaneous-ness requirement is lower than that for the invoice reimbursement type. Therefore, the instantaneous-ness information is set to non-instant.

After the comparison table is made, the comparison table may be looked up according to the child type to determine the instantaneous-ness information corresponding to the child type.

For example, the local transaction of the first type is "Electronic invoice reimbursement 0001, amount 500 for accommodation". Then the child type of the local transaction is first obtained as the invoice reimbursement type. Secondly, the above comparison table is looked up in response to the child type being the invoicing type to obtain the instant information being instant, which means that "Electronic invoice reimbursement 0001, amount 500 for accommodation" is an instantaneous transaction. Then, after the verification of the third consensus node is successful, the third consensus node immediately returns the uploading verification result to the first relay node, so as to improve the instantaneous-ness of the instantaneous transaction processing.

The advantage of this embodiment is that the uploading verification result is returned instantly for the instant local transaction, thus ensuring the instant processing of the instantaneous transaction.

In some embodiments, an uploading verification result request is transmitted to the third consensus node and the uploading verification result is obtained from a response of the third consensus node to the uploading verification result request in response to that the instantaneous-ness information indicates that the local transaction is a non-instantaneous transaction.

For example, the local transaction of the first type is "100 first resources are exchanged with 10 second resources". Then the child type of the local transaction is first obtained as the resource exchange type. Secondly, the above comparison table is looked up in response to the child type being the resource exchange type to obtain the instant information being non-instant, which means that "100 first resources are exchanged with 10 second resources" is a non-instantaneous transaction. In this case, after the verification of the third consensus node is successful, the third consensus node is not required to return the uploading verification result to the first relay node so urgently, and may wait for the first relay node to transmit the uploading verification result request to the third consensus node and make a response to the request. The first relay node obtains the uploading verification result from the response of the third consensus node to the uploading verification result request.

The advantage of this embodiment is that a non-instant local transaction waits for the request of the first relay node, thus reducing the occupation of transmission resources.

The first relay node transmits an uploading verification result request to the third consensus node, so as to obtain the uploading verification result from a response of the third consensus node to the uploading verification result request when the instantaneous-ness information indicates that the local transaction is a non-instantaneous transaction. Next, the uploading verification result request is described.

Reference is made to FIG. 18. The uploading verification result request shown in FIG. 18 includes a block identifier, a source address, and a destination address. The source address refers to an address of the first relay node and the destination address refers to an address of the third consensus node. The block identifier is configured to indicate a block where the uploading verification result is located (the block is located on the third blockchain maintained by the third consensus node).

The block identifier is generated by the third consensus node and transmitted by the third consensus node to the first relay node. For example, step 330*d* includes that: the third consensus node verifies the uploading of the local transaction according to the first uploading verification information and generates an uploading verification result; and the third consensus node records the uploading verification result to the third blockchain and returns the block identifier recorded to the third blockchain to the first relay node.

In one implementation of this embodiment, before the third consensus node transmits the block identifier to the first relay node, the third consensus node generates a block according to the uploading verification result and records the block to the third blockchain. The block includes a block body and a block header. The block body is divided into multiple blocks. The uploading verification result may only occupy one block, multiple blocks, or all blocks. When only one or multiple blocks are occupied, the remaining blocks record uploading verification results of local transactions of other third consensus nodes. That is, the third consensus node packages the blocks occupied by the uploading verification results and the blocks corresponding to the uploading verification results indicating that other third consensus nodes need to upload into the block body, adds the block header to form a block, and records the block on the blockchain. The block header indicates relevant information of this block, including: a version number, a feature value, a timestamp, a difficulty value, and the like. The block identifier is an identifier that can distinguish a block from other blocks, such as the height of the block and the feature value of the block. The feature value of the block is generally the digest value generated by the block body of the block via the digest algorithm. As the block bodies are different, the digest values are different. Therefore, the digest values can uniquely distinguish the blocks. The height of the block refers to the position of the block recorded on the blockchain. The height of the block can also uniquely distinguish the block from other blocks. After the block is recorded to the third blockchain, the block identifier recorded to the third blockchain is returned to the first relay node.

After the first relay node receives the block identifier, in some embodiments, step 340 includes: transmitting an uploading verification result request to the third consensus node, the uploading verification result request having the block identifier, whereby the third consensus node obtains the uploading verification result from the third blockchain according to the block identifier; and receiving the uploading verification result returned by the third consensus node. The advantage is that the third consensus node records the uploading verification results to the third blockchain, which is convenient for other nodes to check, and the uploading verification results are not easy to be tampered, thus improving the security of the uploading verification results.

The manner of transmitting the uploading verification result request includes, but is not limited to, the following three cases:

(1) After the first relay node receives the block identifier, the first relay node immediately transmits an uploading verification result request to the third consensus node.

(2) The first relay node presets a second transmitting period, and after the block identifier is received and the second transmitting period has passed, the first relay node transmits an uploading verification result request to the third consensus node.

(3) After the first relay node receives the block identifier, the first relay node transmits a prompt message "whether to obtain a first uploading verification result" to the local consensus network. When receiving indication information "yes" returned by the first consensus node, the first relay node transmits an uploading verification result request to the third consensus node in response to the indication information returned by the first consensus node.

Considering Generalized Uploading Requirements of Global Transactions

According to the transaction uploading method in the above embodiment, the local transaction is executed and recorded to the corresponding blockchain according to the parent type of the local transaction only for the uploading demand of the local transaction. For example, the second consensus node records the local transaction of the first type to the second blockchain, and the second blockchain is not accessible by nodes other than the second consensus node. For another example, the first consensus node records the local transaction of the second type to the first blockchain, and the first blockchain can be accessed by nodes other than the first consensus node. That is, the local transactions of the second type are recorded on the first consensus node in the local consensus network. However, in the blockchain hierarchical consensus system, the local transactions recorded by each local consensus network are required to be summarized into the global consensus network, and the generalized global transactions formed by the local transactions of the second type will be recorded on the third blockchain by the second global consensus network in the global consensus network. Therefore, in one embodiment, after the local transaction is executed by the first consensus node and recorded to the first blockchain in response to determining that the parent type of the local transaction is the second type, it is further necessary to record the generalized global transaction generated for the local transaction to the third blockchain.

Figure 19:
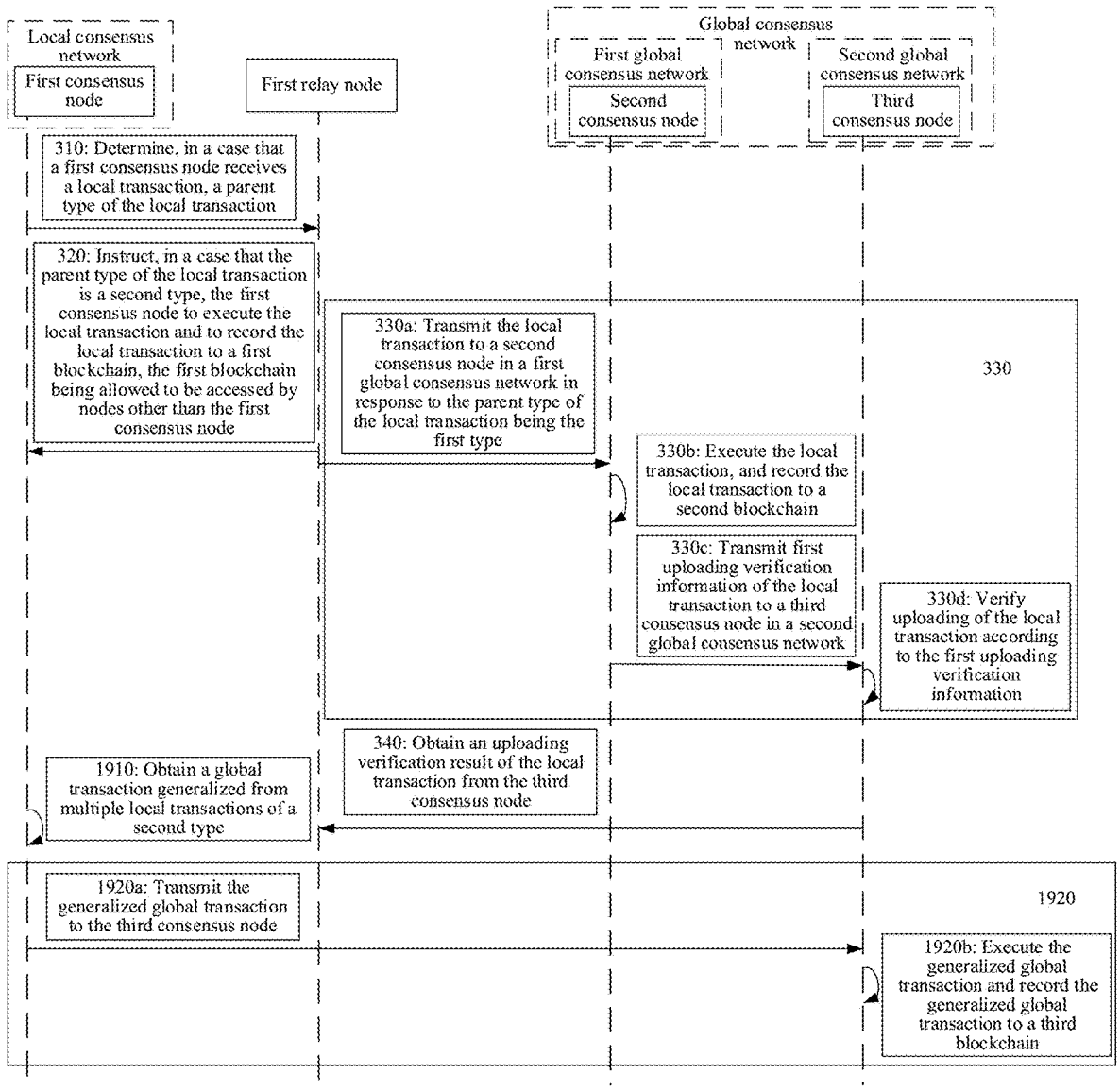
FIG. 19 is a flowchart of a transaction uploading method in another embodiment.

As shown in FIG. 19, after step 320, the transaction uploading method according to one embodiment of this application may further include the following steps:

Step 1910: Obtain a global transaction generalized from multiple local transactions of the second type.

Step 1920: Transmit the global transaction to the third consensus node, the global transaction being used for instructing the third consensus node to execute the global transaction and to record the global transaction to a third blockchain.

Steps 1910 to 1920 are described in detail below.

In step 1910, a global transaction may be generalized from multiple local transactions in a local consensus network or from local transactions in multiple local consensus networks.

The manner of generalizing the global transaction includes the following:

(1) After the first consensus node receives a predetermined number of local transactions, a global transaction is generated according to the predetermined number of local transactions.

(2) When a time difference between the current time of the first consensus node and a previous transmitting time of the generalized global transaction exceeds a threshold, a new global transaction is generated according to the received local transaction.

(3) After the first consensus node receives the predetermined number of local transactions, the global transaction is generated according to the predetermined number of local transactions. If the predetermined number is not reached but when the time difference between the current time of the first consensus node and the previous transmitting time of the generalized global transaction exceeds the threshold, the global transaction is generated according to the received local transaction.

For example, it is assumed that there are three local transactions of the second type: "Order 10001: purchase 50 office supplies", "Order 10002: purchase 150 office supplies", and "Order 10003: purchase 200 office supplies". According to the three local transactions, the generalized global transaction may be "The total number of orders is 3" or "The total number of orders purchased is 400 office supplies".

With continued reference to FIG. 19, step 1920 may be specifically divided into 1920a: transmitting the generalized global transaction to the third consensus node, and 1920b (executed by the third consensus node): executing the generalized global transaction and recording the generalized global transaction to the third blockchain.

In step 1920a, the manner in which the first consensus node transmits the generalized global transaction includes the following:

(1) After the first consensus node obtains the local transaction, the generalized global transaction is immediately transmitted to the third consensus node.

(2) The first consensus node presets a third transmitting period, and after the first consensus node obtains the local transaction and the third transmitting period has passed, the first consensus node transmits the generalized global transaction to the third consensus node.

In step 1920b, the third consensus node executes the generalized global transaction and records the generalized global transaction to the third blockchain. The third blockchain records the generalized global transaction and can be accessed by nodes other than the third consensus node.

The specific process of executing the local transaction by the third consensus node and recording the local transaction to the third blockchain may be referred to the description of executing the local transaction by the first consensus node and recording the local transaction to the first blockchain in the above embodiment.

The advantage of the above embodiment is that based on the hierarchical consensus system architecture (as shown in FIG. 10), each local consensus network may be guaranteed to run local transactions independently, which is convenient for hierarchical service governance. It is unnecessary to collect all the traffic of the service alliance in the whole witness network into the global consensus network. On the premise of data isolation, service security isolation, and legal compliance, steps 1910 to 1920 can ensure that the second global consensus network is not required to carry a large number of subdivided services, and may focus on the governance of key tasks and global transactions.

In addition, in the above embodiment, after the generalized global transaction is recorded to the third blockchain by the third consensus node, the first relay node may obtain second uploading verification information from the third consensus node and transmit the second uploading verification information to the first consensus node, whereby the second uploading verification information is verified by the first consensus node to ensure that the generalized global transaction has been truly executed and truly uploaded.

Figure 20:
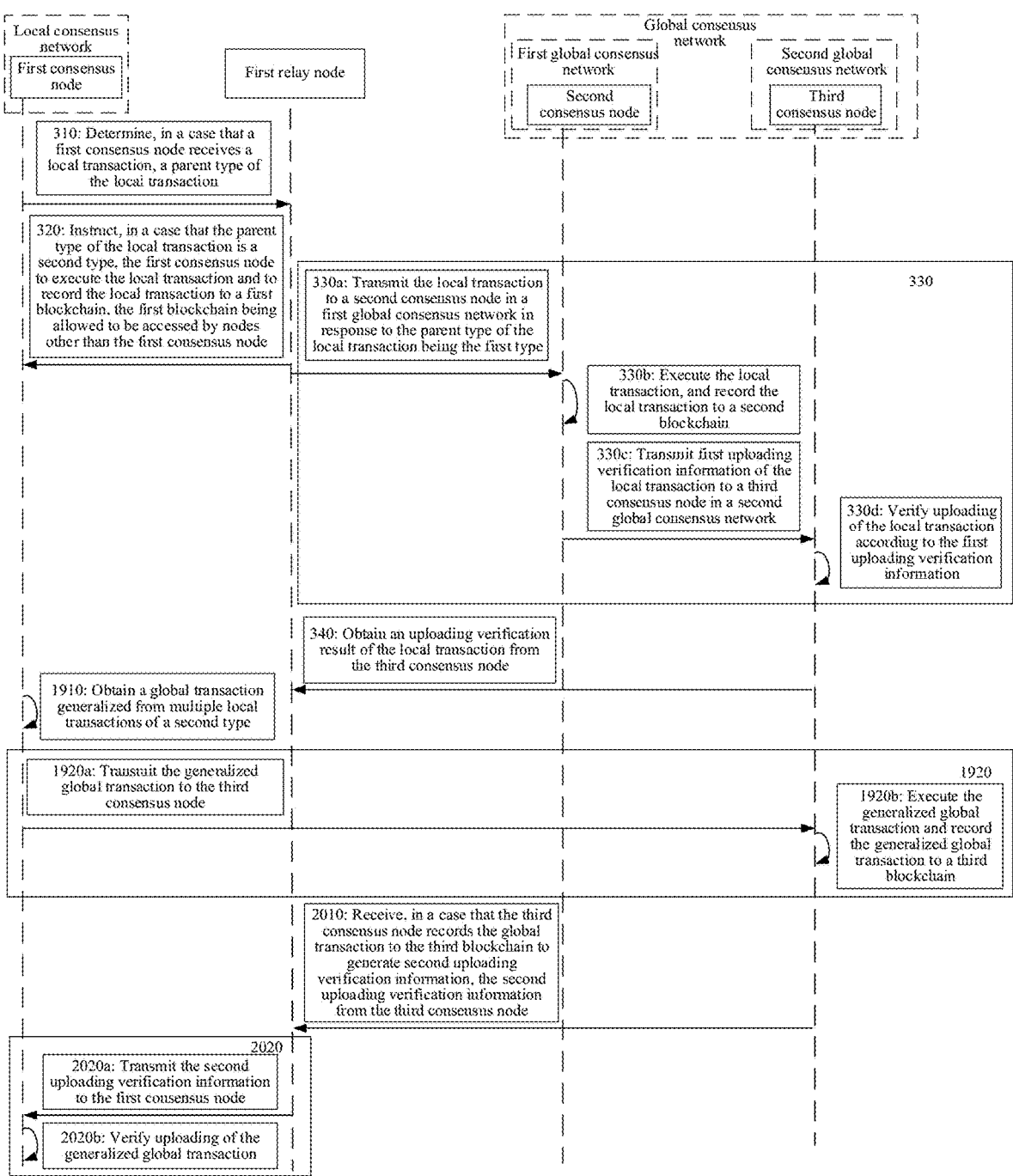
FIG. 20 is a flowchart of a transaction uploading method in another embodiment.

As shown in FIG. 20, after step 1920, the transaction uploading method according to one embodiment of this application may further include the following steps:

Step 2010: Receive, in response to that the third consensus node records the global transaction to the third blockchain to generate second uploading verification information, the second uploading verification information from the third consensus node.

Step 2020: Transmit the second uploading verification information to the first consensus node, the second uploading verification information being used for instructing the first consensus node to verify uploading of the generalized global transaction.

For example, it is assumed that the second uploading verification information includes a digest value of the generalized global transaction and a digest value recorded in the third bypass node. The third bypass node is obtained by the third consensus node in the following manner.

A third tree is generated. A leaf node of the third tree records a digest value of a transaction recorded on the third blockchain. The recorded transaction includes the generalized global transaction. In two adjacent layers in the third tree, a node of the previous layer is generated by at least two nodes of the next layer, and the same node in the next layer is only configured to generate one node in the previous layer.

A third bypass node of a third path is determined. The third path is a path between the leaf node corresponding to the digest value of the generalized global transaction in the third tree and a root node in the third tree. The third bypass node is a sibling node of nodes in the third tree other than the root node in the third path.

Correspondingly, step 2020 includes:

determining a third comparative digest value according to the digest value of the generalized global transaction and the digest value recorded in the third bypass node; and determining that the verification is successful if the third comparative digest value is consistent with the digest value recorded in the root node in the third tree.

A specific method of verifying according to the second uploading verification information, reference is referred to a specific method of verifying according to the first uploading verification information.

Through steps 2010 to 2020, This embodiment ensures that the first consensus node can accurately verify the generalized global transaction, and can verify that the generalized global transaction is truly recorded without cheating.

Figure 21:
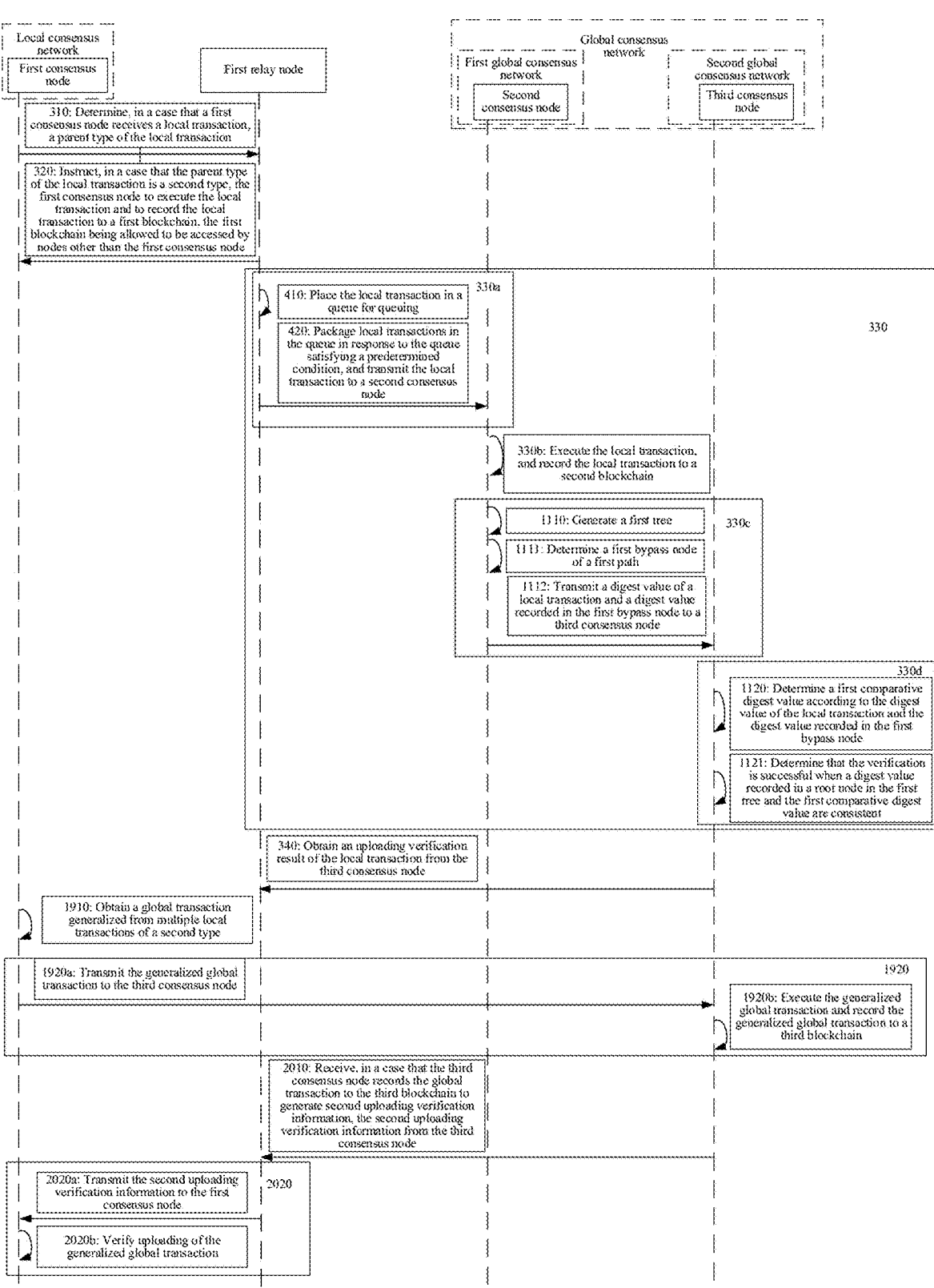
FIG. 21 is a multi-terminal interaction diagram of a detailed embodiment of this application.

Implementation Detail Diagram of Transaction Uploading Method of this Embodiment Referring to FIG. 21 the implementation details of the transaction uploading method of This embodiment will be illustrated in detail.

In step 310, the first relay node determines that a parent type of a local transaction is the first type or determines that the parent type of the local transaction is a second type.

In step 320, in response to determining that the parent type of the local transaction is the second type, the local transaction is executed by the first consensus node and recorded to the first blockchain.

Step 330 is divided into steps 330a to 330d. In step 330a, the first relay node places the local transactions in a queue for queuing (step 410), and packages and transmits the local transactions in the queue to the second consensus node in response to the queue satisfying a predetermined condition (step 420). In step 330b, the second consensus node executes the local transaction, and records the local transaction to the second blockchain. In step 330*c*, the first tree is generated in step 1110. A first bypass node of a first path is determined in step 1111. A digest value of the local transaction and a digest value recorded in the first bypass node are transmitted to the third consensus node in step 1112. In step 330*d*, a first comparative digest value is determined according to the digest value of the local transaction and the digest value recorded in the first bypass node (step 1120). The verification is successful when the digest value recorded in the root node in the first tree and the first comparative digest value are consistent (step 1121).

In step 340, the uploading verification result of the local transaction is obtained from the third consensus node. For example, when the digest value recorded in the root node in the first tree is consistent with the first comparative digest value, the uploading verification result is verification success. When the digest value recorded in the root node in the first tree is inconsistent with the first comparative digest value, the uploading verification result is verification failure.

In addition to local transactions required to be uploaded, there are also generalized global transactions required to be recorded to the third blockchain. Therefore, with continued reference to FIG. 21, the generalized global transaction generated for the local transaction is obtained in step 1910. The generalized global transaction is transmitted to the third consensus node (1920*a*) in step 1920. The third consensus node executes the generalized global transaction and records the generalized global transaction to the third blockchain (1920*b*). Next, after step 1920, the second uploading verification information of the generalized global transaction is received from the third consensus node in step 2010. The second uploading verification information is transmitted to the first consensus node in step 2020*a*, and the first consensus node verifies uploading of the generalized global transaction in step 2020*b*.

The advantages of this embodiment include, but are not limited to: it can be distinguished whether a local transaction is a first type or a second type, and an uploading security requirement of a target transaction is met; by packaging and transmitting multiple local transactions together, the network overhead can be reduced; by using a digest value and a digest value recorded in a bypass node as first uploading verification information, the uploading authenticity of local transactions can be verified and the leakage of other related transaction true information can be reduced; by executing and recording a generalized global transaction by a third consensus node to a third blockchain, the third consensus node can process the global transaction more centrally; and the uploading authenticity of the generalized global transaction can be verified through second uploading verification information, thus improving the security.

The first relay node is mainly used as a core processing module in the above embodiment, and the second consensus node is used as a core processing module to describe the transaction uploading method of another embodiment.

Figure 22:
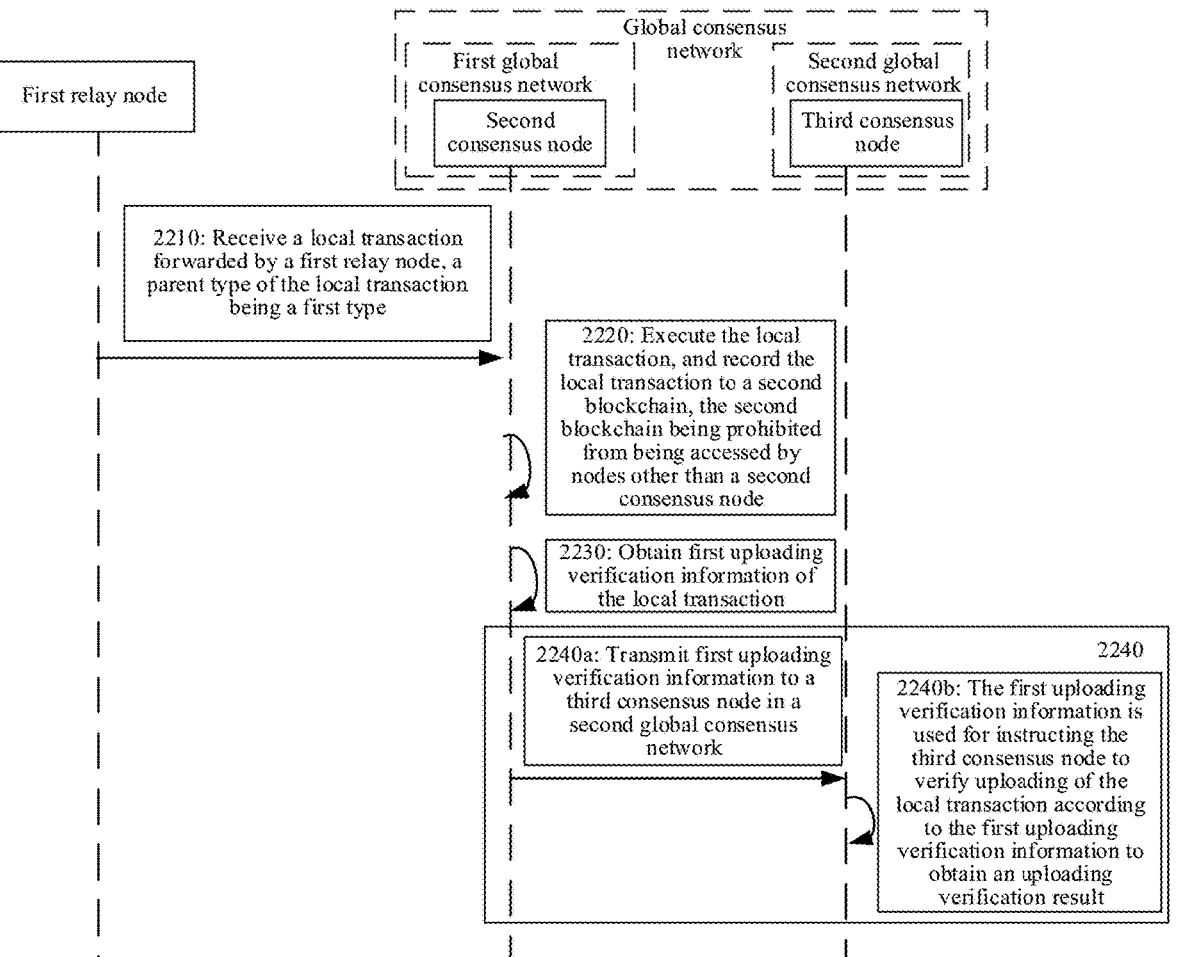
FIG. 22 is a flowchart of a transaction uploading method performed by a second consensus node in one embodiment.

Referring to FIG. 22, a transaction uploading method performed by a second consensus node includes the following steps:

Step 2210: Receive a local transaction forwarded by a first relay node, a parent type of the local transaction being a first type.

The local transaction comes from a local consensus network.

Step 2220: Execute the local transaction, and record the local transaction to a second blockchain, the second blockchain being not accessible by nodes other than the second consensus node.

Step 2230: Obtain first uploading verification information of the local transaction.

Step 2240: Transmit the first uploading verification information to a third consensus node in a second global consensus network (step 2240*a*), the first uploading verification information being used for instructing the third consensus node to verify uploading of the local transaction according to the first uploading verification information to obtain an uploading verification result (step 2240*b*).

In this embodiment, for the local transaction of the first type, the local transaction is transmitted to the second consensus node to instruct the second consensus node to record the local transaction to the second blockchain. Since the second blockchain is not allowed to be accessed by nodes other than the second consensus node, the security of the local transaction of the first type is guaranteed. In the meantime, after completing the uploading of the local transaction, the second consensus node transmits the first uploading verification information after the uploading to the third consensus node. The third consensus node performs uploading verification to obtain an uploading verification result, and the uploading verification result is obtained from the third consensus node, thus ensuring that the uploading of the local transaction is authentic although the local transaction cannot be viewed by the outside world, thereby improving the uploading security of the local transaction.

In some embodiments, the second consensus node has a TEE. The second blockchain is encrypted with a key of the TEE. The process of transmitting the first uploading verification information to the third consensus node includes: receiving a first uploading verification information request transmitted by the second relay node; and transmitting the first uploading verification information to the second relay node in response to the first uploading verification information request. The first uploading verification information is used for instructing the second relay node to forward the first uploading verification information to the third consensus node.

Specifically, the second relay node transmits the first uploading verification information request to the second consensus node in response to adding a block encrypted with the key of the TEE to the second blockchain. The second consensus node transmits the first uploading verification information to the second relay node in response to the first uploading verification information request transmitted by the second relay node. The second relay node forwards the first uploading verification information to the third consensus node in the second global consensus network.

In this embodiment, the local transactions recorded by the second blockchain on the first global consensus network are not visible to the first relay node, and therefore, key encryption in the TEE is employed. However, a block added to the second blockchain is visible. Therefore, the second relay node may identify whether there is an additional block encrypted with the key in the second blockchain. After discovering that there is an additional block encrypted with the key in the second blockchain, the first uploading verification information request is transmitted to the second consensus node. After receiving the first uploading verification information request, the second consensus node cannot directly return the first uploading verification information to the first relay node, but returns the first uploading verification information to the second relay node, which is forwarded to the third consensus node by the second relay node. Thus, the third consensus node verifies according to the first uploading verification information.

In This embodiment, the block is encrypted with the key of the TEE, and the first uploading verification information is forwarded by the second relay node, thereby further improving the uploading security of the target transaction of the first global consensus network.

Description of Apparatus and Device of this Embodiment

It is to be appreciated that although the various steps in the flowcharts are shown in sequence as indicated by the arrows, these steps are not necessarily performed in the order indicated by the arrows. These steps are performed in no strict order unless explicitly stated in this embodiment, and these steps may be performed in other orders. Moreover, at least some of the steps in the flowcharts may include multiple steps or multiple stages. These steps or stages are not necessarily performed at the same time, but may be performed at different times. These steps or stages are not necessarily performed in sequence, but may be performed in turn or in alternation with other steps or at least some of the steps or stages in other steps.

In each specific implementation of this application, when data related to the characteristics of a target object, such as attribute information or attribute information set of the target object, needs to be processed, permission or consent of the target object will be obtained first, and the collection, use, and processing of these data will comply with relevant laws, regulations, and standards of relevant countries and regions. Furthermore, when this embodiment needs to obtain the attribute information of the target object, the individual permission or individual consent of the target object is obtained through pop-up or jumping to a confirmation page, etc. After explicitly obtaining the individual permission or individual consent of the target object, necessary target object related data for enabling this embodiment to operate normally is obtained.

Figure 23:
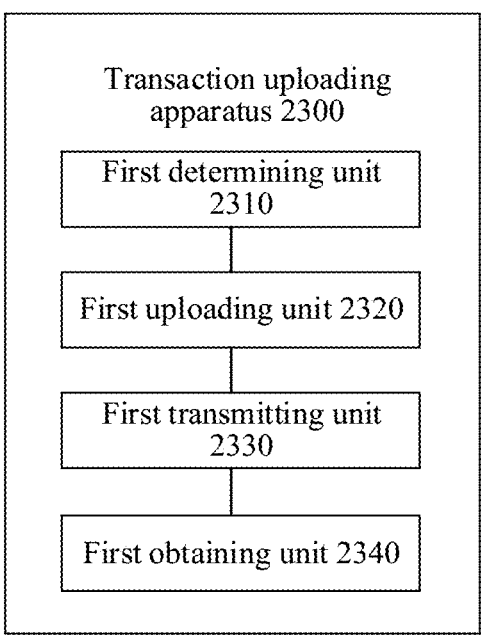
FIG. 23 is a module diagram of a transaction uploading apparatus located on a first relay node in one embodiment.

FIG. 23 is a schematic structural diagram of a transaction uploading apparatus 2300 according to an embodiment of this application. The transaction uploading apparatus 2300 includes the following units.

A first determining unit 2310 is configured to determine, in response to that a first consensus node receives a local transaction, a parent type of the local transaction.

A first transmitting unit 2330 is configured to transmit the local transaction to a second consensus node in response to that the parent type of the local transaction is a first type. The local transaction is used for instructing the second consensus node to execute the local transaction for recording the local transaction to a second blockchain, generating first uploading verification information of the local transaction, and transmitting the first uploading verification information of the local transaction to a third consensus node. The first uploading verification information is used for instructing the third consensus node to verify uploading of the local transaction according to the first uploading verification information to obtain an uploading verification result of the local transaction. The second blockchain is not accessible by nodes other than the second consensus node.

The first obtaining unit 2340 is configured to obtain the uploading verification result of the local transaction from the third consensus node.

In some embodiments, the first consensus node belongs to a local consensus network. The second consensus node belongs to the first global consensus network in global consensus networks. The third consensus node belongs to a second global consensus network in the global consensus networks. The first relay node is configured to transmit the local transaction of the first type to the second consensus node in the first global consensus network.

In some embodiments, the transaction uploading apparatus 2300 further includes a first uploading unit 2320, configured to instruct, in response to that the parent type is a second type, the first consensus node to execute the local transaction and to record the local transaction to a first blockchain. The first blockchain is allowed to be accessed by nodes other than the first consensus node.

In some embodiments, the transaction uploading apparatus 2300 further includes the following units.

A third obtaining unit is configured to obtain a global transaction generalized from multiple local transactions of the second type.

A third transmitting unit is configured to transmit the global transaction to the third consensus node. The global transaction is used for instructing the third consensus node to execute the global transaction and to record the global transaction to a third blockchain. The third blockchain is allowed to be accessed by nodes other than the third consensus node.

In some embodiments, the transaction uploading apparatus 2300 further includes the following units.

A second receiving unit is configured to receive, in response to that the third consensus node records the global transaction to the third blockchain to generate second uploading verification information, the second uploading verification information from the third consensus node.

A third transmitting unit is configured to transmit the second uploading verification information to the first consensus node. The second uploading verification information is used for instructing the first consensus node to verify uploading of the global transaction.

In some embodiments, the first uploading verification information includes a digest value of the local transaction and a digest value that is determined according to a first path in a first tree and recorded in a first bypass node. A leaf node in the first tree records a digest value of a transaction recorded on the second blockchain. The first path is a path from a leaf node in the first tree to a root node in the first tree, and the leaf node in the first tree records the digest value of the local transaction. The first bypass node is a sibling node in the first tree of nodes other than the root node in the first path. The first uploading verification information is further used for instructing the third consensus node to determine a first comparative digest value according to the digest value of the local transaction and the digest value recorded in the first bypass node. The verification is successful in response to that the digest value recorded in the root node in the first tree and the first comparative digest value are consistent.

In some embodiments, the first uploading verification information further includes a digest value of associated data obtained after execution of the local transaction and a digest value recorded in a second bypass node in a second tree. A leaf node in the second tree records a digest value of associated data obtained after execution of a transaction recorded on the second blockchain. A second path is a path from a leaf node in the second tree to a root node in the second tree, and the leaf node in the second tree records the digest value of the associated data obtained after execution of the local transaction. The second bypass node is a sibling node in the second tree of nodes other than the root node on the second path. The first uploading verification information is further used for instructing the third consensus node to determine, in response to that the digest value recorded in the root node in the first tree and the first comparative digest value are consistent, a second comparative digest value according to the digest value of the associated data obtained after execution of the local transaction and the digest value recorded in the second bypass node. The verification is successful in response to that the digest value recorded in the root node in the second tree and the second comparative digest value are consistent.

In some embodiments, the first uploading verification information further includes transaction desensitization information. The transaction desensitization information is obtained by desensitizing the local transaction by the second consensus node. The desensitization is performed according to a desensitization field in a target contract. The target contract corresponds to a child type of the local transaction.

The first obtaining unit 2340 is further specifically configured to:

obtain the transaction desensitization information from the third consensus node as the uploading verification result.

In some embodiments, the first uploading verification information further includes instantaneous-ness information of the local transaction. The instantaneous-ness information is determined by the second consensus node according to a child type of the local transaction.

The first obtaining unit 2340 is further specifically configured to:

receive the uploading verification result returned by the third consensus node after the verification of the third consensus node is successful in response to that the instantaneous-ness information indicates that the local transaction is an instantaneous transaction.

In some embodiments, the first obtaining unit 2340 is further configured to transmit an uploading verification result request to the third consensus node and obtain the uploading verification result from a response of the third consensus node to the uploading verification result request in response to that the instantaneous-ness information indicates that the local transaction is a non-instantaneous transaction.

In some embodiments, the first uploading verification information further includes a first signature of the digest value recorded in the second bypass node. The first signature is obtained by encrypting a first digest by the second consensus node with a first private key of the second consensus node. The first digest is generated by the second consensus node according to the digest value of the local transaction, the digest value recorded in the first bypass node, the digest value of the associated data obtained after execution of the local transaction, and the digest value recorded in the second bypass node. The first signature is used for instructing the third consensus node to decrypt, in response to that the root node in the second tree is consistent with a second to-be-compared root node, the first signature with a first public key of the second consensus node to obtain a second digest, and to generate a third digest according to the digest value of the local transaction, the digest value recorded in the first bypass node, the digest value of the associated data obtained after execution of the local transaction, and the digest value recorded in the second bypass node. The verification is successful in response to that the third digest and the second digest are consistent.

In some embodiments, the transaction uploading apparatus 2300 is further configured to receive a block identifier returned by the third consensus node after the third consensus node records a block including the uploading verification result to a third blockchain. The block identifier refers to the block including the uploading verification result.

The first obtaining unit 2340 is further configured to:

transmit an uploading verification result request to the third consensus node, the uploading verification result request carrying the block identifier, and the uploading verification result request being used for instructing the third consensus node to obtain the uploading verification result from the third blockchain according to the block identifier; and receive the uploading verification result returned by the third consensus node.

In some embodiments, the first transmitting unit 2330 is further configured to:

place the local transaction in a queue for queuing; and package local transactions in the queue in response to the queue satisfying a predetermined condition, and transmit the local transaction to the second consensus node.

In some embodiments, the first transmitting unit 2330 is further specifically configured to:

package local transactions in the queue in response to the number of local transactions in the queue reaching a first threshold.

In some embodiments, the first transmitting unit 2330 is further specifically configured to: determine a time difference between a current time and a previous packaging time in response to the number of local transactions in the queue not reaching a first threshold; and package local transactions in the queue in response to the time difference reaching a second threshold.

In some embodiments, the first transmitting unit 2330 is further specifically configured to:

determine a child type of the local transaction; determine a queue corresponding to the child type of the local transaction; and place the local transaction in the queue corresponding to the child type for queuing.

In some embodiments, the first transmitting unit 2330 is further configured to: package local transactions in the queue in response to the number of local transactions in the queue reaching a third threshold.

In some embodiments, the first transmitting unit 2330 is further specifically configured to:

determine a child type of the local transaction; determine a priority of the local transaction according to the child type; place the local transaction in a queue for queuing in a descending order of priority; and sequentially take out the local transactions from the queue, and transmit the local transactions to the second consensus node.

In some embodiments, the second consensus node has a TEE. The second blockchain is encrypted with a key of the TEE. The first uploading verification information is transmitted by the second consensus node to the second relay node in response to a first uploading verification information request transmitted by the second relay node. The first uploading verification information request is transmitted by the second relay node in response to adding an encrypted block on the second blockchain. The encrypted block is encrypted with the key of the TEE. The first uploading verification information is used for instructing the second relay node to forward the first uploading verification information to the third consensus node.

Figure 24:
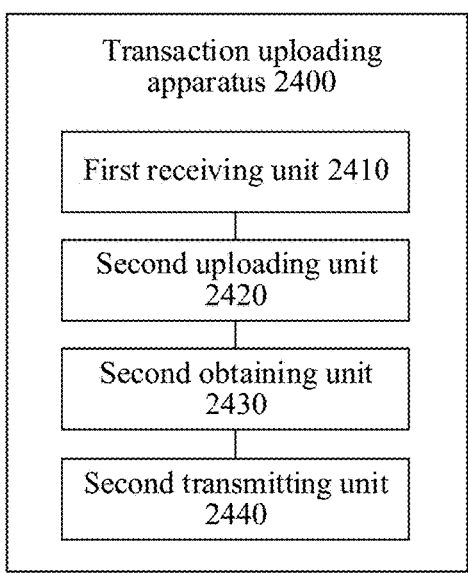
FIG. 24 is a module diagram of a transaction uploading apparatus located on a second consensus node in one embodiment.

FIG. 24 is a schematic structural diagram of a transaction uploading apparatus 2400 according to an embodiment of this application. The transaction uploading apparatus 2400 includes the following units.

A first receiving unit 2410 is configured to receive a local transaction forwarded by a first relay node. A parent type of the local transaction is the first type.

A second uploading unit 2420 is configured to execute the local transaction, and record the local transaction to a second blockchain. The second blockchain is not accessible by nodes other than the second consensus node.

A second obtaining unit 2430 is configured to obtain first uploading verification information of the local transaction.

A second transmitting unit 2440 is configured to transmit the first uploading verification information to a third consensus node. The first uploading verification information is used for instructing the third consensus node to verify uploading of the local transaction according to the first uploading verification information to obtain an uploading verification result.

In some embodiments, the second consensus node has a TEE. The second blockchain is encrypted with a key of the TEE. The second transmitting unit 2440 is further configured to: receive a first uploading verification information request transmitted by a second relay node, the first uploading verification information request being transmitted by the second relay node in response to adding an encrypted block on the second blockchain, and the encrypted block being encrypted with the key of the TEE; and transmit the first uploading verification information to the second relay node in response to the first uploading verification information request, the first uploading verification information being used for instructing the second relay node to forward the first uploading verification information to the third consensus node.

Figure 25:
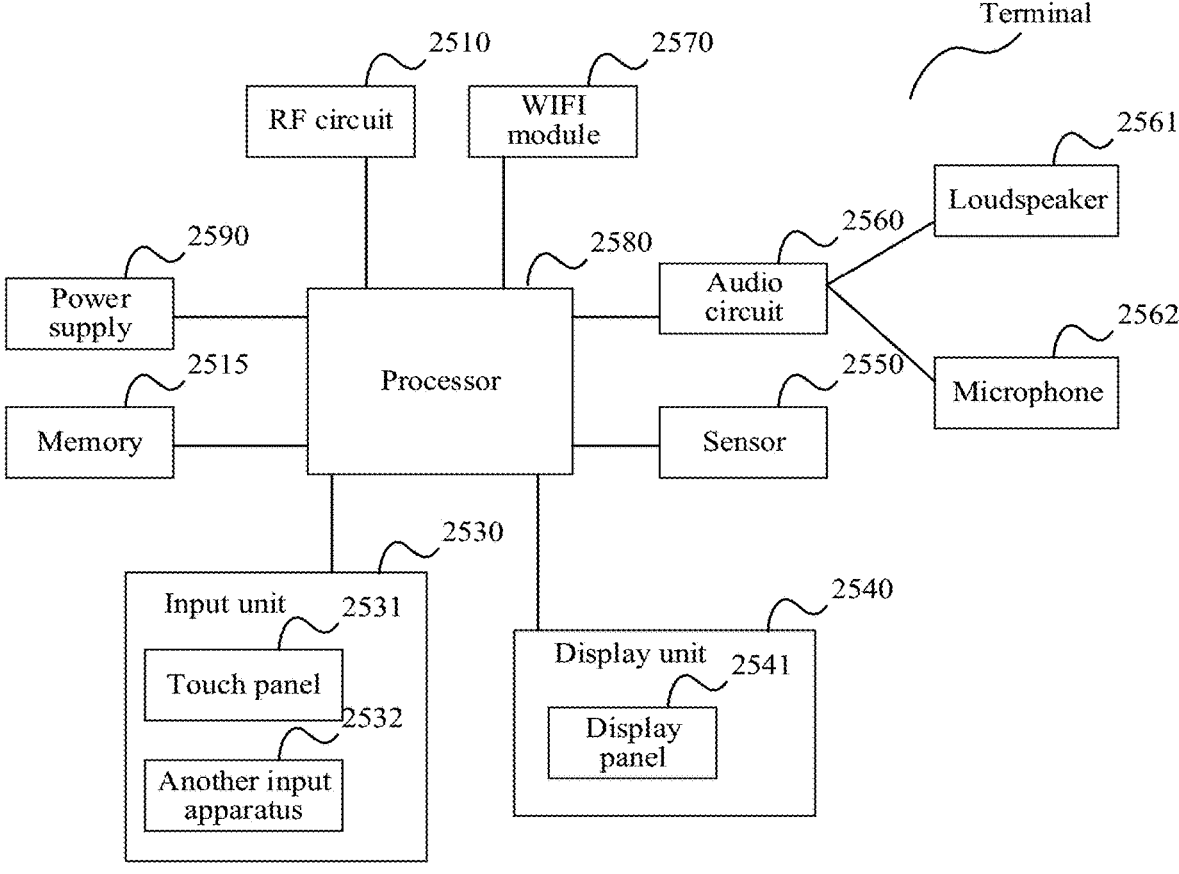
FIG. 25 is a structural diagram of a terminal implementing a transaction uploading method in one embodiment.

Reference is made to FIG. 25. FIG. 25 is a block diagram of a partial structure of a terminal implementing a transaction uploading method according to an embodiment of this application. The terminal includes: a radio frequency (RF) circuit 2510, a memory 2515, an input unit 2530, a display unit 2540, a sensor 2550, an audio circuit 2560, a wireless fidelity (WiFi) module 2570, a processor 2580, a power supply 2590, and other components. A person skilled in the art may understand that the structure of the terminal shown in FIG. 25 does not constitute a limitation on a mobile phone or a computer, and the mobile phone may include more components or fewer components than those shown in the figure, or some components may be combined, or a different component deployment may be used.

The RF circuit 2510 may be configured to receive and transmit signals during an information receiving and transmitting process or a call process. Specifically, downlink information from a base station is received and then delivered to the processor 2580 for processing. In addition, designed uplink data is transmitted to the base station.

Memory 2515 may be configured to store a software program and module. processor 2580 runs the software program and module stored in memory 2515, to implement various functional applications and data processing of the terminal object.

The input unit 2530 may be configured to receive input digit or character information, and generate a keyboard signal input related to the user setting and function control of the terminal object. Specifically, the input unit 2530 may include a touch panel 2531 and another input apparatus 2532.

Display unit 2540 may be configured to display input information or provided information, and various menus of the terminal object. The display unit 2540 may include a display panel 2541.

The audio circuit 2560, a loudspeaker 2561, and a microphone 2562 may provide audio interfaces.

In this embodiment, processor 2580 included in the terminal may perform the transaction uploading method according to the foregoing embodiment.

The terminal according to This embodiment includes, but is not limited to, a mobile phone, a computer, an intelligent voice interaction device, an intelligent household appliance, a vehicle-mounted terminal, an aircraft, and the like. This embodiment of the present application may be applied to various scenarios, including but not limited to data security, blockchain, data storage, information technology, and the like.

Figure 26:
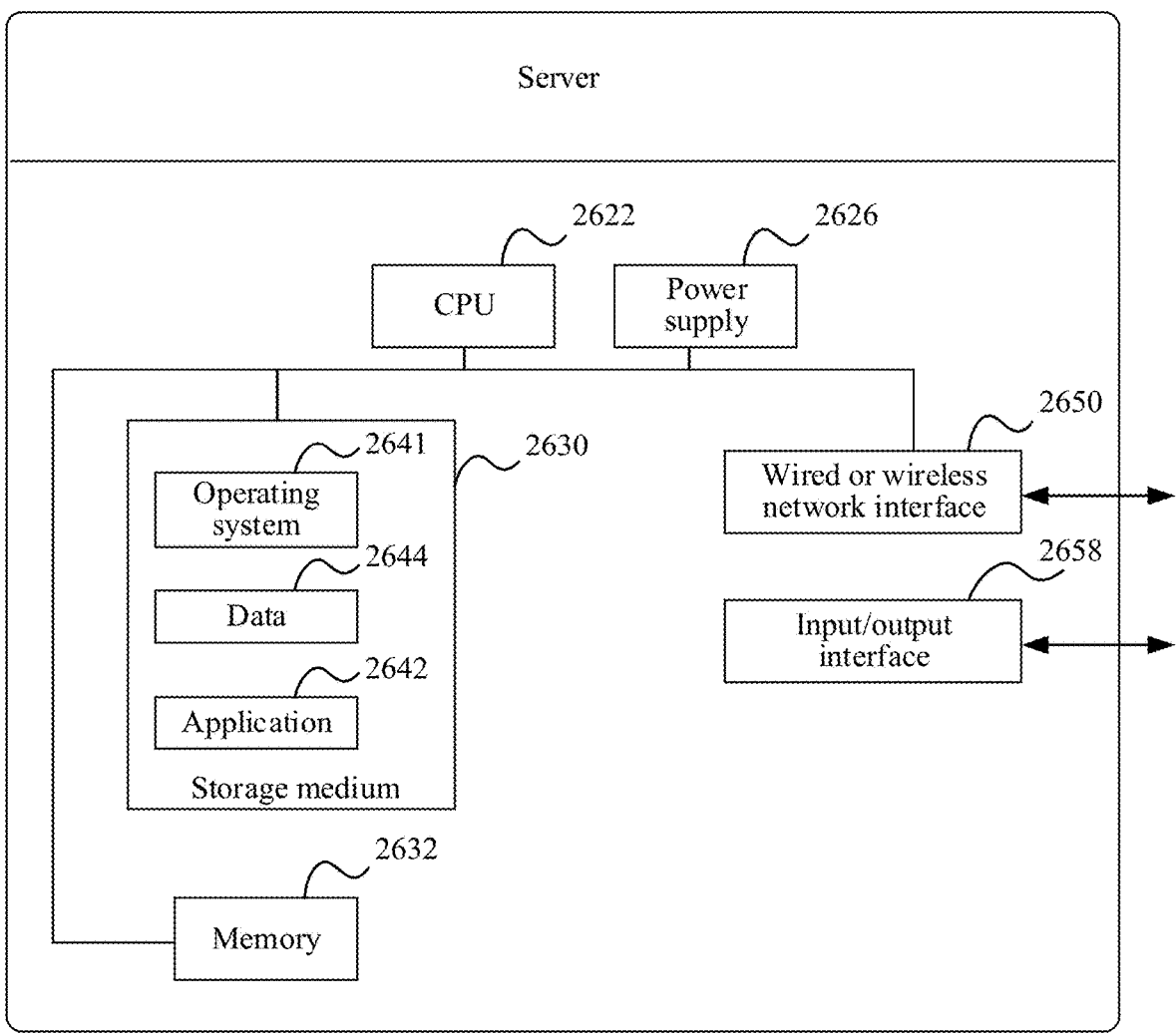
FIG. 26 is a structural diagram of a server implementing a transaction uploading method in one embodiment.

FIG. 26 is a block diagram of a partial structure of a server implementing a transaction uploading method according to an embodiment of this application. The server may greatly differ due to different configurations or performances, and may include one or more CPUs 2622 (for example, one or more processors), a memory 2632, and one or more storage media 2130 for storing applications 2642 or data 2644 (for example, one or more mass storage apparatuses). The memory 2632 and the storage medium 2630 may be configured for transient storage or permanent storage. A program stored in the storage medium 2630 may include one or more modules (which are not marked in the figure), and each module may include a series of instruction operations on the server. Furthermore, the CPU 2622 may be configured to communicate with the storage medium 2630, and perform, on the server, the series of instruction operations in the storage medium 2630. The one or more storage media 2130 may include one or more non-transitory storage media.

The server may further include one or more power supplies 2626, one or more wired or wireless network interfaces 2650, one or more input/output interfaces 2658, and/or one or more operating systems 2641, for example, Windows Server™, Mac OS X™, Unix™, Linux™, Free-BSD™, and the like.

The CPU 2622 in the server may be configured to performing the transaction uploading method according to This embodiment.

This embodiment further provides a computer-readable storage medium. The computer-readable storage medium is configured to store computer-readable instructions. The computer-readable instructions are used for performing the transaction uploading method according to each of the foregoing embodiments.

This embodiment further provides a computer program product. The computer program product includes computer programs. A processor of a computer device reads and executes the computer programs, whereby the computer device implements the transaction uploading.

The terms "first", "second", "third", "fourth", and the like in the specification of this application and in the above drawings are used for distinguishing between similar objects and not necessarily for describing a particular order or sequential order. It is to be understood that such used data is interchangeable where appropriate whereby the embodiments of this application described here can be, for example, implemented in an order other than those illustrated or described here. Furthermore, the terms "include", "have", and any other variants mean to cover the non-exclusive inclusion. For example, a process, method, system, product, or apparatus that includes a list of steps or units is not necessarily limited to those steps or units, but may include other steps or units not expressly listed or inherent to such a process, method, product, or apparatus.

It is to be understood that "at least one" means one or more and "multiple" means two or more in this application. "And/or" describes an association relationship between associated objects, and represents that there are three relationships. For example, "A and/or B" may mean that there are only A, only B, and both A and B, where A and B may be singular or plural. The character "/" generally represents that contextual objects are in an "or" relationship. "At least one of the following" or a similar expression thereof means any combination of these items, including any combination of single items or plural items. For example, at least one of a, b, or c may represent a, b, c, "a and b," "a and c," "b and c," or "a and b and c," where a, b, and c may be single or multiple.

It is to be understood that in the description of This embodiment, the term multiple (or plural) means more than two, the terms greater than, less than, and exceed are understood to exclude the current number, and the terms above, below, and within are understood to include the current number.

In the several embodiments provided in this application, it is to be understood that the disclosed system, apparatus, and method may be implemented in other manners. For example, the apparatus embodiments described above are merely examples. For example, division into the units is merely logical function division, and may be another division in an actual implementation. For example, multiple units or assemblies may be combined or may be integrated into another system, or some features may be ignored or not be performed. In addition, the displayed or discussed mutual couplings or direct couplings or communication connections may be implemented by using some interfaces. The indirect couplings or communication connections between the apparatuses or units may be electrical, mechanical, or in other forms.

The units described as separate components may or may not be physically separated, and components displayed as units may or may not be physical units, may be located in one position, or may be distributed over multiple network units. Some or all the units may be selected based on actual requirements to achieve the objects of the solutions of this embodiment.

In addition, functional units in the various embodiments of this application may be integrated into one processing unit, the units may exist alone physically, or two or more units may be integrated into one unit. The integrated unit may be implemented in the form of hardware, or may be implemented in the form of a software functional unit.

If the integrated unit is implemented in the form of a software functional unit and sold or used as an independent product, the integrated unit may be stored in a computer-readable storage medium. Based on this understanding, the technical solution of this application, either inherently or in any part contributing to the related art, or all or part of the technical solution, may be embodied in the form of a software product. The computer software product is stored in a storage medium (e.g., a non-transitory storage medium), and includes several instructions for enabling a computer apparatus (which may be a personal computer, a server, or a network apparatus) to perform all or part of the steps of the method according to the various embodiments of this application. The foregoing storage medium includes any medium capable of storing computer-readable instructions, such as a USB flash drive, a removable hard disk, a read-only memory (ROM), a random access memory (RAM), a magnetic disk, or an optical disc.

It is also to be understood that the various implementations provided by This embodiment may be arbitrarily combined to achieve different technical effects.

The above is a specific description of the implementations of this application, but this application is not limited to the above implementations. A person skilled in the art may make various equivalent modifications or substitutions without violating the spirit of this application, and these equivalent modifications or substitutions are all included in the scope defined by the claims of this application.

What is claimed is:

1. A transaction uploading method, performed by a first relay node, the method comprising:
determining a parent type of the local transaction in response to a first consensus node receiving a local transaction;
transmitting the local transaction to a second consensus node in response to that the parent type is a first type, the local transaction instructing the second consensus node to execute the local transaction, recording the local transaction to a first blockchain, generating first uploading verification information of the local transaction, and transmitting the first uploading verification information to a third consensus node, the first uploading verification information instructing the third consensus node to verify uploading of the local transaction according to the first uploading verification information to obtain an uploading verification result of the local transaction, and the first blockchain being not accessible by nodes other than the second consensus node; and
obtaining the uploading verification result of the local transaction from the third consensus node.

2. The method according to claim 1, wherein the first consensus node belongs to a local consensus network, the second consensus node belongs to a first global consensus network, the third consensus node belongs to a second global consensus network, and the first relay node is configured to transmit the local transaction of the first type to the second consensus node in the first global consensus network.

3. The method according to claim 1, further comprising:
instructing, in response to that the parent type is a second type, the first consensus node to execute the local transaction and to record the local transaction to a second blockchain, the second blockchain being accessible by nodes other than the first consensus node.

4. The method according to claim 3, further comprising:
obtaining a global transaction based on a plurality of local transactions of the second type; and
transmitting the global transaction to the third consensus node, the global transaction instructing the third consensus node to execute the global transaction and to record the global transaction to a third blockchain, and the third blockchain being accessible by nodes other than the third consensus node.

5. The method according to claim 4, further comprising:
receiving the second uploading verification information from the third consensus node, in response to that the third consensus node records the global transaction to the third blockchain to generate second uploading verification information; and
transmitting the second uploading verification information to the first consensus node, the second uploading verification information instructing the first consensus node to verify uploading of the global transaction.

6. The method according to claim 1, wherein:
the first uploading verification information comprises a digest value of the local transaction and a digest value that is determined according to a first path in a first tree and recorded in a first bypass node;
a leaf node in the first tree records a digest value of a transaction recorded on the first blockchain; the first path is a path from a leaf node in the first tree to a root node in the first tree, and the leaf node in the first tree records the digest value of the local transaction; the first bypass node is a sibling node in the first tree of nodes other than the root node in the first path;

the first uploading verification information instructs the third consensus node to determine a first comparative digest value according to the digest value of the local transaction and the digest value recorded in the first bypass node; and the verification is successful in response to that the digest value recorded in the root node in the first tree and the first comparative digest value are consistent.

7. The method according to claim 6, wherein:

the first uploading verification information further comprises a digest value of associated data obtained after execution of the local transaction and a digest value recorded in a second bypass node in a second tree;

a leaf node in the second tree records a digest value of associated data obtained after execution of a transaction recorded on the first blockchain;

a second path is a path from a leaf node in the second tree to a root node in the second tree, and the leaf node in the second tree records the digest value of the associated data obtained after execution of the local transaction;

the second bypass node is a sibling node in the second tree of nodes other than the root node on the second path;

the first uploading verification information further instructs the third consensus node to determine a second comparative digest value according to the digest value of the associated data obtained after execution of the local transaction and the digest value recorded in the second bypass node in response to that the digest value recorded in the root node in the first tree and the first comparative digest value are consistent;

and the verification is successful in response to that the digest value recorded in the root node in the second tree and the second comparative digest value are consistent.

8. The method according to claim 7, wherein the first uploading verification information further comprises transaction desensitization information, the transaction desensitization information is obtained by desensitizing the local transaction by the second consensus node, the desensitization is performed according to a desensitization field in a target contract, and the target contract corresponds to a child type of the local transaction; and the obtaining the uploading verification result of the local transaction from the third consensus node comprises:

obtaining the transaction desensitization information from the third consensus node as the uploading verification result.

9. The method according to claim 7, wherein the first uploading verification information further comprises instantaneous-ness information of the local transaction, and the instantaneous-ness information is determined by the second consensus node according to a child type of the local transaction; and the obtaining the uploading verification result of the local transaction from the third consensus node comprises:

receiving the uploading verification result returned by the third consensus node after the verification of the third consensus node is successful in response to that the instantaneous-ness information indicates that the local transaction is an instantaneous transaction.

10. The method according to claim 9, further comprising:

transmitting an uploading verification result request to the third consensus node and obtaining the uploading verification result from a response of the third consensus node to the uploading verification result request in response to that the instantaneous-ness information indicates that the local transaction is a non-instantaneous transaction.

11. The method according to claim 7, wherein the first uploading verification information further comprises a first signature of the second bypass node, the first signature is obtained by encrypting a first digest by the second consensus node with a first private key of the second consensus node, and the first digest is generated by the second consensus node according to the digest value of the local transaction, the digest value recorded in the first bypass node, the digest value of the associated data obtained after execution of the local transaction, and the digest value recorded in the second bypass node; and the first instructs the third consensus node to decrypt, the first signature with a first public key of the second consensus node to obtain a second digest, in response to that the root node in the second tree is consistent with a second root node to be compared, and to generate a third digest according to the digest value of the local transaction, the digest value recorded in the first bypass node, the digest value of the associated data obtained after execution of the local transaction, and the digest value recorded in the second bypass node, and the verification is successful in response to that the third digest and the second digest are consistent.

12. The method according to claim 1, further comprising:

receiving a block identifier returned by the third consensus node after the third consensus node records a block comprising the uploading verification result to a third blockchain, the block identifier referring to the block comprising the uploading verification result, wherein the obtaining the uploading verification result of the local transaction from the third consensus node comprises:

transmitting an uploading verification result request to the third consensus node, the uploading verification result request carrying the block identifier, and the uploading verification result request instructing the third consensus node to obtain the uploading verification result from the third blockchain according to the block identifier; and receiving the uploading verification result returned by the third consensus node.

13. The method according to claim 1, wherein the transmitting the local transaction to a second consensus node comprises:

placing the local transaction in a queue; and packaging local transactions in the queue in response to the queue satisfying a predetermined condition, and transmitting the local transaction to the second consensus node.

14. The method according to claim 13, wherein the packaging the local transactions in the queue in response to the queue satisfying the predetermined condition comprises:

packaging the local transactions in the queue in response to the number of local transactions in the queue reaching a first threshold.

15. The method according to claim 13, wherein the packaging the local transactions in the queue in response to the queue satisfying the predetermined condition comprises:

determining a time difference between a current time and a previous packaging time in response to the number of local transactions in the queue not reaching a first threshold; and packaging the local transactions in the queue in response to the time difference reaching a second threshold.

16. The method according to claim 13, wherein the placing the local transaction in the queue for queuing comprises:

determining a child type of the local transaction;

determining a queue corresponding to the child type of the local transaction; and placing the local transaction in the queue corresponding to the child type.

17. The method according to claim 16, wherein the packaging the local transactions in the queue in response to the queue satisfying the predetermined condition comprises:

packaging the local transactions in the queue in response to the number of local transactions in the queue reaching a third threshold.

18. A transaction uploading method, performed by a second consensus node, the method comprising:

receiving a local transaction forwarded by a first relay node, a parent type of the local transaction being a first type;

executing the local transaction, and recording the local transaction to a first blockchain, the first blockchain being not accessible by nodes other than the second consensus node;

obtaining first uploading verification information of the local transaction; and transmitting the first uploading verification information to a third consensus node, the first uploading verification information instructing the third consensus node to verify uploading of the local transaction according to the first uploading verification information to obtain an uploading verification result.

19. The method according to claim 18, wherein the second consensus node has a trusted execution environment (TEE), and the first blockchain is encrypted with a key of the TEE; and the transmitting the first uploading verification information to a third consensus node comprises:

receiving a first uploading verification information request transmitted by a second relay node, the first uploading verification information request being transmitted by the second relay node in response to adding an encrypted block on the first blockchain, and the encrypted block being encrypted with the key of the TEE; and transmitting the first uploading verification information to the second relay node in response to the first uploading verification information request, the first uploading verification information instructing the second relay node to forward the first uploading verification information to the third consensus node.

20. An electronic device, comprising a memory and one or more processors, the memory storing computer-readable instructions, the processor, when executing the computer-readable instructions, implementing the transaction uploading method comprising:

determining a parent type of the local transaction in response to a first consensus node receiving a local transaction;

transmitting the local transaction to a second consensus node in response to that the parent type is a first type, the local transaction instructing the second consensus node to execute the local transaction for recording the local transaction to a first blockchain, generating first uploading verification information of the local transaction, and transmitting the first uploading verification information to a third consensus node, the first uploading verification information instructing the third consensus node to verify uploading of the local transaction according to the first uploading verification information to obtain an uploading verification result of the local transaction, and the first blockchain being not accessible by nodes other than the second consensus node; and obtaining the uploading verification result of the local transaction from the third consensus node.

* * * * *